US011080806B2

(12) United States Patent
Kislovskiy et al.

(10) Patent No.: US 11,080,806 B2
(45) Date of Patent: Aug. 3, 2021

(54) NON-TRIP RISK MATCHING AND ROUTING FOR ON-DEMAND TRANSPORTATION SERVICES

(71) Applicant: Uber Technologies, Inc., San Francisco, CA (US)

(72) Inventors: Dima Kislovskiy, Pittsburgh, PA (US); David McAllister Bradley, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 876 days.

(21) Appl. No.: 15/602,387

(22) Filed: May 23, 2017

(65) Prior Publication Data

US 2018/0342034 A1 Nov. 29, 2018

(51) Int. Cl.
*G06Q 50/30* (2012.01)
*G06Q 10/06* (2012.01)

(52) U.S. Cl.
CPC ......... *G06Q 50/30* (2013.01); *G06Q 10/0635* (2013.01); *G06Q 10/06315* (2013.01)

(58) Field of Classification Search
CPC .............. G06Q 50/30; G06Q 10/0635; G06Q 10/06315
See application file for complete search history.

(56) References Cited

U.S. PATENT DOCUMENTS

| 6,411,897 B1* | 6/2002 | Gaspard, II | G01C 21/343 340/991 |
| 8,606,512 B1* | 12/2013 | Bogovich | G01C 21/3407 701/423 |
| 9,141,995 B1* | 9/2015 | Brinkmann | G07C 5/02 |
| 9,188,985 B1* | 11/2015 | Hobbs | G01C 21/3626 |
| 9,507,346 B1* | 11/2016 | Levinson | G05D 1/0291 |
| 9,552,564 B1 | 1/2017 | Martenis | |
| 9,581,461 B1 | 2/2017 | Chintakindi et al. | |
| 9,852,475 B1 | 12/2017 | Konrady | |
| 9,944,282 B1 | 4/2018 | Fields | |
| 9,946,531 B1 | 4/2018 | Fields | |
| 10,049,505 B1 | 8/2018 | Harvey | |
| 10,083,493 B1 | 9/2018 | Davis | |
| 10,142,255 B1 | 11/2018 | Pachon | |
| 10,156,848 B1* | 12/2018 | Konrardy | G01C 21/3469 |
| 10,308,430 B1 | 6/2019 | Brady | |

(Continued)

OTHER PUBLICATIONS

Vania de Oliviera Neves, An environment to support structural testing of autonomous vehicles, 2014, pp. 19-24, https:// ieeexplore. ieee. org/stamp/stamp.jsp?tp+ &arnumber = 7091160 (Year: 2014).
(Continued)

*Primary Examiner* — Nadja N Chong Cruz
(74) *Attorney, Agent, or Firm* — Dority & Manning, P.A.

(57) ABSTRACT

An on-demand transportation management system can receive transport requests in connection with an on-demand transportation service, each transport request indicating a start location and a destination. The system can determine a set of candidate vehicles to service each transport request, and can further determine a non-trip risk value for servicing the transport request. The system may then select an optimal vehicle in the set of candidate vehicles based at least in part on the non-trip risk value.

22 Claims, 21 Drawing Sheets

(56) References Cited

U.S. PATENT DOCUMENTS

| | | |
|---|---|---|
| 2003/0040944 A1* | 2/2003 | Hileman .............. G06Q 10/02 705/5 |
| 2007/0027592 A1 | 2/2007 | Tolkacz |
| 2008/0046383 A1 | 2/2008 | Hirtenstein |
| 2010/0036606 A1 | 2/2010 | Jones |
| 2012/0136567 A1 | 5/2012 | Wang et al. |
| 2015/0204684 A1 | 7/2015 | Rostamian |
| 2015/0206267 A1 | 7/2015 | Khanna |
| 2015/0266490 A1 | 9/2015 | Coelingh |
| 2015/0324735 A1 | 11/2015 | Lord |
| 2015/0336270 A1 | 11/2015 | Storr |
| 2015/0339928 A1 | 11/2015 | Ramanujam |
| 2016/0167652 A1 | 6/2016 | Slusar |
| 2016/0306960 A1 | 10/2016 | Gajulapalli |
| 2016/0334797 A1* | 11/2016 | Ross .............. G05D 1/0234 |
| 2016/0370194 A1 | 12/2016 | Colijn |
| 2017/0010613 A1 | 1/2017 | Fukumoto |
| 2017/0078380 A1 | 3/2017 | Aggarwal |
| 2017/0123421 A1 | 5/2017 | Kentley |
| 2017/0124586 A1 | 5/2017 | Tepper |
| 2017/0126810 A1 | 5/2017 | Kentley |
| 2017/0132117 A1 | 5/2017 | Stefan |
| 2017/0132934 A1* | 5/2017 | Kentley .............. G08G 1/202 |
| 2017/0139411 A1 | 5/2017 | Hartung |
| 2017/0141873 A1 | 5/2017 | Mandeville-Clarke |
| 2017/0191846 A1 | 7/2017 | Chintakindi |
| 2017/0221149 A1 | 8/2017 | Hsu-Hoffman |
| 2017/0234689 A1* | 8/2017 | Gibson .............. G05D 1/0061 701/25 |
| 2017/0255966 A1 | 9/2017 | Khoury |
| 2018/0018874 A1 | 1/2018 | McNew |
| 2018/0096606 A1 | 4/2018 | Moreira-Matias |
| 2018/0107770 A1 | 4/2018 | Cahoon |
| 2018/0124506 A1 | 5/2018 | Sun |
| 2018/0130095 A1 | 5/2018 | Khoury |
| 2018/0188045 A1 | 7/2018 | Wheeler |
| 2018/0253109 A1 | 9/2018 | Fontaine |
| 2018/0293067 A1 | 10/2018 | Hirshberg |
| 2018/0308191 A1 | 10/2018 | Matthiesen |
| 2018/0308295 A1 | 10/2018 | Kwak |
| 2018/0308363 A1 | 10/2018 | Duncan |

OTHER PUBLICATIONS

Simona Gifei, Integrated Management System for Qulity, Safety and Security in Developing Autonomous Vehicles, Mar. 2017, pp. 673-676 https:// ieeexplore.ieee. org/stamp/stamp.jsp?tp+ &arnumber = 7905041 (Year: 2017).

Federico Giaimo, Design Criteria to Architect Continuous Experimentation for Self-Driving Vehicles, 2017, pp. 203-210, https:// ieeexplore.ieee.org/ stamp/stamp.jsp?tp=&arnumber=7930218 (Year: 2017).

Philip Koopman, Autonomous Vehicle Safety: An Interdisciplinary Challenge, 2017, pp. 90-96, https://ieeexplore. ieee.org/stamp/stamp. jsp?tp= &arnumber=7823109 (Year: 2017).

Baekgyu Kim, Testing Autonomous Vehicle Software in the Virtual Prototyping Environment, 2017, pp. 5-8 https://ieeexplore.ieee.org/ stamp/ stamp.jsp?tp=arnumber=7797233 (Year: 2017).

Kim, Baekgyu, "Testing Autonomous Vehicle Software in the Virtual Prototyping Environment", Dec. 23, 2016.

Giaimo, Federico, "Design Criteria to Architect Continuous Experimentation for Self-Driving Vehicles", May 15, 2017.

International Preliminary Report on Patentability, dated Nov. 26, 2019 in PCT/US2018/033092.

ISR and Written Opinion dated Jul. 29, 2018 in PCT/US2018/033092.

Koopman, Philip, "Autonomous Vehicle Safety: An Interdisciplinary Challenge", Jan. 18, 2017.

Gifei, Simona, "Integrated Management System for Quality, Safety and Security in Developing Autonomous Vehicles", Apr. 24, 2017.

Neves, Vania de Oliviera, "An environment to support structural testing of autonomous vehicles", Apr. 23, 2015.

Extended European Search Report for Application No. EP18805085, dated Jan. 28, 2021, 11 pages.

* cited by examiner

NON-TRIP RISK MATCHING AND ROUTING FOR ON-DEMAND TRANSPORTATION SERVICES

BACKGROUND

The path to autonomous vehicle (AV) ubiquity on public roads and highways has been highly experimental across several entity types, such as educational institutions, automobile manufacturers, and high technology business entities. AV testing is currently converging upon necessary hardware—such as sensor and computational resources, required for adequate safety of AV operations on public roads—as well as continuously advancing software development in areas of perception, object classification, path prediction, control input responses (e.g., steering, braking, and acceleration inputs), and the like. However, monetization of AV technology has been limited to a gradual progression of autonomy features on offered vehicles manufactured by certain automakers—from active cruise control features to lane-keeping, following, and automated parking and braking features developed by certain vehicle manufacturers.

In the year 2016, human deaths attributed to motor vehicles in the United States reached 40,000 mainly due to speeding, impaired driving, and increasingly distracted driving. It is widely accepted within the automotive and scientific communities that advanced driver-assistance systems and autonomous driving will tremendously reduce vehicle-related accidents and deaths. In addition, wasted time and productivity costs attributed to lengthy commutes may also be significantly reduced or largely eliminated once self-driving vehicle technology becomes ubiquitous in urban sprawls. However, widespread acceptance of autonomous vehicles can only be achieved through proven, real-world results in terms of logged mileage and an indisputable and convincing safety track record.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
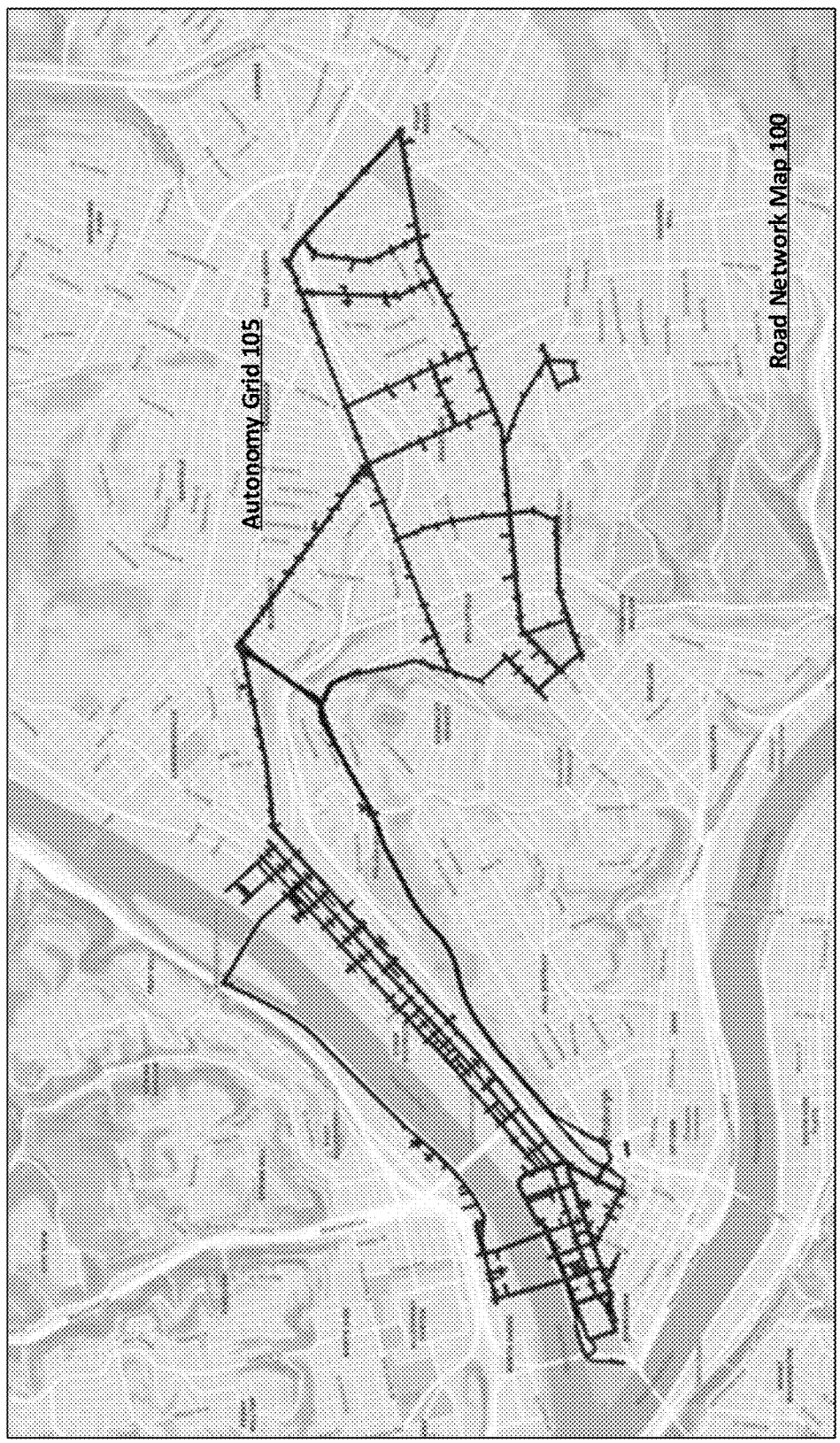
FIG. 1A is an example road network map including a mapped and labeled autonomy grid on which AVs can operate.

A travel-path network for a given region (e.g., a road network for a metroplex such as the greater Pittsburgh, Pennsylvania metropolitan area) can be analyzed on a high-level and mapped using ground truth data from recording vehicles having sensor systems (e.g., LIDAR and stereoscopic cameras). The travel-path network can then be parsed into capability-in-scope lanes and paths across the region for potential AV operation. These capability-in-scope path segments can be determined on a high level based on lane geometry, intersection complexity, traffic law complexity, traffic flow, pedestrian density, and the like. Furthermore, the capability-in-scope path segments can be temporally sensitive and conditionally sensitive. For example, certain path segments can be safe for AV operation only during certain times of day or night, when traffic conditions permit, or when weather conditions permit. The capability-in-scope paths can be determined initially by humans, and then refined and/or expanded computationally through risk regression methods, trip classification methods, and AV software enhancement described throughout the present disclosure.

Additionally or alternatively, the capability-in-scope lanes and paths can be determined through ground truth mapping and labeling, and heuristically through lower level computational analysis of AV log data from AVs traveling throughout the region. As an example, log-sets from AVs can be processed by a trained risk regressor to determine a fractional risk quantity for an AV operating on any given path segment, and higher risk path segments may be eliminated or set aside for future software development and eventual expansion using the disclosed methods herein. Accordingly, the resultant capability-in-scope lanes and paths can comprise an autonomy grid of highly mapped and labeled paths (e.g., recorded and labeled localization maps on an individual lane basis) that provide low predicted risk for AV operation.

As provided herein, a "path segment" can comprise a paved road segment, unpaved road segment, or off-road segment utilizable by vehicles, and can include predetermined paths over land, water, underwater, and through the air (e.g., for aerial drones used for autonomous package or human transport). Thus, a "path" can comprise any sequence of connected path segments traversable by a vehicle, and can further comprise any combination of land, aerial, and aquatic path segments. Along these lines, a "driver" may be any operator of a vehicle, such as an aerial vehicle, a typical road-based or off-road vehicle, a marine vehicle, or a hybrid aerial, land, and/or marine-based vehicle. Furthermore, a "lane segment" included on a typical paved road in a road network can have a predetermined length (e.g., two-hundred meters) and/or can be parsed from a road segment between intersections. A "road segment" can be comprised as multiple individual lane segments (e.g., a left lane segment and a right lane segment) having a common directional aspect. Accordingly, a total path for an AV from a starting point to a destination can be comprised of a sequential set of capability-in-scope lane segments from the starting point to the destination, each having an attributed fractional risk quantity calculated by a risk regressor based on static and dynamic conditions, as described herein.

Described throughout the present disclosure are risk regression and trip classification techniques between human-only driven vehicles (HDVs), AVs having a safety driver (SDAVs), fully autonomous self-driving vehicles with no safety driver needed (FAVs) (e.g., level 4 or level 5 autonomy), or remotely operated autonomous vehicles. Further described throughout the present disclosure is an on-demand transportation management system that manages on-demand transportation services linking available drivers of purely human-driven vehicles (HDVs), available autonomous vehicles having trained safety drivers (SDAVs), and fully autonomous self-driving vehicles having no safety driver (FAVs) with requesting riders throughout the given region.

In doing so, the on-demand transport management system (or "transport system") can receive requests for transportation from requesting users via a designated rider application executing on the users' computing devices. On a high level, the transport management system can receive a transport request and identify a number of proximate available vehicles relative to the user. The transport system may then select an available HDV, SDAV, or FAV to service the transport request based on a number of criteria described herein, including risk, estimated time of arrival (ETA) to the pick-up location, expected earnings or profit per candidate vehicle, and the like. As provided herein, examples of the transport request can comprise an on-demand carpooling request, a standard ride-share request, a high-capacity vehicle request, a luxury vehicle request, a professional driver request, a request for AV transportation, a request for item delivery (e.g., a package or food), or any combination of the foregoing. A transport request may also include any general request for transportation that does not necessarily specify the type or category of transportation used to fulfill the request.

According to examples described herein, the transport system can perform a vehicle matching operation given a received transport request from a requesting user. The matching operation can comprise identifying a set of candidate vehicles based on risk regression techniques, trip classification techniques, business optimization techniques, and various other parameters described herein, and ultimately selecting a most optimal vehicle to service the transport request. In doing so, the transport system can select between HDVs, SDAVs, and/or FAVs to transport a requesting user from the pick-up location to a destination indicated in the transport request. Examples described herein can leverage the use of SDAVs for software release testing and verification for eventual, post-verification use on FAVs to progress the transition towards FAV ubiquity for on-demand transportation services.

As described herein, a "risk regressor" or "risk regression engine" may be used interchangeably throughout to describe machine learning techniques and/or algorithms to compute fractional risk quantities for any given path segment of a given region (e.g., a certain probability that a harmful event will occur for any given traversal of a specified lane of a road segment between intersections). Furthermore, an example risk regressor may further factor in current environmental conditions (e.g., rain, snow, clouds, road conditions, lighting, lighting direction, and the like), and static risk based on lane geometry, traffic conditions, and time of day to compute a fractional risk quantity dynamically for any path segment at any given time. Such fractional risk quantities can be generalized for human driving, or can be AV and/or AV software version specific.

Accordingly, an example risk regressor may compute an individualized fractional risk quantity for each path segment on a per vehicle or per driver basis given the vehicle's or driver's attributes, such as on-board hardware and software, an AV state as determined through vehicle telemetry or diagnostics data, or a driver's safety history, current state, and driving characteristics. In some examples, a particular risk regressor may be trained for a corresponding trip classifier, and may be specific to a software release executable by AVs for verification, as described herein. In addition, for a given transport request from a requesting user, a routing engine can determine a set of routes between the pick-up location and destination, and the risk regressor can determine an aggregate risk quantity for each of those routes given the current or predicted conditions (e.g., conditions at the time the vehicle traverses a particular path segment), and provide a lowest risk route or other optimal route (e.g., optimized across risk, time, dollar earnings, etc.) as output to a trip classifier and/or vehicle matching engine that ultimately pairs the requesting user with an available vehicle.

As provided herein, a "trip classifier" or "trip classification engine" may be used interchangeably throughout the present disclosure to describe machine learning techniques and/or algorithms that classify—based on an aggregate risk quantity estimated or otherwise calculated by a risk regressor—any overall path or route between an initial location and a destination. For example, a trip classifier can receive, as input, one or more routes and aggregate risk quantities for each of the routes (as determined by a risk regressor). In variations, further inputs can be provided to the trip classifier, such as expected earnings or profitability for a particular vehicle class by servicing the trip given current conditions. A classification by a trip classifier can include multiple elements, such as specific software versions authorized for a trip along the entirety of the route (e.g., verified software releases or new, unverified software releases stored on-board AVs), the type of vehicles authorized to service the trip (e.g., SDAV, FAV, and/or HDV), and the like. Accordingly, based on the aggregate risk of a total path or route, the trip classifier can establish a set of threshold requirements on vehicles for servicing a particular transport request for the trip, and therefore can ultimately determine a candidate set of vehicles that are qualified to service the transport request. Thereafter, a vehicle matching engine can select a most optimal vehicle to service the request.

As provided herein, a "software release" or "software version" comprises any software update executable by an AV for virtually any reason. Example reasons for a new software release can include hardware updates on AVs, altering perception, prediction, or vehicle control behavior by the AV, expanding AV operations on an autonomy grid, providing new or updated localization maps to the AVs, and the like. In various examples, each software release may be paired with a particular trip classifier (e.g., a trip classifier and software release pair can be locked together without being used for other software releases and trip classifiers). Furthermore, when a software release is developed, it may first be pre-certified through a set of simulations, such as full log set simulations developed through previously verified software releases and log data from actual AV trips, edge case Monte Carlo sampling, plan-based evaluation, and simulation analysis capable of adjusting simulation parameters (e.g., simulating fault conditions and failures) and incorporating additional actors (e.g., other vehicles or pedestrians) to provide a broad range of test scenarios with highly granular control. In some aspects, a new software release can be verified for FAV use using simulations (e.g., a minor update to AV behavior at a specified location, such as a blind corner). In other aspects, pre-certification using simulation analysis enables software training systems described herein to distribute pre-certified software releases to SDAVs for logging mileage and eventual verification. Furthermore, beyond simulation, examples described herein can also leverage recorded log data from AVs executing software while being run through a set of scenarios and/or tests in a controlled track environment.

Verification of a software release corresponds to authorization of that software release for use on FAVs without the need for a safety driver. Thus, as described herein, FAVs would only operate using verified software versions, with certain limited exceptions described herein. A software release is verified when a certain confidence level is met (e.g., a 95% confidence that the software release is safer than an average human driver over a certain collection of road miles over nominally equivalent driving conditions). Furthermore, thresholds to achieve verification can be determined or adjusted based on simulation results for pre-certification and/or real-world testing, as described herein. In various examples, a given software release may be AV tested over a variety of driving conditions, or a defined set of conditions (e.g., on test tracks).

Examples described herein may reference software training techniques that correspond to machine learning, neural networks, artificial intelligence, and the like. Certain examples provided herein describe training a new risk regressor or trip classifier. Such training can correspond to supervised or unsupervised machine learning methods to accurately quantify fractional risk for traversing any given path segment based on historical harmful event data and/or close call data from AV logs and other sensor systems (e.g., driver computing devices). Such training can further correspond to supervised or unsupervised machine learning methods to accurately classify a given route—based on an aggregate risk quantity for the route—to determine which vehicle types are capable of servicing the route (e.g., between HDVs, SDAVs, and FAVs) and which software versions are certified for execution to service the route.

Among other benefits, the examples described herein achieve a technical effect of safely expanding autonomous vehicle operations through dynamic risk analysis, trip classification, and robust software verification. According to various examples described herein, the on-demand transportation management system can operate in connection with an AV software training system and on-trip monitoring system to provide on-demand transportation services to requesting users with an objective to perform comprehensive AV software evaluation with high verification standards for execution by FAVs. The multi-pronged approaches described throughout the present disclosure provide beneficial linkages between an existing on-demand transportation service platform involving HDVs, extending that platform to SDAVs, leveraging the safety driver aspect of the SDAVs for AV software testing and verification, and deploying a fleet of FAVs utilizing verified AV software.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the term "autonomous vehicle" (AV) describes any vehicle operating in a state of autonomous control with respect to acceleration, steering, braking, auxiliary controls (e.g., lights and directional signaling), and the like. Different levels of autonomy may exist with respect to AVs. For example, some vehicles may enable autonomous control in limited scenarios, such as on highways. More advanced AVs, such as those described herein, can operate in a variety of traffic environments without any human assistance. Accordingly, an "AV control system" can process sensor data from the AV's sensor array, and modulate acceleration, steering, and braking inputs to safely drive the AV along a given route.

Autonomy Grid

FIG. 1A is an example road network map including a high level mapped and labeled autonomy grid on which AVs can operate. The road network map 100 can identify all roads and paths of a given region (e.g., a metropolitan area), and further indicate the individual lanes of each road on a lower level. The autonomy grid 105 shown in FIG. 1A represents a current, limited road network on which AVs can operate, and can comprise entire road surfaces, or can be lane-specific (e.g., only right lanes for certain road segments). Furthermore, with added ground mapping and/or testing, the autonomy grid 105 can be expanded gradually with an overall goal of encompassing the whole road network of the road network map 100. For example, localization maps can be recorded and processed to expand certain segments of the autonomy grid 105 as AV hardware and software become more robust and capable.

Autonomous Vehicle in Operation

Figure 1B:
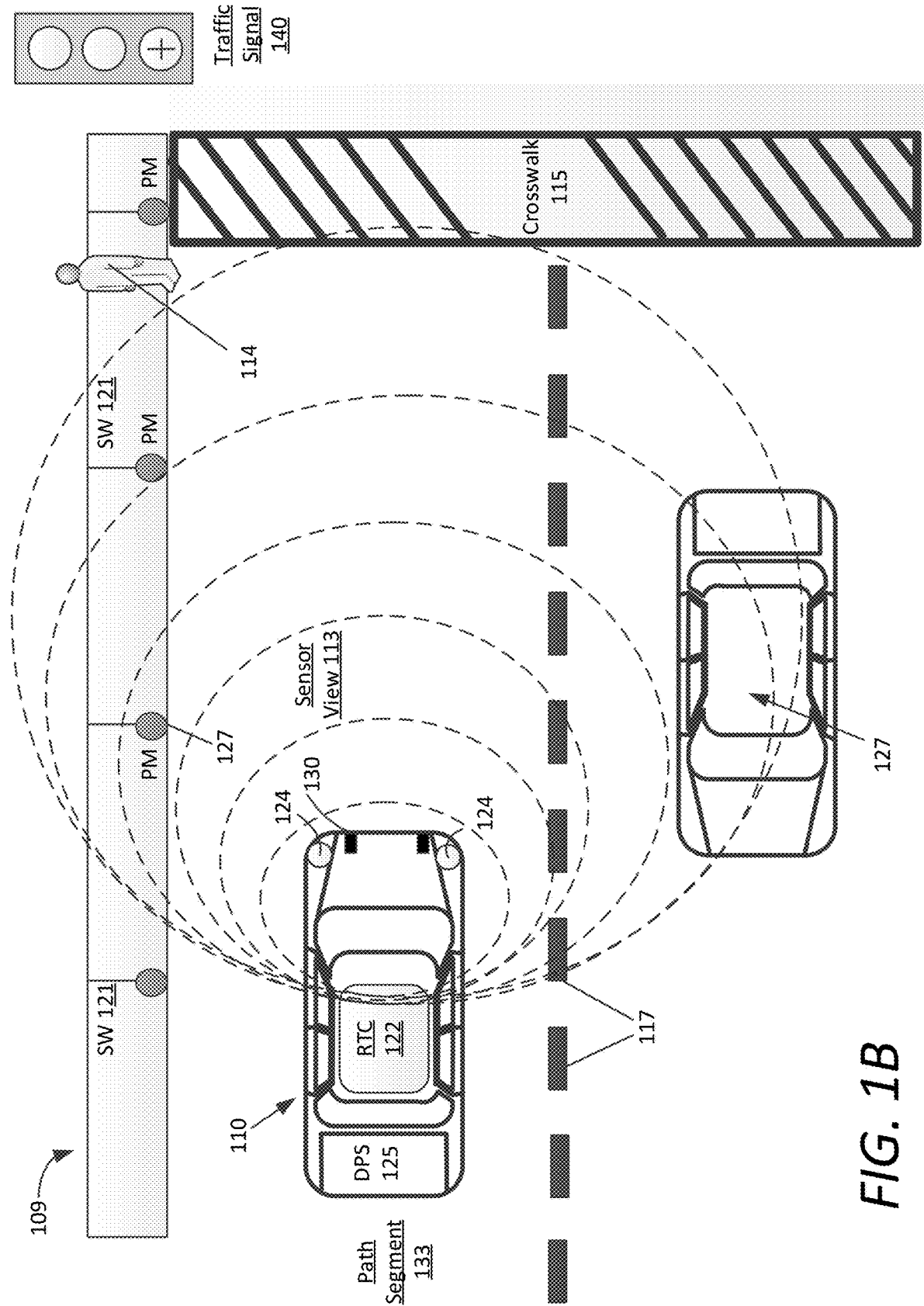
FIG. 1B shows an example of an autonomously controlled self-driving vehicle utilizing sensor data and localization maps to navigate a road segment of an autonomy grid, in accordance with example implementations.

FIG. 1B shows an example of an autonomously controlled self-driving vehicle utilizing sensor data and localization maps to navigate a road segment of an autonomy grid, in accordance with example implementations. In an example of FIG. 1B, the autonomous vehicle (AV) 110 may include various sensors, such as a roof-top camera array (RTC) 122, forward-facing cameras 124 and laser rangefinders 130 (e.g., LIDAR systems). As provided herein, the AV 110 can comprise an SDAV having a safety driver that can take over manual control, or can comprise a FAV having no safety driver or manual control capabilities. In certain aspects, an FAV may be manually overridden remotely (e.g., by a remote assistance operator).

In some aspects, a data processing system 125, comprising a computer stack that includes a combination of one or more processors, FPGAs, and/or memory units, can be positioned in the cargo space of the AV 110. The data processing system 125 can store a set of localization maps, or submaps having labeled static ground truth data, that the AV 110 references when traverse sequential path segments to dynamically compare with a live sensor view 113 of the AV 110 to detect and classify dynamic objects, such as pedestrians 114 or other vehicles 127. Examples of labeled static objects can include parking meters 127, traffic signals 140, crosswalks 115 and/or sidewalks 121.

According to an example, the AV 110 processes the live sensor view 113 (e.g., a stereoscopic or three-dimensional LIDAR image of the environment 109) to scan a current path segment 133 on which the AV 110 traverses. The AV 110 can process image data or sensor data, corresponding to the sensor view 113 from a set of on-board sensors in-order to detect dynamic objects that are, or may potentially be, in the path of the AV 110. In an example shown, the dynamic objects include a pedestrian 114 and another vehicle 127—each of which may potentially cross into a road segment along which the AV 110 traverses. The AV 110 can analyze a current localization map to and/or image data from the sensor views 113 reference information about the path segment 133, such as identifying the divider 117, the opposite lane, sidewalks 121, sidewalk structures such as parking meters 127 and road signs, traffic signals 140, bike lanes, crosswalks 115, lane boundary markers, and localization markers, such as buildings, trees, and other unique structures.

The data processing system 125 of the AV 110 may run one or more software versions to process the sensor view 113 and generate control inputs accordingly, such as acceleration, braking, and steering inputs. The sensor view 113 may comprise three-dimensional sensor images that combine sensor data from the roof-top camera array 122, front-facing cameras 124, and/or laser rangefinders 130 (e.g., LIDAR sensors). Certain software versions may be fully verified for safe and reliable use by fully autonomous vehicles, such as vehicles having level 4 or level 5 autonomy. Other software versions can be executed by the AV 110 in limited circumstances, or can have a verification in-progress status while the AV 110 logs verification mileage using the new software version. As described in detail below, the AV 110 can be network-connected, and can communicate with a backend, on-demand transportation management system that can transmit routing instructions to the AV 110 in-connection with an on-demand transportation service, such as package delivery or human transport. In certain implementations, the AV 110 may be instructed to switch between software versions between trips or dynamically in accordance with on-trip monitoring system described herein.

The AV 110 shown in FIG. 1B may comprise a safety-driven autonomous vehicle (SDAV) having a dedicated human safety driver ready to take over manual control of the AV 110, or a fully autonomous vehicle (FAV) capable of autonomous operation without a safety driver. For SDAV implementations, the AV 110 can operate in an autonomous mode in which the data processing system 125 takes over control of the AV's control mechanisms, and a manual mode in which the safety driver takes over control. In some aspects, the safety driver can take over control temporarily to make a swift correction, such as braking for a partially hidden stop sign or accelerating and steering if the AV 110 is in a stuck state. For FAV implementations, the AV 100 need not include driver features, such as accelerator and brake pedals, or even a steering wheel.

System Descriptions

Figure 2:
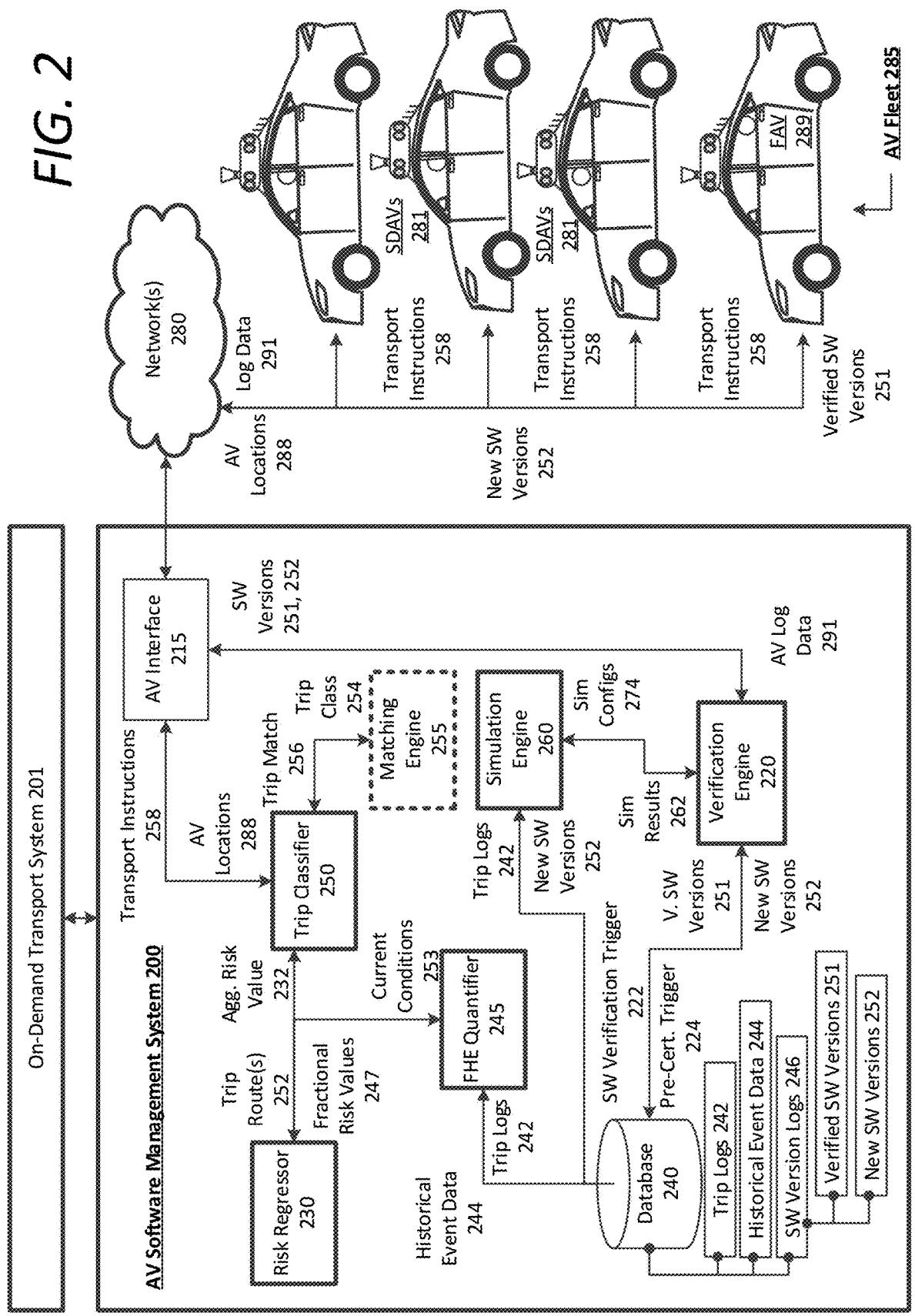
FIG. 2 is a block diagram illustrating an example AV software training system utilized in-connection with an AV fleet and an on-demand transportation management system.

FIG. 2 is a block diagram illustrating an example AV software management system utilized in-connection with an AV fleet and an on-demand transportation management system. In the below discussions of FIGS. 2 through 6, reference is made to logical blocks representing the functional aspects of software, hardware, or a combination of software executing on hardware, such as a remote datacenter. In various examples, the AV software management system 200 may be used to, for example, train a new risk regressor 230, train a new trip classifier 250, or verify a new software version 252 being run on SDAVs 281 of an AV fleet 285. The AV software management system 200 can comprise a database 240 storing trip log data 242, historical event data 244, and software version logs 246 that include verified software versions 251 and new, or in-progress, software versions 242. As an example, AV software engineers can develop new software versions 252 for execution by the AV fleet 285. The AV software management system 200 can include a software verification engine 220, which can distribute the new software versions 252 to SDAVs 281 and/or FAVs 289 operating within a given region. In various examples, the verification engine 220 can further distribute verified software versions 251 to the SDAVs 281 and/or FAVs 289 throughout the given region.

According to various examples, the AV software management system 200 can include an AV interface 215 that connects the AV software management system 200 to one or more networks 280. Accordingly, the AV software management system 200 can remotely communicate with the SDAVs 281 and the FAVs 289 operating throughout the given region. For example, the verification engine 220 can distribute the new software versions 252 and the verified software versions 251 to the SDAVs 281 and FAVs 289 over the one or more networks 280. Furthermore, the AV interface 215 can receive AV location data 288 and AV log data 291 from each of the SDAVs 281 and FAVs 289.

A new or test software version 252 can comprise an update to any manner in which an AV operates. The new software versions 252 can include updates to the manner in which the AV interprets or responds to sensor data (e.g., perception or object prediction updates), can correspond to hardware updates and/or sensor configurations on the AV, or can correspond to localization map updates. In one example, a new software version 252 that simplifies sensor data processing, requiring less computing power, can be distributed to SDAVs 281 to determine whether the new software version 252 is safe and reliable enough for normal use on FAVs 289. As another example, certain SDAVs 281 can operate with streamlined hardware configurations (e.g., less sensor equipment and/or less computational hardware). A new software version 252 can be configured for AV operation using the streamlined hardware configurations of these specific SDAVs 281. This new software version 252 may then be distributed to those specific SDAVs 281 in order to log mileage in varying conditions for verification, as described herein.

In certain implementations, each new software version 252 can correspond to a specified risk regressor 230 and a specified trip classifier 250 of the AV software management system 200. The risk regressor 230 can be trained to aggregate fractional risk quantities across routes to determine an aggregate risk value 232 for a particular trip. For example, a requesting user can make an on-demand transportation request to transport the requesting user from a pick-up location to a destination. In various examples described throughout the present disclosure, the transport requests can be handled by the on-demand transport system 201, which can determine an optimal route between the pick-up location and the destination (e.g., a shortest route in terms of distance or time). In some examples, the on-demand transport system 201 can determine a plurality of possible routes, and the risk regressor 230 can determine an aggregate risk value 232 for each of the plurality of possible routes.

In various implementations, the AV software management system 200 can include a fractional harmful event quantifier 245 that can computationally analyze historical event data 244 for the given region, such as vehicle incidents and collisions, to determine a fractional risk value 247 for each path segment of the given region. In further implementations, the fractional harmful event quantifier 245 can also parse through trip logs 242 from the SDAVs 281 and FAVs 289 operating throughout the given region to identify trip anomalies, such as harmful events and close calls, to further factor into the fractional risk values 247. As provided herein, a harmful event can correspond to physical contact between an AV and another object, such as another vehicle, a curb, a road sign, a pedestrian, and the like. A close call can correspond to any scenario in which a certain risk threshold has been exceeded. For example, a close call can be identified as spikes in accelerometer data in the trip logs 242, which can correspond to hard braking events or swerving events. In other examples, close calls can correspond to the AV inadvertently breaching an exclusion zone, such as a crosswalk, an intersection, or getting too close to a pedestrian or other vehicle. Such close calls can be identified by the fractional harmful event quantifier 245 in, for example, the live sensor data within the trip logs 242.

Accordingly, for each path segment of the autonomy grid 105, the fractional harmful event quantifier 245 can compute a fractional risk value 247 for traversing the path segment. As provided herein, the fractional risk values 247 can be specific to AVs or generalized for all vehicles operating within the autonomy grid 105. Additionally or alternatively, the fractional risk values 247 can be specific to a particular software version (e.g., a new software version 252 or verified software version 251) executing on the SDAVs 281 and FAVs 289. Additionally or alternatively still, the fractional risk values 247 may be condition-specific. For example, each harmful event or close call can be correlated with a set of current conditions at the time of the event or close call. This set of current conditions can include lighting conditions, weather conditions (e.g., precipitation or fog), road conditions (e.g., wet, icy, dry, or drying), traffic conditions (e.g., other vehicles and/or pedestrian traffic), a time of day or time of week, and the like. As described below, for a given trip route 252, the current conditions 253 for the trip route 252 can be compared to the condition-depend fractional risk values 247 for the risk regressor 230 to ultimately determine the aggregate risk value 232 for the resultant trip.

The fractional harmful event quantifier 245 can receive data indicating the current conditions 253 from the AV log data 291 (e.g., sensor data showing the weather and road conditions), or any number of third party resources (e.g., a live weather resource, live traffic resources, etc.).

In various examples, the AV software management system 200 can include a simulation engine 260 that can run a new software version 252 through an initial set of simulations for pre-certification of the new software version 252 prior to distribution to the SDAVs 281. As provided herein, simulation-based pre-certification corresponds to either a confirmation that the new software version 252 meets certain safety standards for execution on SDAVs 281 and/or FAVs 289. For example, the simulation engine 260 can generate a forward simulation for a new software version 252 using recorded trip logs 242 and/or simulation configurations 274, which can be configured by human engineers or automatically by the verification engine 220. In the forward simulation, the simulation engine 260 can replay any number of trip logs 242 using the new software version 252 to verify that the various responses executed by the new software version 252 (e.g., acceleration, braking, steering, and/or signaling inputs) are safe enough to initiate the verification process. As such, the simulated AV—executing the new software version 252—is not confined by the recorded trip log 242, but can rather execute its own low level trajectories accordingly.

In certain examples, the simulation engine 260 can further execute plan-based evaluation of the new software version 252 by confining the new software version 252 to the recorded trip log 242 without enabling free execution of vehicle trajectories. In further examples, the simulation engine 260 can adjust parameters of the simulation based on the simulation configurations 274, and can thus simulate AV failures (e.g., sensor failures or mechanical failures), sensor data occlusions, additional entities (e.g., simulated vehicles, objects, or pedestrians), and the like. The simulation engine 220 output a set of simulation results 262 to the verification engine 220 that either pre-certifies the new software version 252 or indicates that the new software version 252 requires further refinement.

In certain aspects, when the simulation results 262 indicate that the new software version 252 is pre-certified, the verification engine 220 can generate a pre-certification trigger 224 to label the new software version 252 as being certified for distribution to the SDAVs 281 and/or FAVs 289 for real-world testing and safety verification. Once pre-certified by the simulation engine 260, the verification engine 220 can distribute the new software version 252 to the SDAVs 281 and/or FAVs 289, which can execute the new software version 252 selectively. In one example, the SDAVs 280 and/or FAVs 289 can independently begin executing the new software version 252 throughout the autonomy grid 105. In variations, the SDAVs 281 and/or FAVs 289 can be triggered to execute the new software version 252 via transport instructions 258 from a trip classifier 250, as described herein.

In various implementations, the AV software management system 200 can train a trip classifier 250 for the new software version 252. For example, the trip classifier 250 can coordinate with the on-demand transport system 201 to classify a requested trip between a pick-up location and a destination. In doing so, the trip classifier 250 can receive an aggregate risk value 232 for an optimal trip route 252 between the pick-up location and the destination as calculated by the risk regressor 230. As described herein, the aggregate risk value 232 can account for such factors as lane geometry, path segment complexity (e.g., bicycle lanes, intersections, crosswalks, school zones, road signage, etc.), current environmental conditions, time of day, and traffic conditions. Based on the aggregate risk value 232, the trip classifier 250 can determine (i) which vehicles types may service the transport request (i.e., SDAVs 281, FAVs 289, or HDVs), and (ii) which software version or version type is to be executed for the trip (e.g., a new versus a verified software version). As such, the trip classifier 250 can operate in accordance with a set of risk thresholds that determine whether the use of a particular software version 251, 252 is authorized given the aggregate risk value 232.

Accordingly, given a transport request from a requesting user, the on-demand transport system 201 can provide the trip classifier 250 with an ideal route 252 for the trip. In variations, the on-demand transport system 201 can further provide a set of routes 252 for the trip. In such variations, the risk regressor 230 can provide an aggregate risk value 232 for each of the trip routes 252, and the trip classifier 250 can classify the trip for each of the routes 252. As an example, for a given trip route 252, the trip classifier 250 can authorize the use of a new software version 281 for execution on SDAVs 281 based on the aggregate risk value 232. In further examples, the trip classifier 250 can authorize the use of a set of software versions 251, 252 for a given trip route 252. Accordingly, the output of the trip classifier 250 can comprise a trip classification 254, which can include a set of software versions authorized for execution for servicing the trip. In one example, the trip classifier 250 can further act as a filter for any candidate set of vehicles within a certain proximity of a requesting user.

The trip classifier 250 may then transmit the trip classification 254 to a matching engine 255 of the on-demand transport system 201. The matching engine 255 shown in FIG. 2 comprises a functional block of the on-demand transport management system 201, and thus is shown as a dashed block in FIG. 2. As described in detail below, the matching engine 255 can utilize the trip classification 254 to filter through a candidate set of vehicles for the transport request, and select an optimal vehicle to ultimately service the transport request. As described herein, the matching engine 255 can make the selection based on a variety of factors, including the aggregate risk value 232, estimated time to rendezvous with the requesting user (e.g., based on distance and traffic), estimated revenue for the vehicle, and the like. Accordingly, the matching engine 255 can return a trip match 256 identifying a selected vehicle to service the transport request.

Based on the trip match 256, the trip classifier 250 or the matching engine 255 can generate a set of transport instructions 258 to transmit to the selected vehicle. If the selected vehicle is an HDV, the transport instructions 258 can comprise an invitation to the driver to service the transport request, as described below. However, if the selected vehicle is an SDAV 281, the transport instructions 258 can include routing information for rendezvousing with the requesting user and transporting the user to the destination, and one or more specific software versions to execute in servicing the transport request. In one aspect, the transport instructions 258 can parse out the trip into segments, where the SDAV 281 is to execute a different software version for each segment (e.g., a verified software version 251 for a more risky segment, and a new software version 252 for a less risky segment).

The SDAVs 281 and FAVs 289 can transmit or stream log data 291 back to the AV software management system 200. The log data 291 can comprise live or recorded sensor data (e.g., image data, stereoscopic camera data, LIDAR data, radar data), telemetry data (e.g., indicating the vehicle's position, orientation, velocity, current route plan, current trajectory, etc.), diagnostics data (e.g., indicating the vehicle's tire pressures, engine temperature, fuel or energy level, and faults or failures in the sensor, hardware, or mechanical components of the vehicle), and/or input data indicating the AV control system acceleration, braking, and steering input responses. The log data 291 can further include correlation data indicating which software version(s) were in use during operation or collection of the recorded or streamed data.

The log data 291 can be processed by the verification engine 220 to determine whether a new software version 252 can be verified for full autonomous usage by the FAVs 289. In various examples, the verification engine 220 can verify the new software versions 252 in accordance with a safety standard, which can be a regulated government standard or a proprietary standard of the on-demand transport system 201. For example, the safety standard can correspond to a confidence level (e.g., 98% certainty) that the new software version is safer than an average human driver in a defined set of conditions. These conditions can comprise nominal conditions in terms of traffic, visibility, weather, and road conditions. In variations, a new software version 252 may incorporate safety updates for the AV to operate in inclement weather, at nighttime, in heavy traffic, etc. Accordingly, in order to achieve the mandated confidence level, the new software version 252 must be run for a certain mileage without experiencing a harmful event or close call (e.g., on the order of millions of miles). However, as described herein, pre-certification of the new software version 252 by the simulation engine 260 may cut down on overall necessary mileage for verification.

When the AV log data 291 from the SDAVs 281 indicates that a new software version 252 has logged a requisite mileage—achieving the predetermined confidence threshold that the new software version 252 meets a defined set of safety standards (e.g., 95% confidence that the AV software version 252 is safer that the average human driver)—the verification engine 220 can generate a software verification trigger 222 for the new software version 252 indicating that the new software version 252 is verified for execution on FAVs 289. The trigger 222 can relabel the new software version 252 as a verified software version 251, and the verification engine 220 may then distribute the newly verified software version 251 accordingly. For example, the verification engine 220 can distribute the verified software version 251 to all FAVs 289, or certain SDAVs 281 and/or FAVs 289 meeting a set of standards corresponding to the verified software version 251. In certain aspects, this set of standards can comprise a set of hardware standards (e.g., necessary sensor and/or computational equipment), and/or a set of mechanical standards (e.g., necessary mechanical equipment, such as a certain type of tire or suspension, flight capability, float capability, submersible capability, minimum road clearance, etc.). Accordingly, the verification engine 220 can selectively distribute the verified software version 252 to only those FAVs 289 and/or SDAVs 281 that meet the set of standards of the software version 252.

Figure 3:
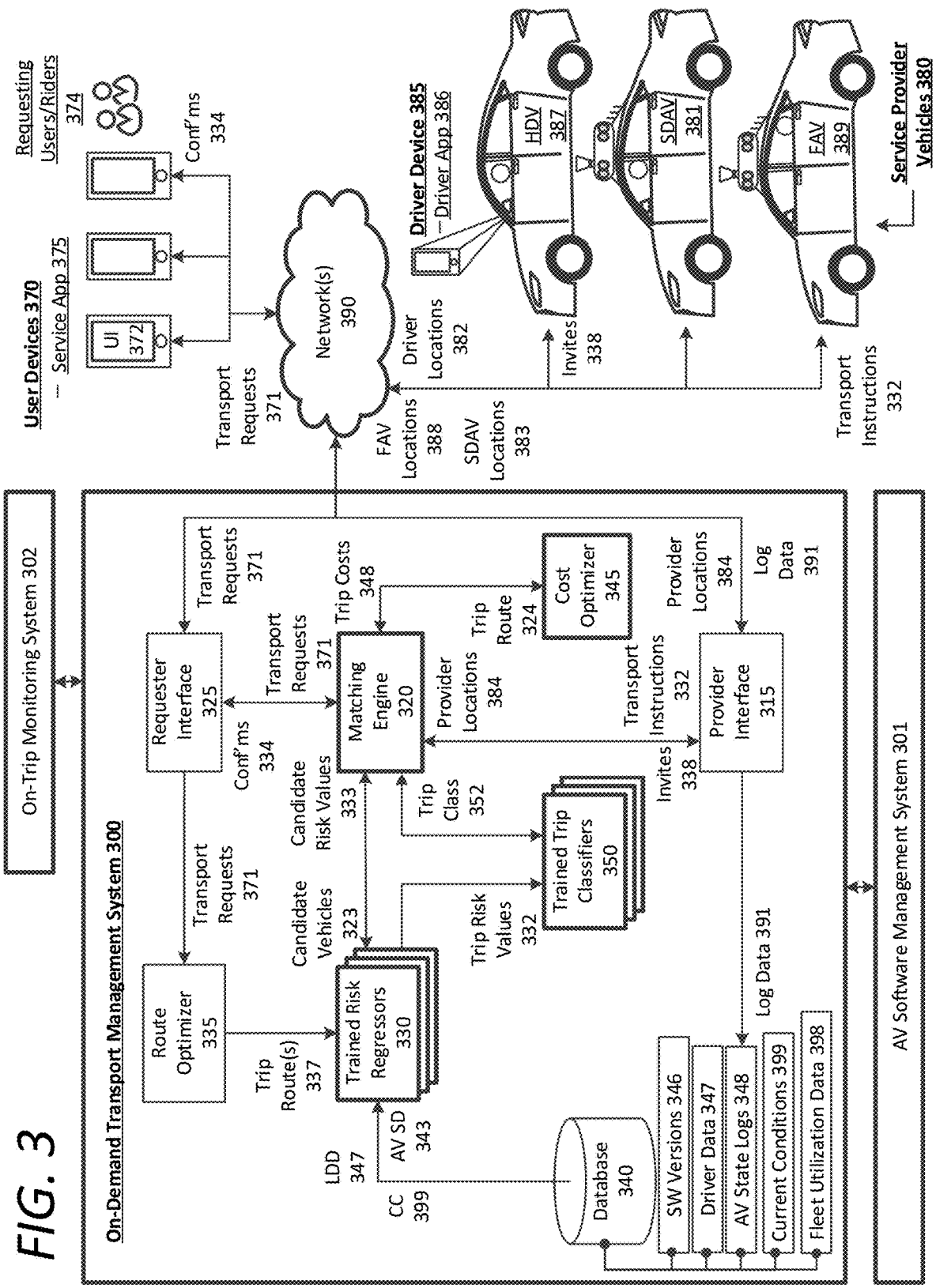
FIG. 3 is a block diagram illustrating an example on-demand transportation management system linking available service provider vehicles with requesting users within a given region.

FIG. 3 is a block diagram illustrating an example on-demand transportation management system linking available service provider vehicles with requesting users within a given region. The on-demand transport management system 300 can communicate, over one or more networks 390, with requesting users or riders 374 throughout a given region where on-demand transportation services are provided. Specifically, each requesting user 374 can execute a service application 375 on the user's 374 computing device 370. As provided herein, the user's computing device 370 can comprise a mobile computing device, personal computer, tablet computing device, virtual reality (VR) or augmented reality (AR) headset, and the like. Execution of the service application 375 can cause the user device 370 to establish a connection over the one or more networks 390 with a requester interface 325 of the on-demand transport management system 300.

In various aspects, the execution of the service application 375 can cause a user interface 372 to be generated on a display screen of the userdevice 370. Using the user interface 372, the requesting user 374 can generate and transmit a transport request 371 to the requester interface 325 of the transport system 300. In generating the transport request 371, the requesting user 374 can input a desired pick-up location, destination, and/or ride service. As provided herein, selectable ride services facilitated by the on-demand transport system 300 include carpooling, standard ride-sharing, high-capacity vehicle (e.g., a van), luxury vehicle, a professional driver, AV transport, freight, package, or food delivery services, or certain combinations of the foregoing.

According to examples, the on-demand transport management system 300 can include a provider interface 315 that connects, via the one or more networks 390, with a fleet of transportation service provider vehicles 380 available to provide on-demand transportation services to the requesting users 374. In various examples, the service provider vehicles 380 can comprise a fleet of FAVs 389, any number of drivers driving HDVs 387, and safety-driven autonomous vehicles (SDAVs) 381. In certain aspects, the human-driven vehicles 387 can also operate to provide transportation services at will, where the driver can execute a driver application 386 on a driver device 385 (e.g., a mobile computing device, smart phone, tablet computing device, etc.), causing the driver device 385 to transmit provider location data 382 indicating the driver's location to the provider interface 315. The executing driver application 386 can enable the driver of the HDV 387 to receive transport invitations 338 indicating a pick-up location to rendezvous with a matched requesting user 374 to service a given transport request 371.

Likewise, any given SDAV 381 and FAV 389 in the fleet can transmit its current SDAV location 383 and FAV location 388 respectively to the provider interface 315 of the on-demand transport management system 300. As provided herein, the SDAV locations 383, FAV locations 388, and driver locations 382 are collectively referred to as "provider locations 384" of the service provider vehicles 380. The provider interface 315 can transmit the provider locations 384 to a matching engine 320 of the transport system 300. As further provided herein, the matching engine 320 of FIG. 3 can correspond to the matching engine 255 shown in FIG. 2.

The matching engine 330 can receive the transport requests 371 from the requester interface 325, which can include respective pickup locations or current locations of the requesting users 374. Based on the provider locations 384, and using map data and/or traffic data, the matching engine 330 can identify a set of candidate vehicles 323 to service the transport request 371 (e.g., based on distance or time to a given pick-up location). In doing so, the matching engine 320 can identify vehicles proximate to the pickup location indicated in the transport request 371, and determine the set of candidate vehicles based on the vehicles being a predetermined distance or estimated time from the pickup location indicated in the transport request 371.

As provided herein, the matching engine 320 can further utilize a cost optimizer 345 in determining a most optimal vehicle to service a given transport request 371. For example, once a transport request 371 is received, the matching engine 320 can initially utilize the current location of the requesting user 374 to determine a candidate set of vehicles 323 within a certain distance or time from the user's location. In some aspects, the candidate set of vehicles 323 can include a blend of HDVs 387, SDAVs 381, and/or FAVs 389 operating throughout the autonomy grid 105 and the given region in general. The cost optimizer 345 can generate an estimated trip cost or revenue 348 for each vehicle in the candidate set 323 based on the trip route 324. The determined cost or revenue 348 can further be based on a distance and/or estimated time for the overall trip between the pick-up location and the desired destination, the ride service type (e.g., luxury vehicle, high capacity vehicle, carpool, etc.), usage cost (e.g., fuel or power use, on-board service features, network access, etc.). In various examples, the determined cost can further be based on a selected ride service type by the user 374 (e.g., carpool), or can be optimized across multiple services.

In further implementations, the matching engine 320 can select a most optimal vehicle based on trip classification 352 as determined by a trained trip classifier 350, which can filter out certain candidate vehicles 323 based on trip risk values 332 as determined by a trained risk regressor 330. Specifically, when a transport request 371 is received by the requester interface 325, a route optimizer 335 of the on-demand transport management system 300 can process the transport request 371 to determine one or more optimal trip routes 337. In some aspects, the on-demand transport management system 300 can run a set of trained risk regressors 330 to determine respective aggregate trip risk values 332 for each of the trip routes 337. In doing so, each of the risk regressors 330 can determine a current set of conditions 399, which can include road conditions, weather conditions, lighting conditions, traffic conditions, and the like. Based on the nature of the trip route 337 and the current conditions 399, the risk regressor 330 can determine the trip risk value 332 for each trip route 337.

In certain implementations, each trip risk value 332 can be specific to the utilization of a specific software version 346 for the trip route 337. In this manner, a single risk regressor 330 and trip classifier 350 combination may be specific to a single software version 346, where the risk regressor 330 determines the trip risk value 332 for a trip route 337 by an AV 381, 389 using the software version 346, and the trip classifier 350 ultimately determines whether an FAV 389, SDAV 381, or an HDV 387 can service the trip based on the trip risk value 332. Accordingly, for each received trip route 337 corresponding to a transport request 371, a trip risk value 332 can be determined for each software version 346 aggregated over the entire trip route 337. The trip classifier 350 may then determine which vehicles can service the request 371 based on the risk value 332. This determination, represented by the trip classification 352, can indicate that the risk value 332 is too high to use any of the software versions 346, and therefore only HDVs 387 can service the transport request 371. In other scenarios, such as in low traffic conditions late at night, the SDAVs 381 and FAVs 389 may be advantageous over human drivers, who are typically more dangerous on the road due to various factors, such as lack of visibility, drowsiness, impaired driving, etc. Accordingly, the trip classifier 350 or matching engine 320 may also weigh human driving risk against the risk values 332 from the risk regressor 330.

As described herein, the software version 346 may be verified or unverified. The trip classifier 350 can establish a set of risk thresholds for utilizing the software version by either an SDAV 381 or an FAV 389. For verified software versions 346, the set of risk thresholds can comprise use of the verified software version 346 by (i) an SDAV 381 as a first risk threshold, or (ii) both FAVs 389 and SDAVs 381 as a second risk threshold. For new, or unverified software versions 346, the set of risk thresholds can comprise use of the unverified software version 346 by (i) SDAVs 381 for logging verification mileage, or (ii) SDAVs 381 but excluded for verification mileage (e.g., used instead to aid in training a new trip classifier 350). In any scenario, if the risk value 332 is above all risk thresholds, then only HDVs 387 are available to service the transport request 371.

Conversely, if the trip risk value 332 is below all thresholds for a verified software version 346, then the trip classifier 350 can enable all vehicles types (HDVs 387, SDAVs 381, and FAVs 389) to service the transport request 371. Likewise, if the trip risk value 332 is below all thresholds for an unverified software version 346, then the trip classifier 350 can enable HDVs 387 and SDAVs 381 to service the transport request 371, as well can authorizing the use of the unverified software version 346 for either logging verification mileage or excluding the trip from a logged verification set. As further examples, if the software version 346 is unverified, the trip classifier 350 can enable use of SDAVs 381 executing the unverified software version 346 to log mileage for verification based on the trip risk value 332 being below a certain threshold. Accordingly, the trip classifier 350 can enable the SDAVs 381 having the unverified software version 346 to service the transport request 371. Likewise, if the software version 346 is verified, then the trip risk value 332 can enable the use of the verified software version 346 on SDAVs 381 and/or FAVs 389. In any case, the matching engine 320 will ultimately select an optimal vehicle to service the transport request 371 across those vehicles authorized by the trip classifier(s) 350, and other factors such as estimated trip cost or revenue 348, and estimated distance or time of the vehicle from the pick-up location.

The output from the trip classifiers 350 for any given trip route 337 can comprise a trip classification 352 that identifies the vehicle types authorized to service the transport request 371 along the route 337, and the specifics regarding execution of the software version 346 (e.g., whether it is to be utilized for verification mileage). Thus, for a single trip route 337, a risk regressor 330 can determine an aggregate risk value 332 for the route 337 given the current conditions 399. The trip classifier 350 may then determine which vehicle types may service the trip route 337 based on the risk value 332, and whether the software version 346 may be utilized in a verification set or for testing or software training (e.g., a new risk regressor or trip classifier of the software training system 301, such as the software management system 300 of FIG. 2). For this single trip route 337, the matching engine 320 may then select a most optimal vehicle from the candidate vehicles 323 based on the trip classification 352 from the trip classifier 350.

Cumulatively, the trip classifications 352 from all trip classifiers 350 can encompass every software version 346 as well as every potential trip route 337 for a given transport request 371. In certain implementations, in addition to weighing the expected cost or revenue 348 and estimated time, the matching engine 320 can also hierarchically decide which vehicle to service the transport request 371 based on whether the software version 346 is verified or unverified and/or whether an unverified software version 346 may be executed for verification mileage. In one example, the matching engine 320 can prioritize unverified software versions 346 that have been authorized by the trip classifier 350 for verification mileage by the SDAVs 381. Thus, as an example, given a candidate set of vehicles 323, the matching engine 320 can favor SDAVs 381 in the candidate set 323 that include unverified software versions 346 authorized by the trip classifiers 350 for logging verification mileage. This enables more rapid software verification, and hence swifter implementation by FAVs 389.

Along these lines, the trip classification 352 can act as a filter of the candidate set of vehicles 323 for the matching engine 320. Accordingly, given a candidate set of vehicles 323 within a certain proximity of the pick-up location indicated in the transport request 371, the trip classifications 352 can filter out vehicles and software versions 346 whose risk thresholds do not meet the trip risk value 332 for the trip route 337. Of the remaining vehicles in the candidate set 323, the matching engine 320 can base the ultimate selection on one or more additional factors, such as estimated time of arrival to the pick-up location and/or trip cost or expected revenue 348. If the most optimal vehicle is an HDV 387, the matching engine 320 can generate a transport invitation 338 to the driver device 385 of the HDV 387, and the driver can either accept or decline the invitation 338. If the most optimal vehicle is an SDAV 381 or an FAV 389, then the matching engine 320 can transmit a set of transport instructions 332 to the SDAV 381 or FAV 389 indicating the software version 346 for execution and trip information (e.g., pick-up location and destination). In any case, the matching engine 320 may then provide a confirmation 334 to the requesting user 374 indicating identifying information for the matched vehicle.

In various examples, the on-demand transport management system 300 can receive data log data 391 from the SDAVs 381 and the FAVs 389, and store the log data 391 in a set of AV state logs 348. The AV state logs 348 can include—per vehicle—diagnostics and telemetry information, live or recorded sensor data, and other data indicating a degradation level of the AV. In addition, the database 340 can store live driver data 347 that indicates—per driver—the number of hours that the driver has been on-duty and the driver's profile information, which can indicate preferred driving areas, driver rating, an incident log (e.g., indicating any collisions, accidents, or altercations of the driver), and/or the driving habits or characteristics of the driver. In further examples, the database can also store fleet utilization data 398 collected over time and indicating the most optimal use of the different vehicle types and software for matching vehicles with the requesting users 374. For example, the fleet utilization data 398 can indicate areas within the given region in which HDVs 387 are more optimally utilized over SDAVs 381 or FAVs 389 (e.g., in terms of risk, revenue generated, or an optimization between risk and revenue). Conversely, the fleet utilization data 398 can indicate areas or locations within the given region where SDAVs 381 and/or FAVs 389 are most optimally utilized. Based on the fleet utilization data 398, the on-demand transport management system 300 can effectively move vehicle supplies through trip classification and matching techniques described herein in order to efficiently utilize the fleet of service provider vehicles 380 at any given time. In one example, the on-demand transportation management system 300 can do so by establishing a set of selection priorities based on the fleet utilization data 398 to move individual vehicles (e.g., through trip matching operations) to their most optimal areas and locations.

According to certain implementations, a specialized risk regressor 330 can determine a generalized aggregate risk for a given trip route 337 and then determine individual risk values for the trip route 337 for each vehicle in a candidate set of vehicles 323. In such implementations, the risk regressor 330 can receive the candidate set of vehicles 323 from the matching engine 320. For each vehicle, the risk regressor 330 can determine a risk score for servicing the transport request 371. For example, the risk regressor 330 can lookup AV state data 343 and/or the live driver data 347 for each vehicle to output a set of candidate risk values 333 to the matching engine 320.

For a driver, the risk regressor 330 can determine the individual risk value 333 for the driver based on, for example, how long the driver has been on-duty and the current and/or historical driving characteristics of the driver (e.g., aggressive, fast, slow, gentle, normal). In determining the current or historical driving characteristics of the driver, the on-demand transport management system 300 can receive accelerometer data or inertial measurement unit (IMU) data (e.g., gyroscope data, magnetometer data, and accelerometer data) from the driver's vehicle or the driver's computing device 385 (e.g., via access to the device 385 through the driver app 386). The accelerometer or IMU data can indicate hard braking, steering, and acceleration events that the risk regressor 330 can generalize into the driver's driving style and weigh into the driver's individual risk score 333. In addition or alternatively, the on-demand transport management system can further receive GPS data, image or video data, and/or audio data from a microphone of the driver device 385 or vehicle hardware to determine the individual risk value 333.

Accordingly, when the candidate set of vehicles 323 only includes HDVs 387, the ultimate selection by the matching engine 320 can be heavily weighted towards the individual risk value 333 of the drivers of those HDVs 387. This individualized risk assessment for drivers can enable the on-demand transport management system 300 to also provide notifications to the drivers, either praising the driver for excellent, low-risk driving, suggesting that the driver take a break, or cautioning the driver to drive less aggressively. Such notifications can be provided to the drivers via the driver app 386 executing on the driver's computing device 385.

For SDAVs 381, the risk regressor 330 can weigh the fact that the SDAV 381 has a safety driver in case autonomous control fails. For both SDAVs 381 and FAVs 389, the risk regressor 330 can determine a degradation level of the vehicle. The degradation level can include factors such as outdated or older sensors and hardware, older software versions, calibration faults for the vehicle's sensors (e.g., misaligned LIDAR), faulty sensors (e.g., debris or grime on a camera lens), diagnostic faults or failures, and the like. Based on the degradation level of the vehicle, and the generalized aggregate risk value 332 for the route, the risk regressor 330 can determine an individual risk value 333 for the SDAV 381 or FAV 389.

Accordingly, the matching engine 320 can make a final selection of a vehicle based on each of the trip classifications 352, expected cost or revenue 348, individual risk value 333, and the estimated time of arrival to the pick-up location. Once the vehicle has been selected to service the transport request 371, and the transport instructions 332 or the transport invitations 338 have been accepted, the on-demand transport management system 300 can hand over trip monitoring to an on-trip monitoring system 302, as described below with respect to FIG. 4.

Figure 4:
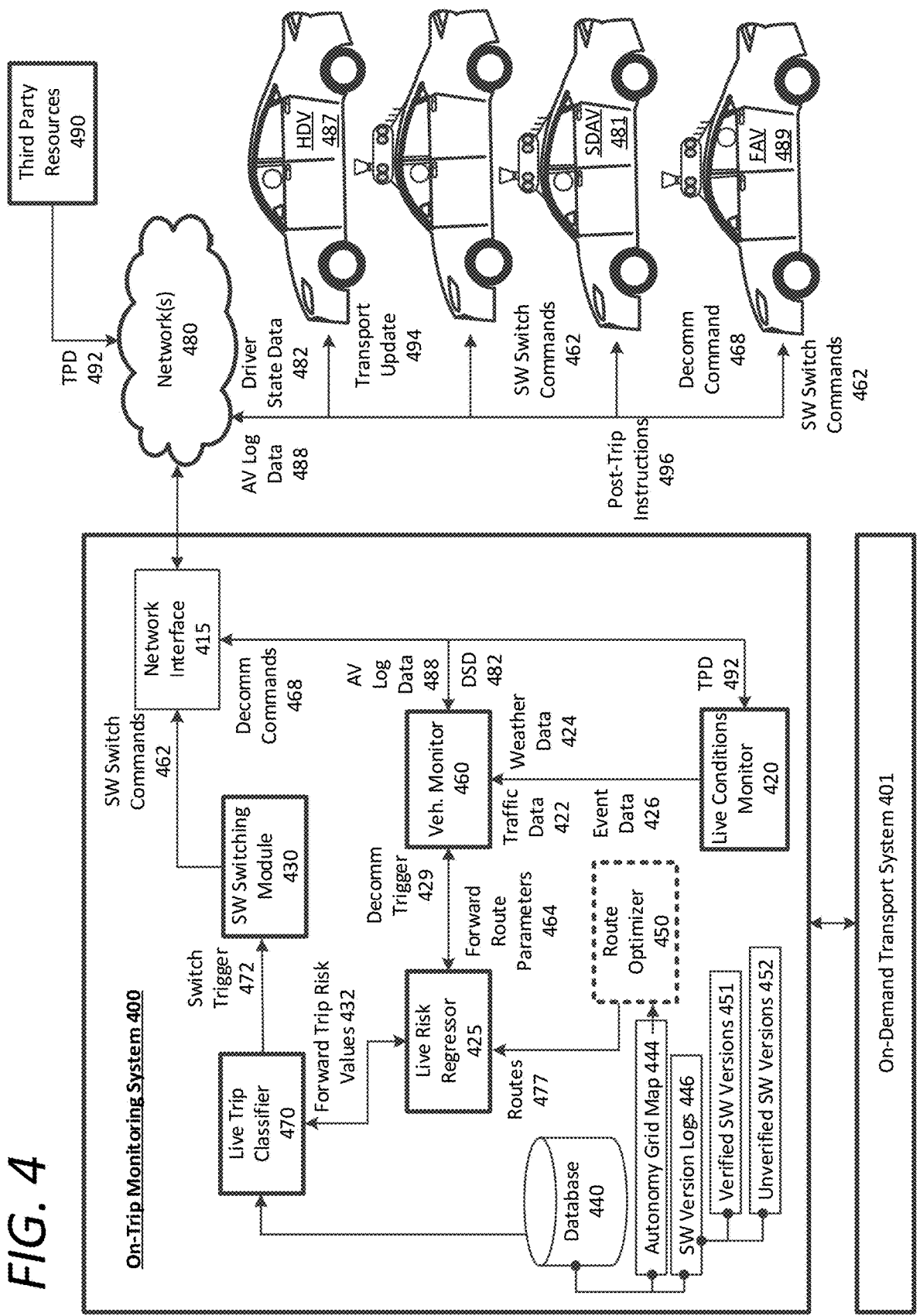
FIG. 4 is a block diagram illustrating an example on-trip monitoring system utilized in-connection with an on-demand transportation management system.

FIG. 4 is a block diagram illustrating an example on-trip monitoring system utilized in-connection with an on-demand transportation management system. Once a driver or AV have been matched, the on-demand transport system 401 (e.g., the on-demand transportation management system 300 of FIG. 3) can notify the on-trip monitoring system 400 of the pairing. The on-trip monitoring system 400 can include network interface 415 that can connect with operating SDAVs 481 and FAVs 489 through one or more networks 480. In addition, the network interface 415 can also access any number of third party resources 490 over the one or more networks 480 to receive third party data 492 that can indicate the current conditions across an autonomy grid map 444 of the given region. For example, the on-trip monitoring system 400 can include a live conditions monitor 420 that can access the third party data 492 to determine current traffic data 422, live weather data 424, and/or event data 426 for the given region (e.g., parades, protests, bicycle or running races, gatherings, and the like).

The on-trip monitoring system 400 can further include a vehicle monitor 460 that can receive AV log data 488 streamed or periodically transmitted from the SDAVs 481 and the FAVs 489. The AV log data 488 can include live telemetry and diagnostics data, live sensor data streams, and data indicating the AV's planned trajectory and overall route. The vehicle monitor 460 can compile the AV log data 488 and the current set of conditions from the live conditions monitor 420 as a set of forward route parameters 464 for the SDAV 481 or FAV 489. The forward route parameters 464 for each vehicle can be processed by a live risk regressor 425 that can dynamically determine an overall risk value 432 across a remainder of the trip.

Example described herein recognize that conditions may change quite rapidly over the course of a single trip, such as traffic conditions, weather conditions, or lighting conditions. These changing conditions can affect the autonomous performance of the SDAVs 481 and FAVs 489 such that current risks for the remainder of the trip may increase to unacceptable levels (e.g., when clouds begin to precipitate). In various examples, the live risk regressor 425 can quantify a forward trip risk value 432 for the SDAV 481 or FAV 489 at any given time. For example, the live conditions monitor 420 or the vehicle monitor 460 can identify changes in weather conditions (e.g., via live image data from the AVs or live weather updates). On a high level, these changes can trigger the live risk regressor 425 to determine whether conditions are safe enough for the SDAVs 481 and FAVs 489 to operate in autonomous mode. On a lower level, the SDAVs 481 and FAVs 489 can store multiple software versions, which can be rated for lower risk or higher risk autonomous operation (e.g., verified versions 451 versions versus unverified versions 452, or software versions specifically created for certain conditions).

Based on the forward route parameters 464 for a given AV (SDAV 481 or FAV 489), the live risk regressor 425 can determine a forward trip risk value 432 for the AV. The live risk regressor 425 can output the forward trip risk value 432 to a live trip classifier 470, which can determine whether the AV can continue using a current software version, continue using a different software version, or must be decommissioned or serviced. The live trip classifier 470 can access a database 440 that includes the autonomy grid map 444, and software version logs 446 that include the verified software versions 451 and the unverified software versions 452. Each of the software versions 451, 452 can be associated with one or more risk thresholds below which the software version may be used.

In certain examples, the forward trip risk value 432 for a given AV may be higher than all risk thresholds of the live trip classifier 470. In such examples, the live risk regressor 425 can generate a decommission trigger 429 causing the vehicle monitor 460 to transmit a decommission command 468 to the AV. The decommission command 468 can instruct the AV to pull over and park, find a nearest safe place to stop, or wait for the risk to decrease. In such scenarios, if a passenger is being transported, the on-trip monitoring system 400 can transmit a notification to the on-demand transport system 401 to coordinate an HDV 487, and SDAV 481, or a non-degraded FAV 489 to pick-up the passenger at the stopped location of the AV.

In further examples, the degradation state of the AV (e.g., an SDAV 481 or FAV 489) can further trigger a decommission command 468 from the on-trip monitoring system 400. For example, hard bumps can jostle the AV's sensor systems, cause disconnections in the AV's wiring, cause mechanical faults (e.g., flat tires), misalignments, etc. The AV log data 488 can indicate any misalignments or sensor faults and diagnostics failures that can contribute to the forward trip risk value 432 for the AV being unacceptably high. Accordingly, the on-trip monitoring system 400 can transmit a decommission command 468 to the AV to compel the AV to, for example, drive to a nearest service station for recalibration or repair, or hand over manual control to a human driver.

In variations, the live trip classifier 470 can determine that the risk value 432 is still within risk thresholds for autonomous operation, but with a different software version than is currently executing on the AV. In such examples, the live trip classifier 470 can transmit a switch trigger 472 to a software switching module 430. The switch trigger 472 can identify which specified software version 451, 452 the AV is to execute for the remainder of the trip. The software switching module 430 can then transmit a software switch command 462 to the AV over the network 480, instructing the AV to switch to the software version specified by the live trip classifier 470 for the remainder of the trip.

In certain aspects, the on-trip monitoring system 400 can also instruct the AVs to switch software versions at a pick-up location (e.g., execute a verified software version 451 for the trip), at the drop-off location (e.g., execute an unverified software version 452 to log verification miles), or at specific triggering locations along the autonomy grid map 444. Accordingly, a software switch command 462 can be triggered based on the AV's location, the current conditions, or the AV's state (e.g., on-trip with a passenger versus without a passenger).

According to some examples, the vehicle monitor 460 can also receive driver state data 482 from the driver devices of the HDVs 487. The driver state data 482 can indicate whether the driver is on-trip (i.e., transporting a passenger), awaiting a transport invitation, or off-duty. The driver state data 482 can also indicate a current location and route of the HDV 487 that the driver is operating. As described with respect to FIG. 3, the on-demand transport management system 300, 401 can receive and store driver data 347 that indicates the recent driving characteristics of the driver, as well as how long the driver has been on-duty. Because the on-demand transport system 300, 401 also monitors current conditions 399, these driver data 347 can further be correlated to the current conditions 399 to indicate the performance and driving characteristics of the driver in all conditions, such as in rain, snow, at night or other times of the day, in fog, etc. According to examples, the vehicle monitor 460 can analyze the driver state data 482 to generate a set of forward route parameters 464 for the driver of the HDV 487. Utilizing the driver data 347 from the on-demand transport system 401, the live risk regressor 425 can also calculate an individual, forward trip risk value 432 for the human driver of the HDV 487.

With this individual risk value 432 for the driver, the on-trip monitoring system 400 can perform any number of functions, such as providing notifications corresponding to the driver's risk value 432 to the driver's computing device, or providing the on-demand transport system 401 with feedback for further matches (e.g., weighing the driver's individual risk against the trip classifications for the SDAVs 481 and FAVs 489). Furthermore, since the forward risk value 432 for the driver can be route-specific, the live risk regressor 425 can identify alternative routes for the driver that are less risky, and the on-trip monitoring system 400 can transmit a transport update 494 to the driver's computing device to reroute the driver over a less risky route.

In various examples, the on-trip monitoring system 400 can detect the end of a trip by an AV (e.g., either an SDAV 489 or FAVs 489), and can determine an optimal post-trip option for the AV. For example, the route optimizer 335, 450 of the on-demand transport system 401 can access the autonomy grid map 444 to identify any number of routes 477 from a given drop-off location of the AV. For each of the routes 477, the live risk regressor 425 can generate a trip risk value 432 given the current conditions and/or the individual state of the AV as determined from the AV log data 488. Additionally or alternatively, the autonomy grid map 444 may indicate various predetermined stopping or parking locations at which the AV can await another set of transport instructions 332. In still further implementations, the on-demand transport system 401 can identify areas or locations within the autonomy grid map 444 having higher or lower demand for the transportation services, and it may be desired to move the AV to these areas of higher demand. Weighing each of route risk, local demand, and availability of a waiting area, the on-trip monitoring system 400 can determine a most optimal post-trip plan for the AV once a drop-off is made. Within a certain time prior to, during, or after drop-off, the on-trip monitoring system 400 can transmit a set of post-trip instructions 496 detailing the post-trip plan for the AV. Further description of the post-trip instructions 496 and decision-making is provided in the methodology discussion below.

It is contemplated that any of the functions between the logical blocks of FIGS. 2, 3, and 4 may be combined or excluded. For example, the functions of the AV software management system 200, on demand transport management system 300, and the on-trip monitoring system 400 may evolve over time to specifically exclude HDVs within autonomy grids, or may eventually exclude SDAVs (e.g., where unverified software versions are extensively scrutinized through simulation and/or verified on FAVs). Thus, the inclusion of logical blocks and description herein are not limited to any single embodiment, and can therefore be substituted, included with other blocks, or excluded to result in any combined embodiment of the functions described herein.

Autonomous Vehicle

Figure 5:
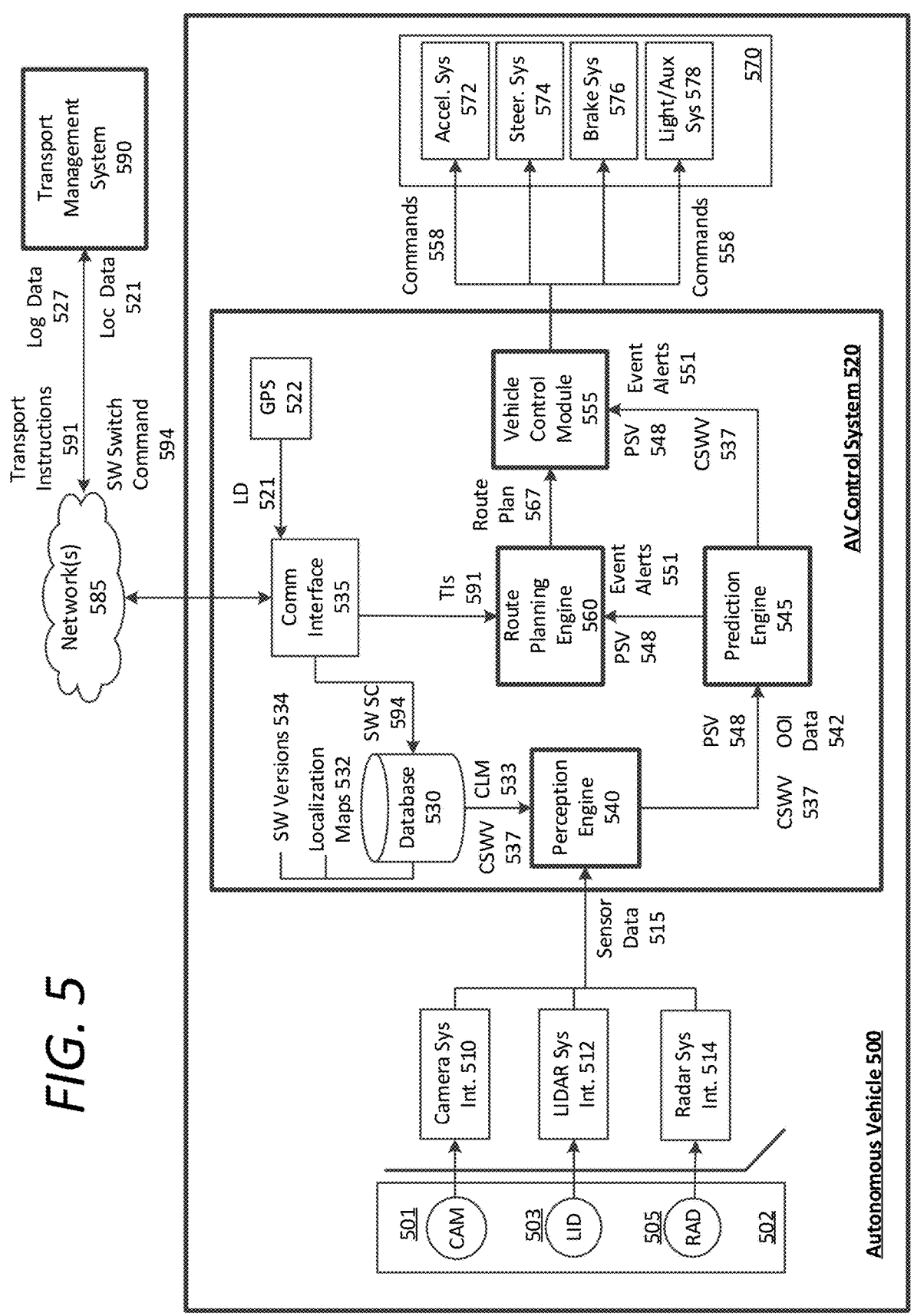
FIG. 5 is a block diagram illustrating an example autonomous vehicle in communication with on-demand transportation management systems, as described herein.

FIG. 5 is a block diagram illustrating an example autonomous vehicle in communication with on-demand transportation management systems, as described herein. In an example of FIG. 5, a control system 520 can autonomously operate the AV 500 in a given geographic region for a variety of purposes, including transport services (e.g., transport of humans, delivery services, etc.). In examples described, the AV 500 can operate autonomously without human control. For example, the AV 500 can autonomously steer, accelerate, shift, brake, and operate lighting components. Some variations also recognize that the AV 500 can switch between an autonomous mode, in which the AV control system 520 autonomously operates the AV 500, and a manual mode in which a safety driver takes over manual control of the acceleration system 572, steering system 574, braking system 576, and lighting and auxiliary systems 578 (e.g., directional signals and headlights).

According to some examples, the control system 520 can utilize specific sensor resources in order to autonomously operate the AV 500 in a variety of driving environments and conditions. For example, the control system 520 can operate the AV 500 by autonomously operating the steering, acceleration, and braking systems 572, 574, 576 of the AV 500 to a specified destination. The control system 520 can perform vehicle control actions (e.g., braking, steering, accelerating) and route planning using sensor information, as well as other inputs (e.g., transmissions from remote or local human operators, network communication from other vehicles, etc.).

In an example of FIG. 5, the control system 520 includes computational resources (e.g., processing cores and/or field programmable gate arrays (FPGAs)) which operate to process sensor data 515 received from a sensor system 502 of the AV 500 that provides a sensor view of a road segment upon which the AV 500 operates. The sensor data 515 can be used to determine actions which are to be performed by the AV 500 in order for the AV 500 to continue on a route to the destination, or in accordance with a set of transport instructions 591 received from an on-demand transport management system 590, such as the on-demand transport management system 300 described with respect to FIG. 3. As provided herein, the transport management system 590 shown in FIG. 5 can further represent the AV software management system 200 of FIG. 2 and the on-trip monitoring system 400 of FIG. 4. In some variations, the control system 520 can include other functionality, such as wireless communication capabilities using a communication interface 535, to send and/or receive wireless communications over one or more networks 585 with one or more remote sources. In controlling the AV 500, the control system 520 can generate commands 558 to control the various control mechanisms 570 of the AV 500, including the vehicle's acceleration system 572, steering system 557, braking system 576, and auxiliary systems 578 (e.g., lights and directional signals).

The AV 500 can be equipped with multiple types of sensors 502 which can combine to provide a computerized perception, or sensor view, of the space and the physical environment surrounding the AV 500. Likewise, the control system 520 can operate within the AV 500 to receive sensor data 515 from the sensor suite 502 and to control the various control mechanisms 570 in order to autonomously operate the AV 500. For example, the control system 520 can analyze the sensor data 515 to generate low level commands 558 executable by the acceleration system 572, steering system 557, and braking system 576 of the AV 500. Execution of the commands 558 by the control mechanisms 570 can result in throttle inputs, braking inputs, and steering inputs that collectively cause the AV 500 to operate along sequential road segments according to a route plan 567.

In more detail, the sensor suite 502 operates to collectively obtain a live sensor view for the AV 500 (e.g., in a forward operational direction, or providing a 360 degree sensor view), and to further obtain situational information proximate to the AV 500, including any potential hazards or obstacles. By way of example, the sensors 502 can include multiple sets of camera systems 501 (video cameras, stereoscopic cameras or depth perception cameras, long range monocular cameras), LIDAR systems 503, one or more radar systems 505, and various other sensor resources such as sonar, proximity sensors, infrared sensors, and the like. According to examples provided herein, the sensors 502 can be arranged or grouped in a sensor system or array (e.g., in a sensor pod mounted to the roof of the AV 500) comprising any number of LIDAR, radar, monocular camera, stereoscopic camera, sonar, infrared, or other active or passive sensor systems.

Each of the sensors 502 can communicate with the control system 520 utilizing a corresponding sensor interface 510, 512, 514. Each of the sensor interfaces 510, 512, 514 can include, for example, hardware and/or other logical components which are coupled or otherwise provided with the respective sensor. For example, the sensors 502 can include a video camera and/or stereoscopic camera system 501 which continually generates image data of the physical environment of the AV 500. The camera system 501 can provide the image data for the control system 520 via a camera system interface 510. Likewise, the LIDAR system 503 can provide LIDAR data to the control system 520 via a LIDAR system interface 512. Furthermore, as provided herein, radar data from the radar system 505 of the AV 500 can be provided to the control system 520 via a radar system interface 514. In some examples, the sensor interfaces 510, 512, 514 can include dedicated processing resources, such as provided with field programmable gate arrays (FPGAs) which can, for example, receive and/or preprocess raw image data from the camera sensor.

In general, the sensor systems 502 collectively provide sensor data 515 to a perception engine 540 of the control system 520. The perception engine 540 can access a database 530 comprising stored localization maps 532 of the given region in which the AV 500 operates. The localization maps 532 can comprise a series of road segment sub-maps corresponding to the autonomy grid map 105 described with respect to FIG. 1. As provided herein, the localization maps 532 can comprise highly detailed ground truth data of each road segment of the autonomy grid map 105. For example, the localization maps 532 can comprise prerecorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 500 travels along a given route, the perception engine 540 can access a current localization map 533 of a current road segment to compare the details of the current localization map 533 with the sensor data 515 in order to detect and classify any objects of interest, such as moving vehicles, pedestrians, bicyclists, and the like.

In various examples, the perception engine 540 can dynamically compare the live sensor data 515 from the AV's sensor systems 502 to the current localization map 533 as the AV 500 travels through a corresponding road segment. The perception engine 540 can identify and classify any objects of interest in the live sensor data 515 that can indicate a potential hazard. In accordance with many examples, the perception engine 540 can provide object of interest data 542 to a prediction engine 545 of the control system 520, wherein the objects of interest in the object of interest data 542 indicates each classified object that can comprise a potential hazard (e.g., a pedestrian, bicyclist, unknown objects, other vehicles, etc.).

Based on the classification of the objects in the object of interest data 542, the prediction engine 545 can predict a path of each object of interest and determine whether the AV control system 520 should respond or react accordingly. For example, the prediction engine 540 can dynamically calculate a collision probability for each object of interest, and generate event alerts 551 if the collision probability exceeds a certain threshold. As described herein, such event alerts 551 can be processed by the vehicle control module 555 and/or the route planning engine 560, along with a processed sensor view 548 indicating the classified objects within the live sensor view of the AV 500. The vehicle control module 555 can then generate control commands 558 executable by the various control mechanisms 570 of the AV 500, such as the AV's acceleration, steering, and braking systems 572, 574, 576. In certain examples, the route planning engine 560 can determine an immediate, low level trajectory and/or higher level plan for the AV 500 based on the event alerts 551 and processed sensor view 548 (e.g., for the next 100 meters or up to the next intersection).

On a higher level, the AV control system 520 can include a route planning engine 560 that provides the vehicle control module 555 with a route plan 567 to a given destination, such as a pick-up location, a drop off location, or other destination within the given region. In various aspects, the route planning engine 560 can generate the route plan 567 based on transport instructions 591 received from the on-demand transport system 590 over one or more networks 585. According to examples described herein, the AV 500 can include a location-based resource, such as a GPS module 522, that provides location data 521 (e.g., periodic location pings) to the on-demand transport system 590 over the network(s) 585. Based on the AV's 500 location data 521, the on-demand transport system 590 may select the AV 500 to service a particular transport request, as described above with respect to FIGS. 2-4.

In various implementations, the database 530 can further store a number of software versions 534 executable by the perception engine 540, the prediction engine 545, the route planning engine 560, and/or the vehicle control module 555. Thus, at any given time, the AV control system 520 can execute a current software version 537 that controls the manner in which the AV control system 520 autonomously operates the AV 500. As described herein, the software versions 534 can be verified or unverified, and can be executed by the control system 520 in response to software switch commands 594 or the transport instructions 591 from the transport management system 590.

In certain examples, the control system 520 can transmit or stream AV log data 527 to the transport management system 590. The log data 527 enables the transport management system 590 to provide updated transport instructions 591 or software switching commands 594, and can further indicate a degradation level of the AV 500. As described herein, the log data 527 can include a sensor data stream 515 from the AV's sensor systems 502, and data corresponding to decisions, calculations, and control inputs made by the AV control system 520, such as object classification by the perception engine 540, path prediction by the prediction engine 545, and control commands 558 generated by the vehicle control module 555. Accordingly, the transport management system 590 can assess the AV control system's 520 performance against a nominal performance range to determine if the AV 500 is operating nominally, or if a certain degradation exists in any one of the AV's autonomous functions.

In some aspects, the AV control system 520 can operate in accordance with a set of safety standards, such as certainty probabilities with respect to object detection, classification, and/or path prediction. Accordingly, when these certainty probabilities are not met, the AV control system 520 can enter a stuck state, unable to progress further. Such stuck states may be caused by an indeterminate object, such as a plastic bag in front of the AV 500, or a significant occlusion in the AV's sensor view (e.g., a parked truck blocking a field of view of the sensor systems 502). According to certain implementations, when the set of safety standards are not met, the AV control system 520 can independently switch to a different software version (e.g., a verified software version instead of a test version). It is further contemplated that software version switch may be performed independently by the AV control system 520 in response to making a passenger pick-up, a drop-off event, or based on changing conditions (e.g., changing traffic, weather, road conditions, etc.).

Driver Device

Figure 6:
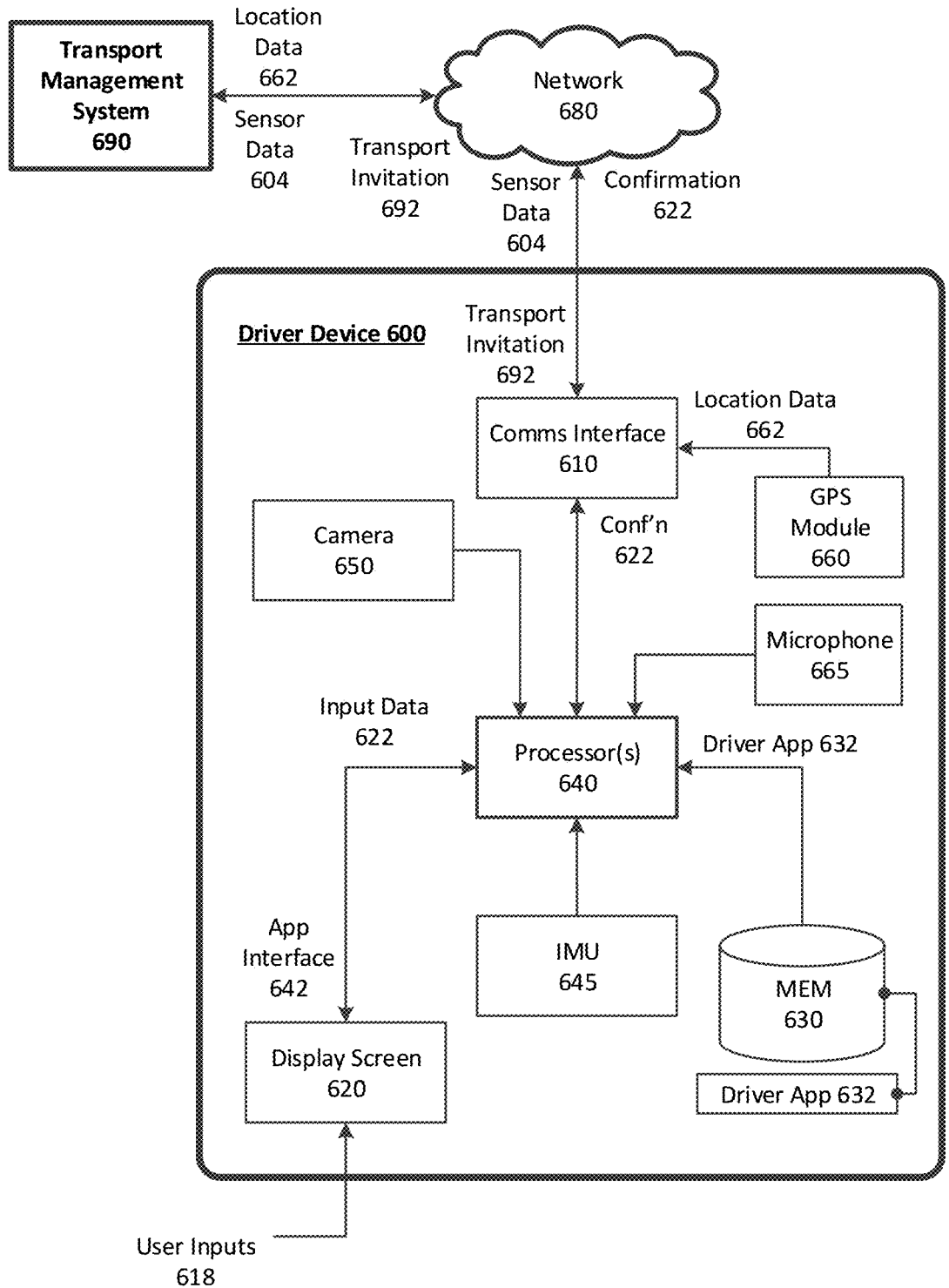
FIG. 6 is a block diagram illustrating an example driver device utilized by human drivers in-connection with an on-demand transportation management system.

FIG. 6 is a block diagram illustrating an example driver device utilized by human drivers in-connection with an on-demand transportation management system. The transport management system 690 shown in FIG. 6 can represent the AV software management system 200 of FIG. 2, the on-demand transport management system 300 of FIG. 3, and/or the on-trip monitoring system 400 of FIG. 4. In many implementations, the driver device 600 can comprise a mobile computing device, such as a smartphone, tablet computer, laptop computer, VR or AR headset device, and the like. As such, the driver device 600 can include typical telephony features such as a microphone 645, a camera 650, and a communication interface 610 to communicate with external entities using any type of wireless communication protocol. In certain aspects, the driver device 600 can store a designated application (e.g., a driver app 632) in a local memory 630.

The driver device 600 can further include sensor features, such as an inertial measurement unit (IMU) 645. The IMU 645 can include an accelerometer, gyroscopic sensor, and/or a magnetometer, and can generate sensor data 604 indicating the device's acceleration, velocity relative to the Earth, and orientation. As provided herein, through execution of the driver app 632, the transport management system 690 can access the sensor data 604 from the IMU 645 and/or image data from the camera 650. For example, the transport management system 690 can build a driver profile indicating the driving characteristics of the driver using the sensor data 604. In variations, the transport management system 690 can further utilize the sensor data 604 from driver device's 600 throughout the given region to, for example, determine fractional harmful events for specified road segments. As described in detail above, the fractional harmful events may be context-dependent based on a current set of conditions.

In response to a user input 618, the driver app 632 can be executed by one or more processors 640, which can cause an app interface 642 to be generated on a display screen 620 of the driver device 600. The app interface 642 can enable the driver to initiate an "on-call" or "available" sub-state (of the normal application state), linking the driver device 600 to the on-demand transport management system 690 that facilitates the on-demand transportation services. Execution of the driver application 632 can also cause a location resource (e.g., GPS module 660) to transmit location data 662 to the transport system 690 to indicate the current location of the driver with the given region.

In many aspects, the driver can receive transport invitations 692 from the transport system 690, where the transport invitations 692 indicate a particular pick-up location to service a pick-up request. The driver can provide acceptance confirmations 622 back to the transport system 690 indicating that the driver will service the pick-up request, or, in some aspects, decline the transport invitation 692 and await a subsequent opportunity. Upon submitting an acceptance confirmation 622, the driver application 632 can place the driver device 600 in an en route state while the driver drives to the pick-up location to rendezvous with the requesting user. Thereafter, the driver application 632 can initiate an on-trip sub-state (e.g., provide map directions to the requester's destination) while the driver transports the requesting user to the destination.

Methodology

In the below discussions of the various methods of FIGS. 7-14, reference may be made to reference characters representing certain logical blocks, engines, or modules described with respect to the systems diagrams of FIGS. 2-6. Furthermore, certain blocks shown in FIGS. 2-6 may be recited herein as computer systems that can perform the functions of one or more of the logical blocks as shown and described with respect to FIGS. 2-6. Further still, certain methods, steps, or processes described with respect to individual flow charts of FIGS. 7-14 may be combined with other steps or other flow charts, and need not be performed in the respective sequences shown.

Figure 7:
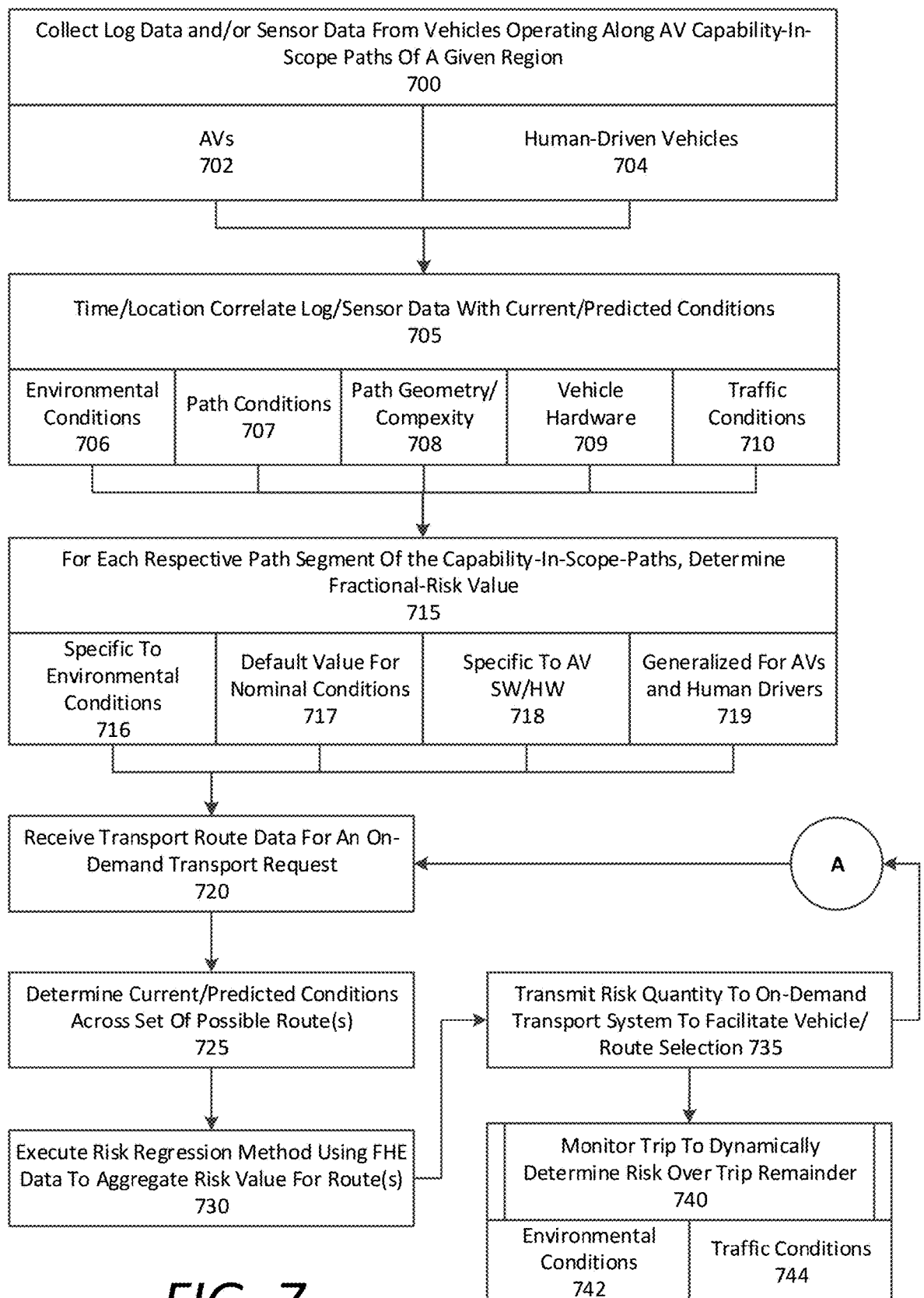
FIG. 7 is a flow chart describing example methods of generalizing fractional harmful or risky events for path segments of a given region.

FIG. 7 is a flow chart describing example methods of generalizing fractional harmful or risky events for path segments of a given region. In various examples, the below methods may be performed by an example risk regression system, corresponding to the risk regressors 230,330,425, and the fractional harmful event quantifier 245 discussed with respect to FIGS. 2-4. Furthermore, the risk regression system described in connection with FIG. 7 may include functionality of the AV software management system 200, the on-demand transport management system 300, and/or the on-trip monitoring system described herein. Referring to FIG. 7, the risk regression system can collect log data and/or sensor data from vehicles operating along capability-in-scope paths of a given region (700). As described herein, the capability-in-scope paths can comprise candidate paths for autonomous vehicles operation. The paths need not be solely paved road lanes, but can rather comprise any path along any combination of paved or unpaved roadways, aerial lanes, water lanes, and the like. In various aspects, the risk regression system can collect log data from AVs, operating within the capability-in-scope paths (702). The log data can comprise sensor data from the AVs, telemetry data, diagnostics data, and recorded input data performed by the AV's control system 520.

The risk regression system can further collect sensor data from human-driven vehicles (non-autonomous vehicles) (704). For example, the risk regression system can receive IMU data or accelerometer data from the driver's computing device 600. In certain implementations, the risk regression system can time and/or location correlate the log data and/or sensor data with a current set of conditions (705). For example, the data may be correlated to environmental conditions (706), path conditions (707), path geometry and/or complexity (708), vehicle hardware (709), and/or traffic conditions (710). Such correlations allow for the risk regression system to provide condition-dependent risk calculations for any given path segment of a given road network (e.g., an autonomy grid 105 on which AVs operate), which can be leveraged to assess current risk quantities for those path segments at any time and in any current set of conditions. In certain aspects, the risk regression system can further correlate the log data or sensor data to a static set of risk parameters corresponding to nominal environmental conditions and nominal path conditions (e.g., a dry road). In certain implementations, the risk regression system can further collect historical harmful event data from any number of third party resources (e.g., traffic accident or collision report data).

According to various examples, the risk regression system can determine fractional risk values for each respective path segment of the capability-in-scope paths (715). The risk regression system can determine a fractional risk value for a given path segment specific to a given set of environmental conditions (716). In doing so, for each given path segment, the risk regression system can determine fractional risk values for any number of environmental conditions, such as rainy conditions, degrees of rain (e.g., light, medium, heavy), road conditions (e.g., wet, drying, dry, icy, snowy, etc.), sunny conditions, cloudy conditions, degrees of visibility (e.g., in smog or dust). Accordingly, when receiving a transport request having a pick-up location and destination, the risk regression system can determine the current environmental conditions, and then aggregate the fractional risk values for each path segment of a given route for the trip to generate a total risk value for servicing the trip along the route.

In various examples, the risk regression system can determine a default fractional risk value for a given path segment for nominal conditions (717). Nominal conditions can correspond to general dry surface conditions and typical daytime conditions (e.g., good lighting, sunshine or non-precipitation clouds, etc.). In further implementations, the fractional risk values determined by the risk regression system may specific to the software and hardware of the AV (718). For example, the sets of conditional fractional risk quantities can be specific to a single software release that the AVs (SDAVs and FAVs) execute to autonomously operate throughout the autonomy grid 105. Additionally, the fractional risk quantities may also be specific to a hardware configuration (e.g., a common set of sensors or sensor configuration). Accordingly, the risk regression system can compute aggregate risk values for AVs having common software executing on common hardware. Thus, in various implementations, for each new software release, a new risk regression system may be trained, with new fractional risk values calculated for the path segments. It is contemplated that as time progresses and AV systems become increasingly more robust, these fractional risk values will steadily decrease.

In certain implementations, the risk regression system may also calculate a set of generalized fractional risk values for each path segment based on, for example, lane geometry, complexity (e.g., traffic signals and signs, intersecting lanes, bike lanes, crosswalks, blind turns, historical harmful events, etc.) (719). Accordingly, the risk regression system can also function to provide generalized aggregate risk quantities for any particular route given a current set of conditions. Such generalized aggregate risk quantities can be utilized to route AVs and HDVs along lower or lowest risk routes accordingly. In still further examples, the risk regression system can further determine the fractional risk quantity for each path segment based on off-vehicle replay of AV-logged data through new software, test track evaluation of the current system-under-test, actuarial statistics, and driving research publications.

In various examples, the risk regression system can receive transport route data for an on-demand transport request (720). Executing concurrently with the on-demand transport management system 300, the risk regression system can further receive on-demand transport requests, and, for each transport request, the risk regression system can determine one or more optimal routes between a pick-up location and destination of the transport request—denoted as reference "A" in FIG. 7. These one or more optimal routes can correspond to the transport route data received by the risk regression system. Thus, for each transport request and each route, the risk regression system can determine current conditions across the a set of possible routes for the transport request (725). In further examples, the risk regression system can predict a set of condition over the course of the trip (e.g., in general or along each route) (725). In various examples, the current or predicted conditions can include environmental conditions, weather conditions, whether the route involves road construction, road surface conditions, traffic conditions, any predicted or scheduled events, time of day, day of the week, and the like. The risk regression system may then execute a risk regression method using the fractional harmful event data—or conditions-based fractional risk values described herein—to determine an aggregate risk value for the route (730).

In some aspects, the risk regression system can transmit the aggregate risk value to the on-demand transport system to facilitation vehicle and/or route selection for the trip (735). In other aspects, the risk regression system can determine a most optimal route for based on the aggregate risk values, and determine whether to enable SDAVs and/or FAVs to service the transport request. For example, the risk regression system can execute concurrently with a trip classifier that enables SDAVs and FAVs to service any given transport request based on trip risk in accordance with a set of risk thresholds described herein. Once an SDAV, FAV, or HDV is selected to service the transport request, the risk regression system can actively monitor the trip to dynamically determine aggregate risk of a remainder of the trip, as described in detail below (740). In doing so, the risk regression system can monitor for changing environmental conditions (742) and changing traffic conditions (744) that may affect the fractional risk values.

Figure 8:
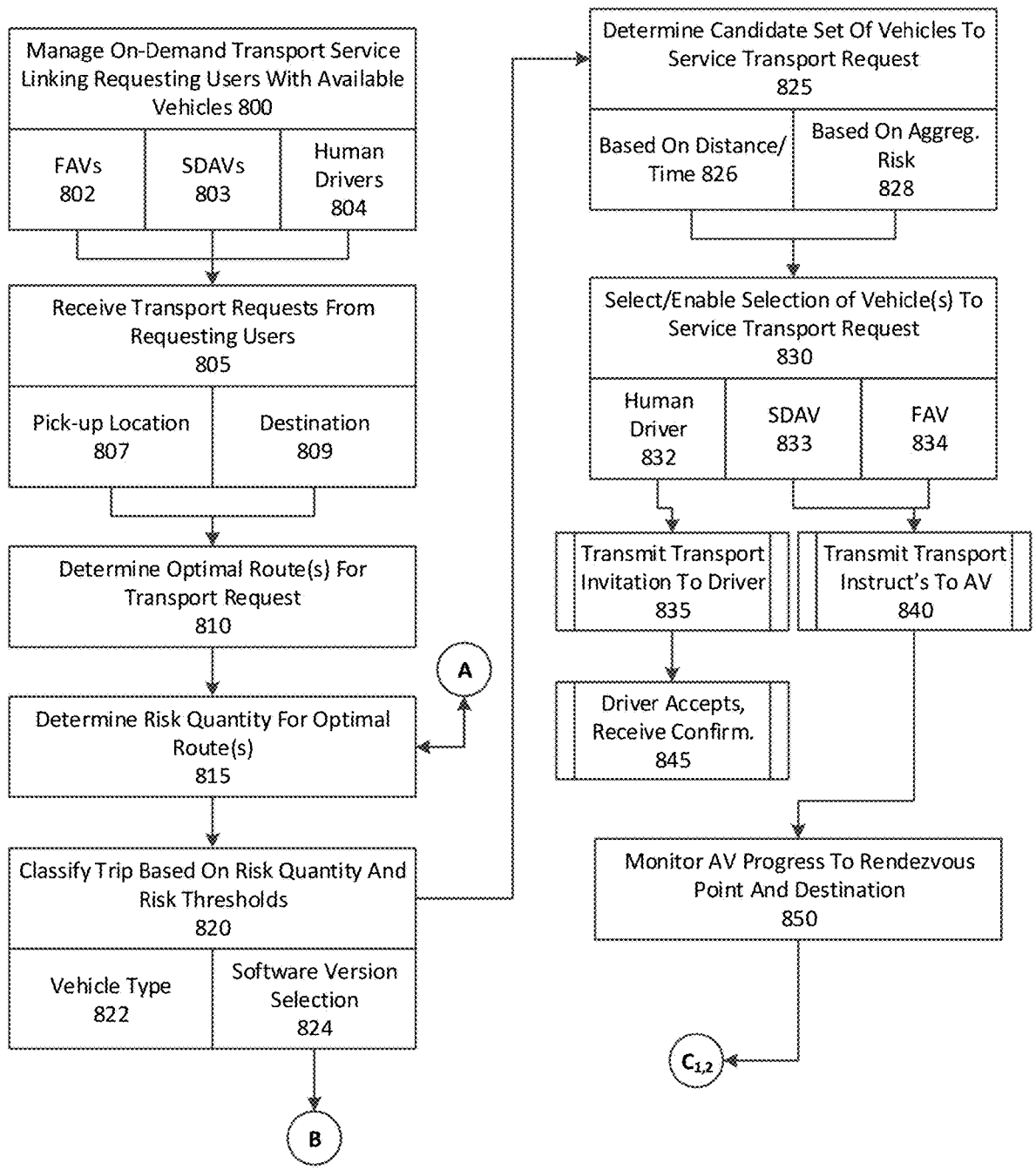
FIG. 8 is a flow chart describing example methods of matching a transport request with a service provider vehicle using risk regression and trip classification methods described herein.

FIG. 8 is a flow chart describing example methods of matching a transport request with a service provider vehicle using risk regression and trip classification. The below processes described with respect to FIG. 8 can be performed by example trip classifiers 250, 350, 470 executing concurrently with an on-demand transport management system 300, the AV software management system 200, and/or the on-trip monitoring system 400 of FIGS. 2-4. Accordingly, the below discussion of an on-demand transport management system can include functionality from one or more of the foregoing. Referring to FIG. 8, the on-demand transport management system can manage an on-demand transport service linking requesting users with available vehicles (800). These vehicles can include FAVs (802), SDAVs (803), and HDVs (804), operating within the autonomy grid 105 and throughout the given region.

According to various examples, the transport management system can receive transport requests from requesting users (805). The transport requests can include a pick-up location (807) and a destination (809). In certain implementations, the transport management system can determine one or more optimal routes for the transport request (810). For example, the transport management system can identify a set of routes, and select a route that has the lowest estimated time to destination based on such factors as current traffic conditions, projected traffic conditions, and distance. In variations, the transport management system can first determine the aggregate risk values for each route prior to selecting a most optimal route for the trip based partially on risk.

The transport management system can determine a risk quantity for each of the one or more optimal routes (815). According to various examples, the transport management system can determine the aggregate risk quantity through coordination with the risk regression system described with respect to FIG. 7, and represented by reference "A" in FIG. 8. Thus, the risk quantity determined at step (815) can be based on historical fractional harmful event data, a current set of conditions, and the aggregated fractional risk values as determined by the risk regression system. The transport management system may classify the trip based on the aggregated risk quantity and a set of risk thresholds (820). In classifying the trip, the transport management system ultimately determines which vehicle types (822) executing which software version (if any) are certified to service the transport request (824). Detailed description of the software version precertification and verification is provided below with respect to FIG. 9, and is represented by reference "B" in both FIGS. 8 and 9. In particular, each software version and vehicle type may be associated with a risk threshold. In further implementations, the use of an unverified software version can be attributed to two distinct risk thresholds—a first risk threshold for including the trip in its verification mileage set, and a second risk threshold for excluding the trip from its verification set.

As described herein, the transport management system may run a plurality of on-trip classifiers (e.g., on a backend datacenter), each representing a software version stored on the SDAVs or FAVs operating throughout the autonomy grid 105. Accordingly, the transport management system can receive a set of trip classifications from the multiple trip classifiers, with each classification identifying the software version and the authorized vehicles (e.g., SDAV, FAV, and/or HDV) for servicing the transport request based on the calculated aggregate risk value of the route. The trip classifiers can each establish safety or risk thresholds for each software version. In certain variations, the trip classifiers can also establish separate risk thresholds for whether the execution of a software version for a trip is to be used for verification mileage or for other purposes (e.g., training a new trip classifier). In further examples, the trip classifiers can establish separate risk thresholds for SDAVs versus FAVs executing the same software version (e.g., due to the fallback of having a safety driver). Accordingly, the overall trip classification answers which vehicles executing which software versions are authorized to service a trip over a specified route given the current set of conditions.

According to many examples, the transport management system can determine a candidate set of vehicles to service the transport request (825). In certain aspects, the candidate set of vehicles can be determined based solely on distance or time to the pick-up location (826). For example, the transport management system can establish a geofence encompassing a certain proximity around the pick-up location, and include any vehicle within the geofence in the candidate set of vehicles. In further aspects, the candidate set of vehicles can also be determined based on the aggregate risk value for the trip (828). For example, the transport management system can determine the overall risk for the trip and the trip classification prior to determining the set of candidate vehicles.

The transport management system may then determine whether to enable selection of the various vehicle types (e.g., between HDVs, SDAVs, and/or FAVs), or select a most optimal vehicle from the candidate set to service the transport request (830). In selecting the most optimal vehicle, the transport management system can filter out any vehicle and software combination whose established risk thresholds do not meet the aggregate risk value for the trip, as determined by the trip classification(s). In general, the trip classification enables the transport management system to select one of a human driver (832), an SDAV (833), or an FAV (834) to service the transport request. The transport management system can make the final selection based on an optimization between risk, distance or time to the pick-up location, and/or expected revenue generated by each vehicle. If the selection comprises a human driver, then the transport management system can transmit a transport invitation to the driver (835), which the driver can accept or decline. If the driver accepts, then the transport management system can receive a confirmation from the driver (845).

However, if the selected vehicle is either an SDAV or an FAV, then the transport management system can transmit a set of transportation instructions to the AV, instructing the AV to rendezvous with the requesting user at the pick-up location and to transport the requesting user to the requested destination (840). In further implementations, the transport instructions can further include the software version that the AV is to execute while servicing the transport request. Thereafter, the transport management system can monitor the AV's progress to the rendezvous point (i.e., the pick-up location) and onwards to the destination (850). Detailed discussion of the on-trip monitoring is provided below with respect to FIGS. 10A and 10B, and is represented by the references "$C_{1,2}$" in FIG. 8, "$C_1$" in FIG. 10A, and "$C_2$" in FIG. 10B—which describe the on-trip monitoring steps extending from step (850) and discussed throughout the present disclosure.

Figure 9:
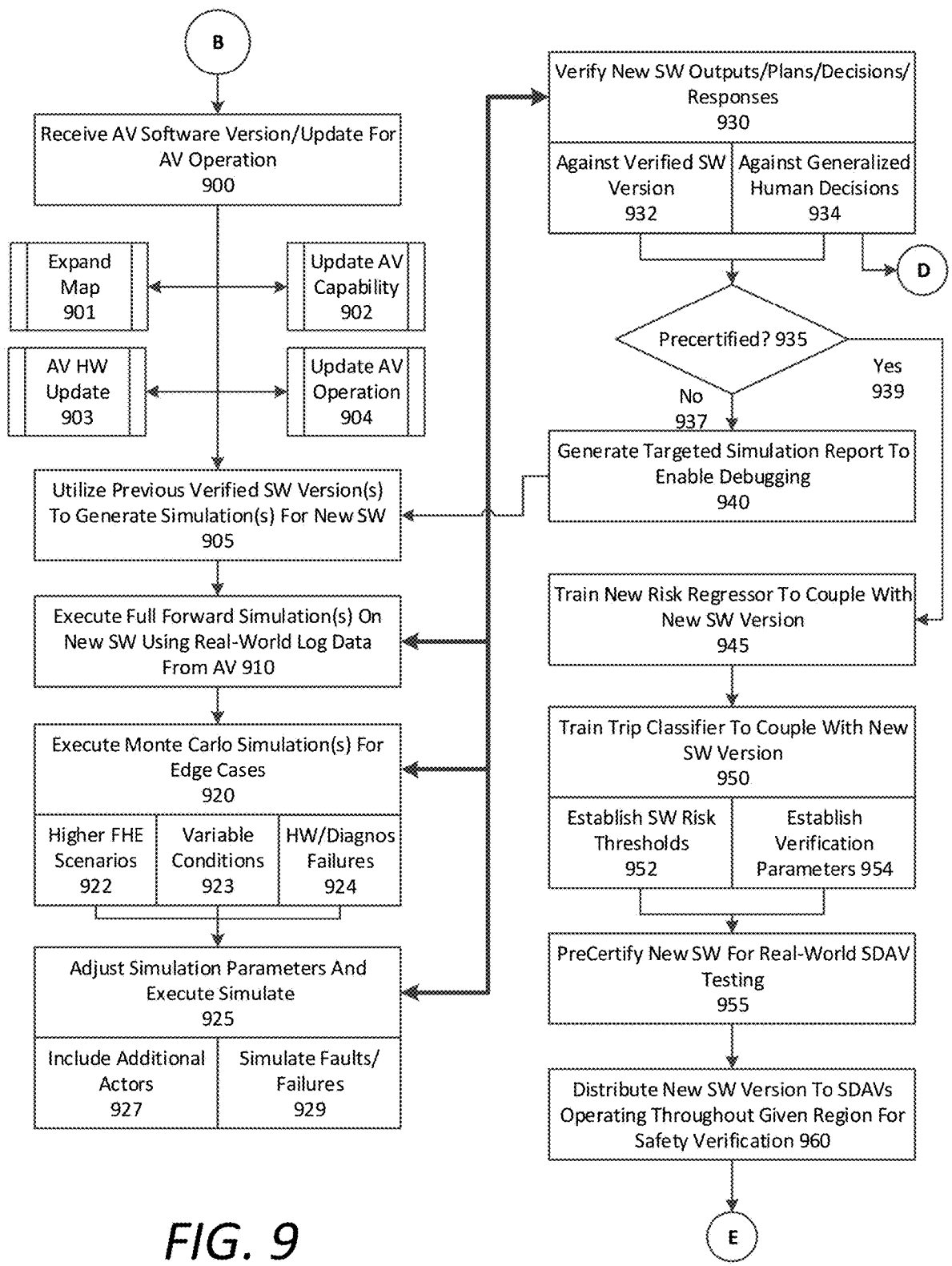
FIG. 9 is a flow chart describing example methods of simulation-based precertification of AV software.

FIG. 9 is a flow chart describing example methods of simulation-based precertification and verification of AV software, according to various examples. The below steps discussed with respect to FIG. 9 may be performed by an example AV software management system described herein with respect to FIG. 2. Furthermore, in some aspects, the steps discussed in FIG. 9 may flow from reference "B" extending from block (824) in FIG. 8. Referring the FIG. 9, the AV software management system can receive a new AV software version or software update that relates to AV operation (900). A new AV software version or software update can be created for virtually any purpose, such as the expansion of the autonomy grid map 105 (901), updating AV capabilities, such as improvements to signaling intent or performing off-map functions (902), updating AV hardware, such as including new sensors or excluding redundant sensors (903), and updating AV operations, such as updates to the AV's detection or stopping distances, response behavior, object classification or path prediction updates, and the like (904).

In various examples, the AV software management system can utilize previous verified software versions to generate one or more simulations for the new software version (905). In one aspect, the simulations can be generated by human software engineers using recorded AV logs and previous software versions. In certain variations, the AV software management system can run the new software version through a set of default simulations for an initial verification. According to examples, the AV software management system can execute a full forward simulation on new software using real-world log data from AVs operating throughout the given region (910). Additionally or alternatively, the AV software management system can execute Monte Carlo simulations for certain edge cases (920). These edge cases can correspond to higher fractional harmful event scenarios (922), variable conditions (923), or hardware or diagnostics failures (924).

The AV software management system can further adjust simulation parameters to further refine the simulation, and further execute the simulations (925). For example, the AV software management system can include additional actors, such as other vehicles or AVs, pedestrians, and other objects (927). The AV software management system can further simulate various types of faults or failures (929). In each step of the foregoing simulation process, the AV software management system can generate a set of simulation results that enable engineers to make refinements to the AV software or verify the software for further simulation or for real-world use. In doing so, the AV software management system can verify the new software's outputs, trajectory plans, decision-making, and/or responses (930). For example, the AV software management system can verify such actions against a previously verified software version (932). In other examples, the AV software management system can verify the actions against generalized human perception and decision-making (934), such as a comparative simulation of an average human driver. Detailed discussion of this generalization of human perception and decision-making in the context of driving—and determining risk associated with such human factors—is provided below with respect to FIG. 11, and is represented by reference "D" extending from sub-block (934).

As provided herein, after running through a series of simulation tests, the AV software management system can determine whether the software version is pre-certified (935). In other words, the AV software management system can determine whether the software version is ready for use on SDAVs (or FAVs) for real-world testing or execution. This decision can be based on a set of performance metrics established by the AV software management system, such as a sequence of nominal ranges that the AV software version must be within in order to be pre-certified. For example, the simulations can identify whether the software version performs as well as or better than previously verified software versions for its stated purposes. If the software release does not perform in accordance with the software management system's nominal ranges (937), then the AV software management system can generate a targeted simulation report to enable debugging of the software version (940). The AV software version may then be run through the precertification simulations again in steps (905) through (930).

If the AV software versions passes precertification (939), then on a high level, the AV software management system can distribute the new software version to AVs (e.g., only SDAVs) operating throughout the given region for real-world safety verification (960). In various examples, the AV software management system can train a new risk regressor to couple with the new software version (945). The new risk regressor can determine fractional risk values for a hypothetical AV executing the new software version along each path segment of the given region. The AV software management system can further train a new trip classifier to couple with the new software version (950). As described herein, the new trip classifier can establish risk thresholds for the new software version in servicing transport requests (952). In further aspects, the new trip classifier can also establish verification parameters (954), such as verification miles needed before the software version can be distributed to FAVs.

As provided herein, the trained risk regressor and trip classifier for the new software version may be trained at any stage prior to distribution of the software release to the SDAVs. Furthermore, it is contemplated that certain limited software releases may be fully certified through simulation. Other more comprehensive software releases may require extensive real-world verification prior to execution on fully autonomous vehicles. According to various examples, the AV software management system may pre-certify the new software release for real-world SDAV testing (955). By limiting the release to SDAVs, the AV software management system can leverage the added flexibility of having trained safety drivers as a mitigation against any unforeseeable issues. (e.g., stuck states). The AV software management system may then distribute the new software versions to the SDAVs operating throughout the given region for safety verification (960). Detailed description of the verification process for the software release is provided below with respect to FIG. 12, and is represented by reference "E" in both FIGS. 9 and 12.

Figure 10A:
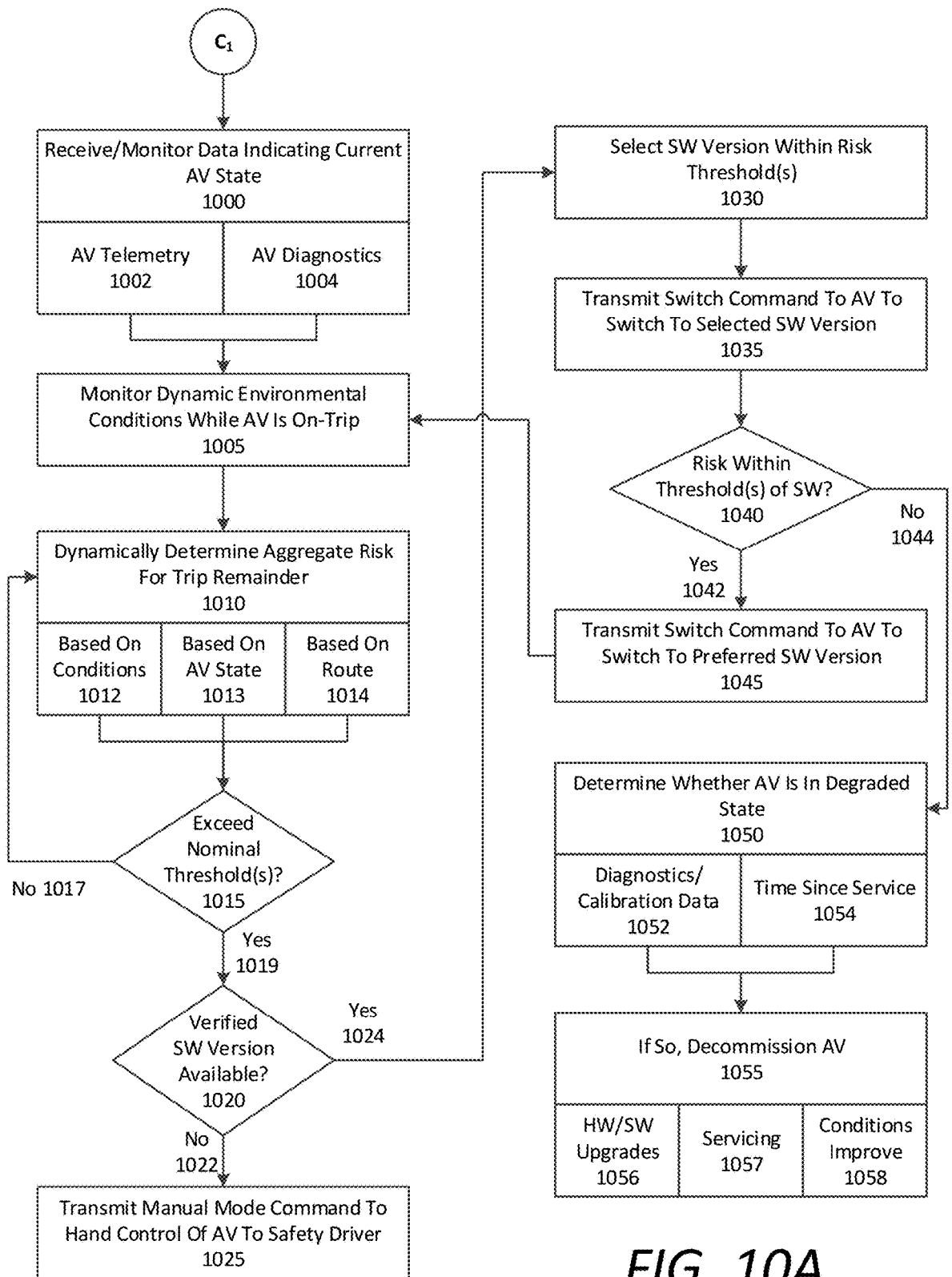
FIG. 10A is a flow chart describing example methods of dynamic software version and/or autonomy mode switching.

FIG. 10A is a flow chart describing example methods of dynamic software version and/or autonomy mode switching, according to various implementations. The below processes discussed with respect to FIG. 10A may be performed by an example on-trip monitoring system in connection with an on-demand transport management system described with respect to FIGS. 3 and 4. Furthermore, the steps shown in FIG. 10A can flow from block (850) of FIG. 8, represented by reference "$C_1$" in both FIGS. 8 and 10A. Referring to FIG. 10A, the on-trip monitoring system can receive and monitoring AV data indicating the current state of AVs operating throughout the given region (1000). The AV data can include AV telemetry data indicating the AV's location, velocity, direction of travel, route plan, and/or trajectory plan (1002). In further implementations, the AV data can include diagnostics data indicating the performance of AV hardware and/or mechanical system (1004). These systems can include the AV's sensor systems, computer systems, engine, cooling, tires, brakes, suspension, communications systems, electronic control unit, and the like.

The on-trip monitoring system can further monitor the dynamic environmental conditions for the given region in general, and/or local to the AV while the AV is on-trip (1005). In various aspects, the on-trip monitoring system can further dynamically or periodically determine an aggregate risk value for the remainder of the trip (1010). As an example, with equal environmental conditions and AV conditions, the risk value for the trip remainder would steadily decrease due to the aggregation of less fractional risk values of path segments for the total trip. However, examples described here recognize that conditions are constantly changing (e.g., traffic conditions, weather conditions, vehicle conditions, etc.), and can be individually factored into live risk calculations for the AV. Thus, the aggregate risk for the trip remainder may be based on such conditions (1012), based on the state of the AV (1013), and based on the remaining route of the AV (1014).

In certain examples, the determination of the remaining risk for the AV can be based on the original thresholds of the trip classifier. Accordingly, the on-trip monitoring system can determine whether the remaining risk exceeds the nominal thresholds established by the trip classifier (1015). If not (1017), then the on-trip monitoring system can continue monitoring the trip and dynamically calculate the aggregate risk for the trip remainder (1010). However, if the remaining risk does exceed the nominal risk thresholds (1019), then the on-trip monitoring system can determine whether a verified software version having higher risk thresholds is available on the AV (1020). In some aspects, the on-trip monitoring system can also determine whether an unverified software version is available on the AV, and that has higher risk thresholds. For example, the AV may be executing an unverified test software version initially having relatively low risk thresholds to ensure maximum safety while logging verification miles. While on-trip, changing conditions (e.g., increased traffic) can cause the aggregate risk to exceed these thresholds, requiring the AV to pull over and stop. If a more optimal software version is not available (1022), then the on-trip monitoring system can transmit a manual mode command to the AV, causing the AV to hand over manual control to a human safety driver (1025). However, if a more optimal software version is available (1024), then the on-trip monitoring system can select a software version having thresholds within the current aggregate risk for the trip remainder (1030). In one aspect, the on-trip monitoring system can perform a lookup in a stored AV profile to determine which software versions the AV has stored thereon, and select from this stored set of software versions. The on-trip monitoring system may then transmit a switch command to the AV to cause the AV to switch to the selected software version (1035).

In monitoring the AV's progress, the on-trip monitoring system may also determine whether the current aggregate risk for the remainder of the trip is within the risk thresholds of a preferred software version (1040). If so (1042), then the on-trip monitoring system can transmit a switch command to the AV to switch to the preferred software version (1045). For example, an important software update may require extensive real-world verification, and can therefore be prioritized for verification mileage. If the aggregate risk for the trip falls below a risk threshold for the preferred software version, then the on-trip monitoring system can facilitate increased verification mileage for the preferred software version by enabling dynamic switching as described herein.

Scenarios for FAVs, in which handing over control to a safety driver is not an option, are also contemplated. At decision block (1040), if the aggregate risk for the trip remainder is not within any of the risk thresholds of the software versions stored on the FAV (1044), then the on-trip monitoring system can determine whether the FAV is in a degraded state (1050). For example, the on-trip monitoring system can analyze diagnostics data, calibration data, or log data in general of the FAV (1052). In further examples, the on-trip monitoring system can perform a lookup in a log database for AV to determine a time since the AV was last serviced (1054). For example, the AV log data can indicate when the sensor systems of the AV were last calibrated, or the quality of sensor data from the AV's sensor systems, the age of the AV's sensor and computational systems, and the like.

If the AV is in a degraded state, then the on-trip monitoring system can decommission the AV (1055). For example, the on-trip monitoring system can transmit a command to the AV to travel to a service station or central facility to receive hardware and/or software upgrades (1056). In variations, the on-trip monitoring system can transmit a command to the AV for servicing (1057). The servicing can entail hardware servicing, such as LIDAR calibration or alignment, lens cleaning for the AV's camera systems, or general mechanical servicing (e.g., changing brakes, fluids, tires, oil, etc.). In further variations, the on-trip monitoring system may simply transmit a command to the AV to park until conditions improve (1058). For example, the on-trip monitoring system can determine that current precipitation or traffic conditions will dissipate shortly, causing the remaining risk to decrease and enabling the AV to continue on its current route plan.

Figure 10B:
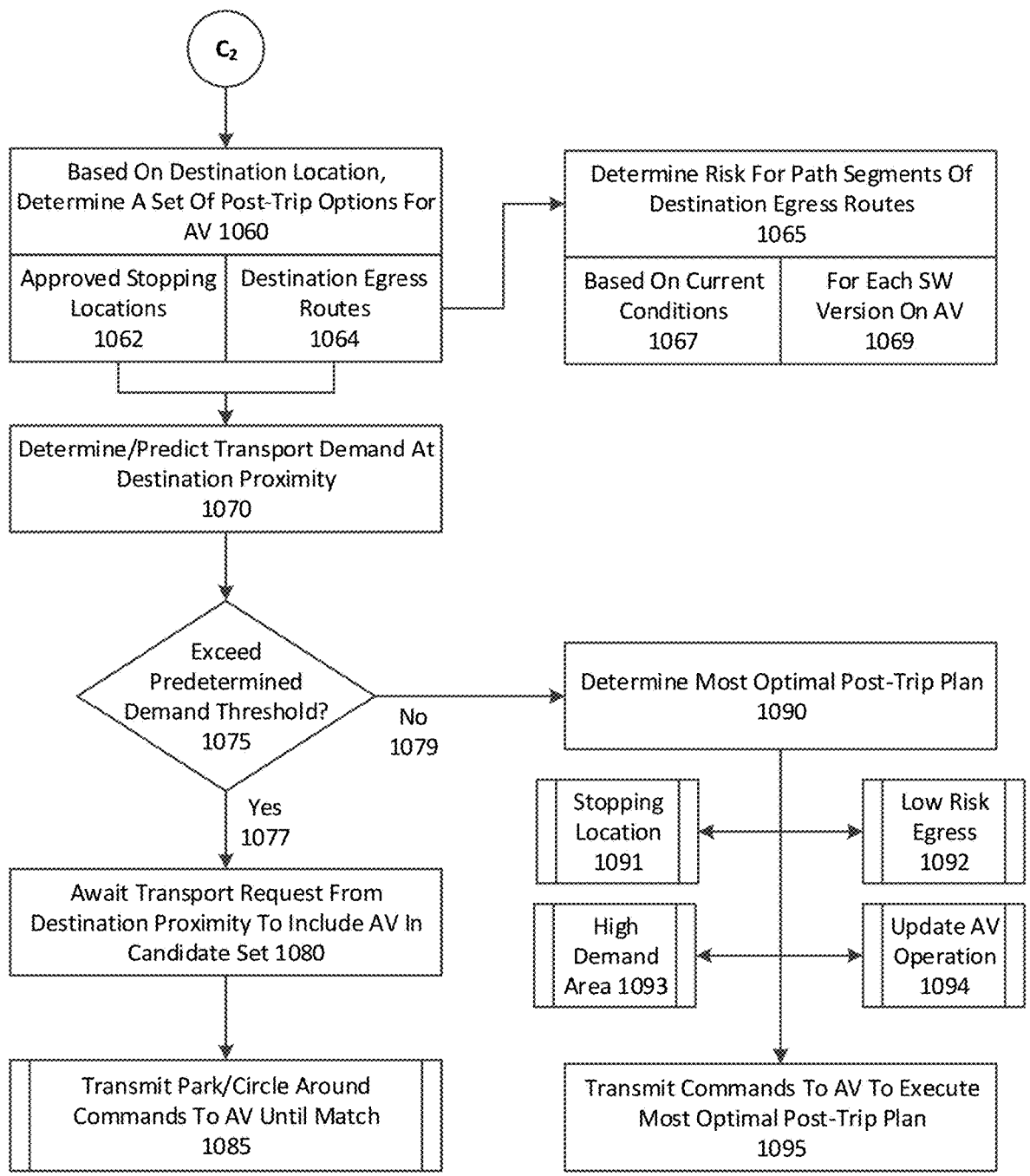
FIG. 10B is a flow chart describing example methods of post-trip AV management.

FIG. 10B is a flow chart describing example methods of post-trip AV management. Post-trip management examples described herein may be performed by an on-trip monitoring system as described with respect to FIG. 4, or a combination of an on-demand transport management system and an on-trip monitoring system as described with respect to FIGS. 3 and 4. Furthermore, the processes described in FIG. 10B can flow from block (850) of FIG. 8, represented by reference "$C_2$" in both FIGS. 8 and 10B. As described herein, the on-trip monitoring system can monitor trips performed by AVs throughout a given region. As further described, each trip can correspond to a passenger pick-up, transportation to a drop-off location, and a passenger drop-off at the drop-off location. Referring to FIG. 10B, the on-trip monitoring system can determine a set of post-trip options for each on-trip AV (1060). In various examples, the set of post-trip options can include approved stopping locations (1062) and/or a number of destination egress routes (1064). As provided herein, the destination can comprise the drop-of location of the passenger, and the post-trip options can comprise any decision to be made for or by the AV after dropping off the passenger. Furthermore, the on-trip monitoring system can perform the operations described with respect to FIG. 10B prior to drop-off (e.g., when the AV crosses a certain threshold distance or estimated time of arrival to the drop-off location), or at the time of drop-off. Ultimately, the on-trip monitoring system selects the most optimal post-trip option for the AV.

In determining the egress routes from the drop-off location, the on-trip monitoring system can leverage the risk regression tools described herein to determine risk values for path segments leading away from the drop-off location (1065). In some aspects, the risk values can comprise aggregates of fractional risk values for equal path distances leading away from the drop-off location. As described herein, the risk values can be based on current conditions, such as road, traffic, and weather conditions (1067). In some aspects, the on-trip monitoring system can further look up each software version stored on the AV—verified and unverified—and determine a risk value for each egress route and software version combination (1069). The resultant set of risk values can be utilized by the on-trip monitoring system in determining a most optimal post-trip option.

In certain implementations, the on-trip monitoring system can determine or predict transportation demand at the destination proximity (1070). For example, prior to the arrival of the AV at the drop-off location the on-trip monitoring system can coordinate with the on-demand transport management system to determine transportation demand from requesting users within an area surrounding the drop-off location (e.g., within a mile of the drop-off location). The on-trip monitoring system may then determine whether the demand exceeds a predetermined demand threshold (1075). In some aspects, the demand threshold can be determined in comparison to surrounding areas of the autonomy grid 105, or the given region in general. For example, to bolster efficiency of the on-demand transportation service, the on-trip monitoring system can coordinate with the SDAVs and FAVs to move transportation supply to anticipated or current areas of relatively higher demand within the autonomy grid 105.

If the area within a certain proximity of the drop-off location does exceed the demand threshold (1077), then the on-trip monitoring system can wait for a transport request from within the proximity to include the AV in the candidate set of vehicles to service the transport request (1080). Accordingly, the on-trip monitoring system can transmit a park command or circle around command to the AV until a match is made between the AV and a nearby requesting user (1085). For example, at the time of drop-off, the AV or the on-trip monitoring system can scan the local environment for an available and safe place for the AV to stop (e.g., a parking space or predetermined waiting area). If an available place exists or appears, the on-trip monitoring system can instruct the AV to park and wait. However, if no available place appears (e.g., if the AV is in a high traffic urban environment), then the on-trip monitoring system can instruct the AV to continue driving until another match is made for the AV, or until a parking location materializes.

If the demand threshold surrounding the drop-off location is not exceeded (1079), in general, the on-trip monitoring system can determine a most optimal post-trip plan for the AV (1090). In doing so, the on-trip monitoring system can analyze sensor data from the AV or other AVs near the drop-off location, receive reports from other AVs or drivers indicating available waiting areas (e.g., relatively empty parking areas), analyze historical data from drivers and AVs corresponding to waiting areas. Accordingly, the on-trip monitoring system can identify a most optimal stopping location for the AV (1091), or a lowest or relatively low risk egress route (1092). In certain scenarios, the on-trip monitoring system can update the AV's operation (1094). For example, the on-trip monitoring system can instruct the AV to execute an unverified software version to log verification mileage, to recharge or refuel, drive to a home location, and the like. As described herein, the on-trip monitoring system can also determine areas within the autonomy grid 105 having high relative demand, and can also instruct the AV to drive to an area of high transportation demand (1093). Accordingly, the on-trip monitoring system, once a most optimal post-trip option is determined, the on-trip monitoring system can transmit the post-trip command(s) to the AV to cause the AV to execute the most optimal post-trip plan (1095).

Figure 11:
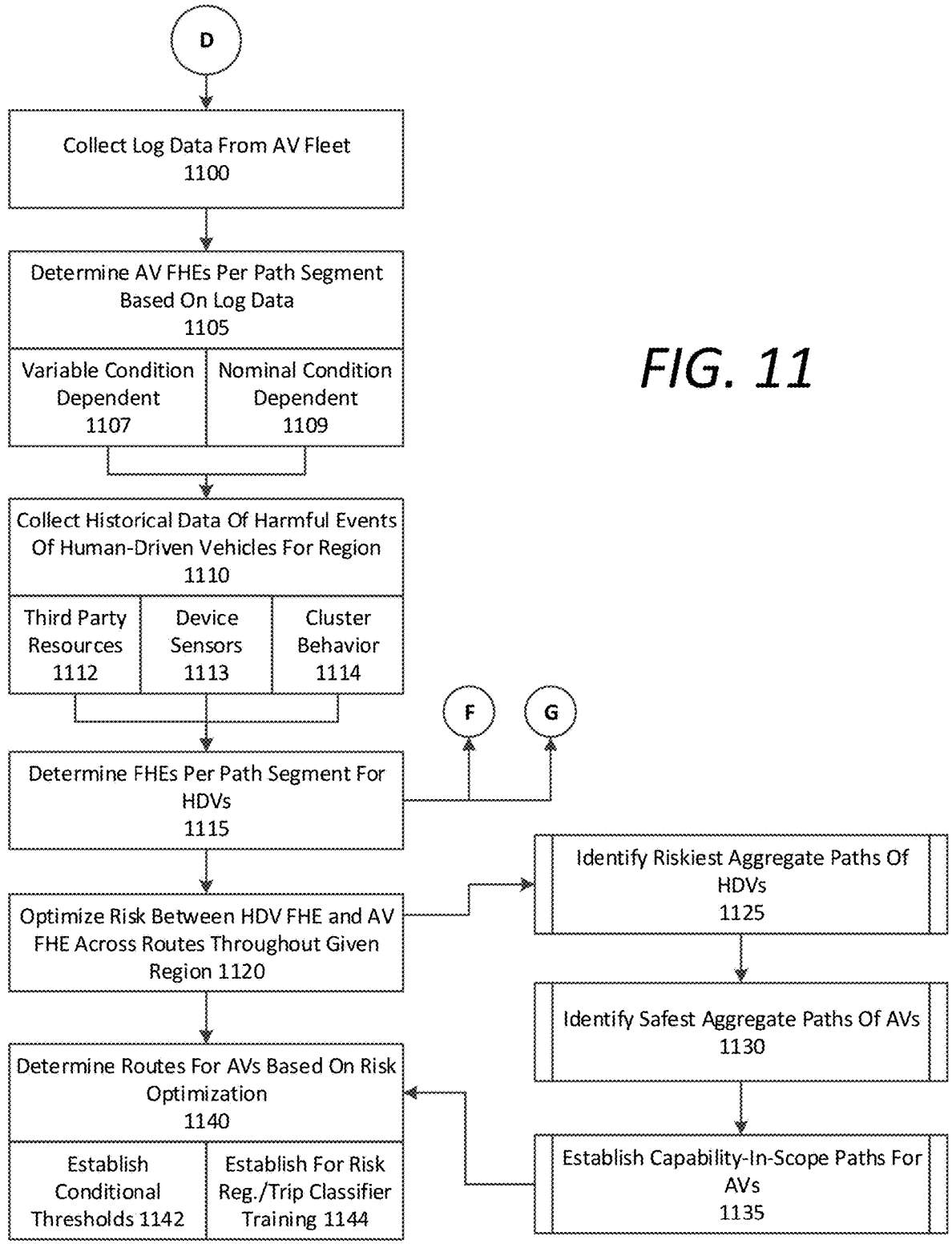
FIG. 11 is a flow chart describing example methods of evaluating AV software releases against human and/or AV driving data.

FIG. 11 is a flow chart describing example methods of evaluating AV software releases against human and/or AV driving data, according to example described herein. The below processes described with respect to FIG. 11 may be performed by an example AV software management system described with respect to FIG. 2. Furthermore, in certain examples, the steps discussed below in connection with FIG. 11 may flow from block (934) of FIG. 9, and represented by reference "D" in both FIG. 9 and FIG. 11. Referring to FIG. 11, in various examples, the AV software management system can collect log data from an AV fleet operating along respective routes within an autonomy grid 105 of a given geographic region (1100). Based on the log data, the software management system can determine fractional harmful event values, or fractional risk values, for each path segment (1105). In some aspects, the software management system can do so for each lane segment of a set of capability-in-scope lanes throughout an entire geographic region. In other aspects, the software management system can determine fractional risk values for paths segments included within a mapped autonomy grid 105. Furthermore, each fractional risk value can be variable condition-dependent (e.g., based on any set of weather, road, lighting, vehicle traffic, pedestrian traffic, and/or other environmental conditions) (1107). Still further, each path segment can also be associated with a nominal risk value corresponding to nominal conditions (e.g., normal, dry road and weather conditions) (1109).

In various implementations, the AV software management system can collect historical data of harmful events for the given region (1110). For example, the harmful events can correspond to traffic accidents, collisions between vehicles, pedestrians, bicyclists, etc. The AV software management system can classify the harmful events according to type, such as vehicle collisions, collisions between vehicles and pedestrians, collisions between vehicles and bicyclists, single vehicle events (e.g., a car crashing into a light post, telephone pole, or building), impaired driving events (e.g., a drunk driver being involved), incidents involving motorcyclists, the road conditions, weather conditions, and traffic conditions during the event, school zone events, etc. The AV software management system can also classify the harmful events on a sliding scale in terms of significance or consequence, such as multiple fatality events, single fatality events, serious injury events, minor injury events, or no-injury events.

In some aspects, the AV software management system can further classify the harmful event based on respective demographics of the deceased or the victims of harmful events (e.g., age and chosen gender), demographics of the at-fault party or parties, and the like. Such harmful event data can be collected from third party resources, such as incident reports (e.g., police reports), news sources, or direct reports from drivers (1112). The harmful event data may also be collected from sensor resources from vehicles, such as AVs or driver devices (1113). In certain examples, the actual control input data from vehicles (e.g., indicating steering, braking, and acceleration inputs and reaction times for humans) can be collected and directly or indirectly compared with AV software responses. In collecting and parsing the harmful event data, the AV software management system can perform clustering operations to determine common behavior corresponding to locality (e.g., a blind corner or dangerous intersection), or corresponding to driver type (e.g., aggressive, gender-specific, age-specific, etc.) (1114). Accordingly, the AV software management system can cluster drivers into groups based on risk, and can further cluster types of locations where the harmful events are typically occurring (e.g., certain types of intersections, highway segments, merge locations, pedestrian-dense areas, complex or confusing areas, roads having little or no shoulder, and the like).

The AV software management system may then determine fractional harmful event values for each path segment of the given region for human-driven vehicles (1115). As described herein, these fractional harmful event values per path segment can also be condition-dependent. These fractional harmful event values can be leveraged for any number of beneficial utilizations, such as increasing road safety for all vehicles in general, or supporting planning commissions in designing or configuring road segments and intersections. Flowing from block (1115) are two such processes represented by reference "F" and reference "G," which are described below with respect to FIGS. 13 and 14.

Referring back to FIG. 11, the AV software management system may optimize risk between the fractional harmful events for human-driven vehicles (HDVs) and the fractional harmful events for AVs (e.g., in general or per software release for SDAVs and FAVs) across routes throughout the given region (1120). In doing so, the AV software management system can ultimately determine which paths or routes are better utilized—or more safely utilized—by AVs versus humans and vice versa. In one basic example, the AV software management system can identify the riskiest aggregate paths or path segments for HDVs (1125), and the safest aggregate paths or path segments for AVs (1130). Based on these paths or path segments, the AV software management system can determine a set of paths for the HDVs to avoid, and a set of paths for the AVs to avoid. In further examples, the AV software management system can optimize overall path classifications based on the fractional risk values determined for both AVs and HDVs. Such path classifications can also be dynamic in nature (e.g., based on a current set of conditions). In classifying the paths or routes throughout the given region, the AV software management system can determine which paths are more optimal for AVs and which paths are more optimal for HDVs in terms of safety or risk.

Based on the optimizations for paths or routes, the AV software management system can establish capability-in-scope paths for AV operation throughout the given region (1135). In further examples, the data generated by the AV software management system can also be utilized to identify certain roads or lanes in which full replacement of HDVs by AVs may be overwhelmingly desirable in terms of safety or alleviation of traffic. According to various examples, the AV software management system can then determine routes for AV operation based on the risk optimization(s) (1140). In doing so, the software management system can establish conditional risk thresholds for each path (1142). Accordingly, the AV software management system can establish and/or expand a baseline autonomy grid 105 for training risk regressors and trip classifiers, and to facilitate software simulation and development for AV operation (1144). The processes described with respect to FIG. 11 also allow for intrinsic evaluation of any AV software release against human driving.

Figure 12:
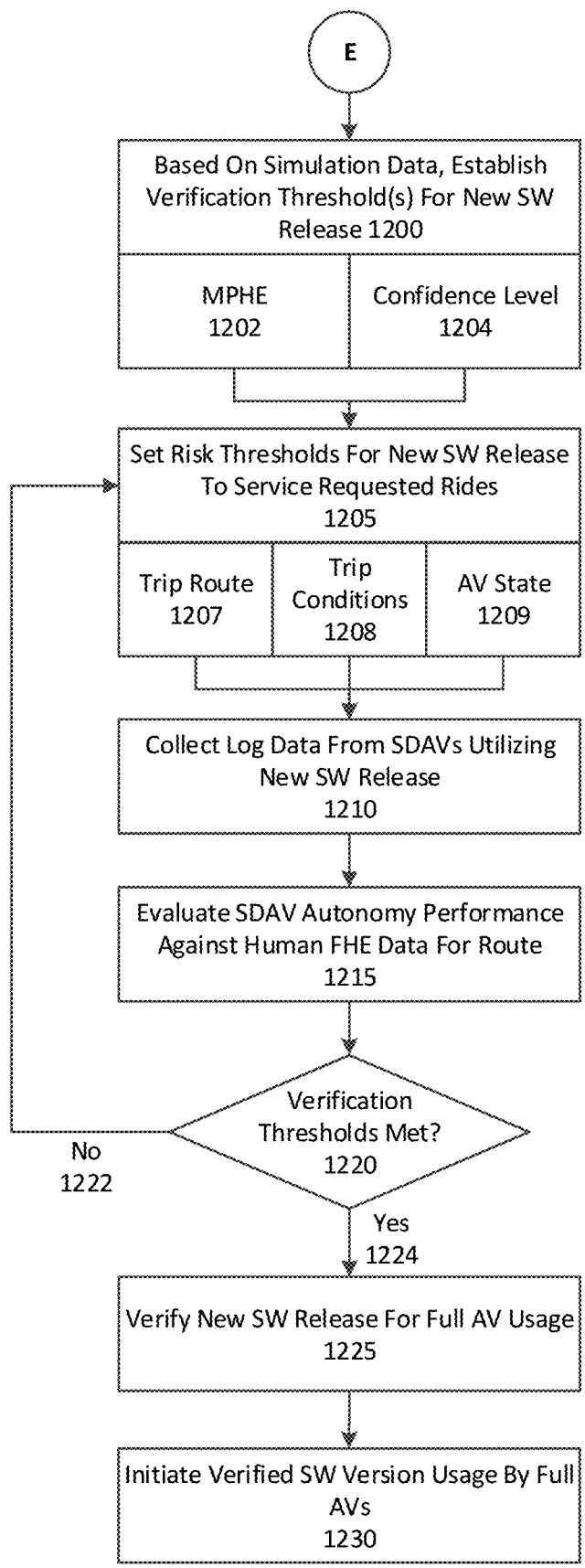
FIG. 12 is a flow chart describing example methods of software release verification for execution by fully autonomous self-driving vehicles.

FIG. 12 is a flow chart describing example methods of software release verification for execution by fully autonomous self-driving vehicles, according to examples described herein. The below steps of FIG. 12 may be performed by an example AV software management system described with respect to FIG. 2. Furthermore, in certain examples, the steps discussed in connection with FIG. 12 may flow from block (960) of FIG. 9, or accompany the processes discussed with respect to FIG. 9. Referring to FIG. 12, the AV software management system can establish a set of verification threshold for a new software release based on simulation data (1200). In doing so, the AV software management system can establish a threshold mileage per harmful event (MPHE) threshold in comparison to historical harmful event data from HDVs and/or AVs (1202). In certain implementations, the AV software management system can also establish a threshold confidence level that must be achieved before a given software release is verified for full autonomous use (1204).

In various implementations, the AV software management system can set risk thresholds for a new software release for servicing requested rides (e.g., corresponding to the functions of the trip classifier examples described herein) (1205). These risk thresholds can correspond to an aggregated risk value for a trip route as calculated by a risk regressor (1207). For example, if the aggregate risk value is higher than the risk threshold for the new software version, then the trip classifier can reject the software version for execution on the trip. The risk thresholds can also be established for a variety of trip conditions, such as weather, road, and/or traffic conditions (1208). For example, the risk for executing the software version may increase or decrease in variable weather conditions or denser traffic conditions. Likewise, the software release may be tailored to deal with certain conditions or environments, such as precipitation, and thus the risk thresholds for the software release may also vary based on the trip conditions. In further aspects, the AV software management system can also establish certain risk thresholds based on the changing nature of the AV's state (1209). In other words, the AV software management system can individualize risk thresholds for individual AVs based on a degradation level of the AV, as described herein. As further described herein, the new AV software version can also be distributed specifically to SDAVs in order to leverage the added protection of a safety driver for verifying the software version.

In certain aspects, the AV software management system may then collect log data from the SDAVs utilizing the new software release (1210). In further aspects, the AV software management system can also evaluate SDAV autonomy performance in executing the new software release against human fractional harmful event data for each route the SDAV traverses (1215). Throughout the log data collection and evaluation, the AV software management system can determine whether the verification thresholds for the new software release have been met (1220). If not (1222), then the software management system can either continue collecting more verification log data, or in certain circumstances, set new risk thresholds for the new software release (1205).

However, if the verification thresholds have been met (1224), then the AV software management system can verify the new software release for fully autonomous usage (i.e., by FAVs) (1225). For example, the AV software management system can distribute the newly verified software version to all FAVs, or a set of qualified FAVs operating throughout the autonomy grid. It is contemplated that not all FAVs will qualify for new software releases due to their hardware-specific nature. For example, an older model AV may not have an updated or state-of-the-art sensor to which the new software release is tailored. The AV software management system may then coordinate with the on-demand transport management system described throughout the present disclosure to initiate usage of the newly verified software version by FAVs (1230).

Figure 13:
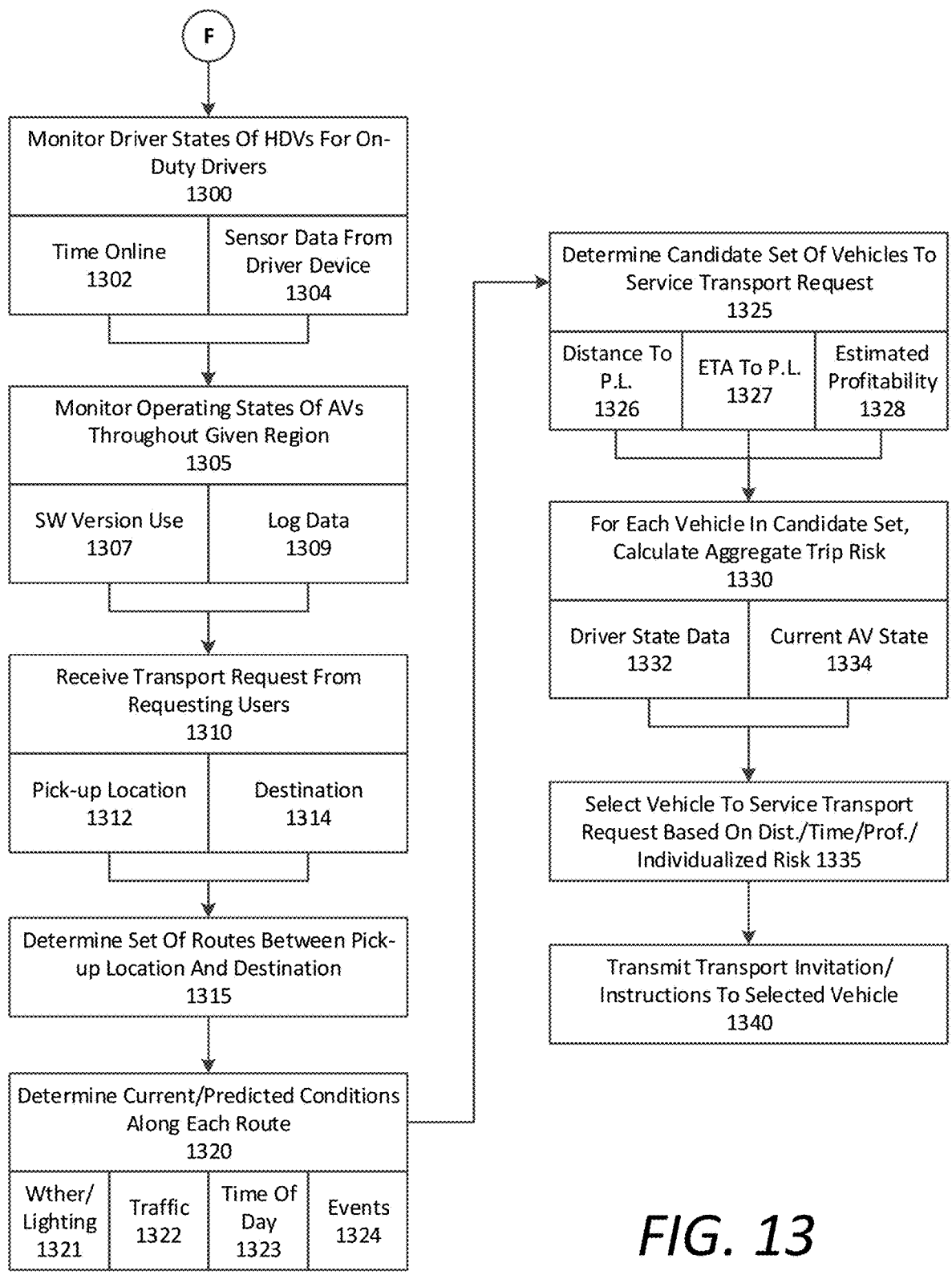
FIG. 13 is a flow chart describing example methods of individualized risk regression-based vehicle matching by an on-demand transportation management system.

FIG. 13 is a flow chart describing example methods of individualized risk regression-based vehicle matching by an on-demand transportation management system, according to examples described herein. In certain examples, the steps discussed with respect to FIG. 13 may flow from block (1115) of FIG. 11, and can therefore individualize risk assessment per vehicle and/or driver given the vehicle's or the driver's current state. Furthermore, the below steps described with respect to FIG. 13 may be performed by an example on-demand transportation management system described in connection with FIG. 3. Referring to FIG. 13, the on-demand transport management system can monitor driver states for on-duty drivers of various on-demand transportation services (1300). In doing so, the transport management system can track the time that the drivers are online or on-duty (1302). In some aspects, the on-demand transport system can further monitor sensor data from the driver's computing device, such as IMU data or image data that shows the driver's face (e.g., from a forward facing camera of the driver's computing device) (1304).

In various examples, the transport management system can also monitor operating states of AVs autonomously driving throughout the given region (1305). In doing so, the transport management system can identify which software version(s) the AV is currently running and which versions the AV has available (1307). In variations, the transport management system can also analyze log data streamed or otherwise transmitted from the AV (1309). As described herein, the log data can comprise telemetry data, diagnostics data, and/or sensor data from the AV's sensor suite (e.g., LIDAR and image data). The log data can also include input data corresponding to the AV control system's control inputs for the various s control mechanisms of the AV (e.g., the braking, steering, and acceleration mechanisms). Accordingly, the transport management system can perform dynamic low-level monitoring of the AV's state and assess a degradation level for the AV.

In general, the transport management system can receive transport requests from requesting users throughout a given region (1310). Each transport request can include or indicate a pick-up location (1312) and a destination for the requesting user or freight item (e.g., when transporting goods) (1314). The transport management system can determine a set of routes between the pick-up location and the destination (1315). In certain examples, the transport management system can identify a most optimal route in terms of distance and or estimated time given current or expected traffic conditions. The transport management system can also determine a current set of conditions and/or a predicted set of conditions along each route (1320). As described herein, these conditions can include traffic conditions (1322), weather conditions and/or lighting conditions (1321), a time of day (1323), road conditions, any events occurring along the route (1324), such as public gatherings, road constructions, parades, a mass egress event (e.g., when a concert or sports event ends), protests, and the like.

In certain implementations, the transport management system can determine a candidate set of vehicles to service the transport request (1325). The transport management system can do so based on distance to the pick-up location (1326) (e.g., within a mile), estimated time of arrival to the pick-up location (1327) (e.g., within four minutes), and or estimated profitability for the vehicle (1328). The estimated profitability can be determined based on a variety of parameters, such as whether the vehicle is an SDAV, FAV, or HDV, whether the vehicle requires fuel or electric charge, the fuel or charge efficiency of the vehicle, the home location of the vehicle, the degradation level of the vehicle, how long the vehicle or the driver has been on duty, the service type or vehicle type, which impacts the fare rates (e.g., luxury, standard, economical, high capacity, mid-size, full-size, compact, or mini vehicle), and local demand for each vehicle's current location. For example, the transport management system can monitor transport demand on a highly granular level (e.g., on the order of tens of meters), which enables the transport management system to induce or otherwise move vehicles towards highly localized areas of relatively higher demand. Accordingly, the transport management system can include a cost factor for each vehicle based on the transport demand within the local vicinity of that vehicle's current location. Accordingly, the estimated profit per vehicle can include an expected profit deduction attributable to moving the vehicle away from an area of higher relative demand or, conversely an expected profit addition attributable to moving the vehicle away from an area of lower relative demand.

In various examples, the transport management system can calculate an aggregate trip risk for each vehicle in the candidate set (1330). It is contemplated that this risk calculation can highly individual based on the driver state data (1332) and the current AV state (1334) (e.g., the degradation level of the AV described herein. However, for certain AVs having low or negligible degradation levels, the individual risk value can be the same, and in various examples, will converge to the general aggregate risk determined by the risk regressor described herein. Accordingly, each vehicle in the candidate set may be associated with a distance and/or estimated time to the pick-up location, an estimated profitability for servicing the transport request, and an individual risk value for servicing the transport request. Based on these attributes, the transport management system may then select a most optimal vehicle from the candidate set to service the transport request (1335). Once the vehicle is selected, the transport management system may then transmit a transport invitation to the selected driver's computing device if the vehicle is an HDV, or a set of transport instructions to the AV if the selected vehicle is an SDAV or FAV (1340).

Figure 14:
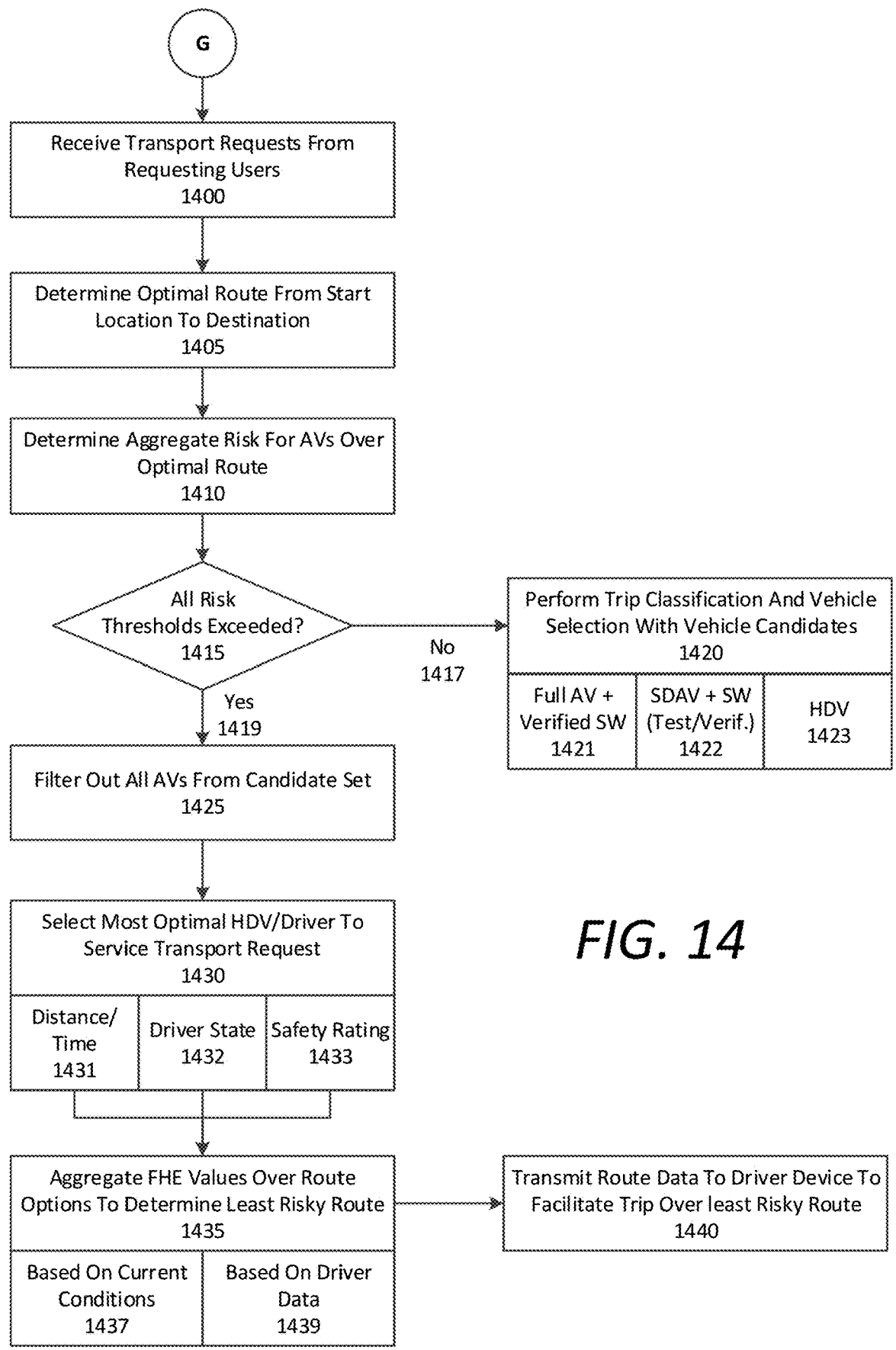
FIG. 14 is a flow chart describing example methods of intelligent routing of human drivers using fractional risk techniques described throughout the present disclosure.

FIG. 14 is a flow chart describing example methods of intelligent routing of human drivers using fractional risk techniques described throughout the present disclosure. In certain examples, the below processes described with respect to FIG. 14 can be performed by an example on-demand transportation management system described in connection with FIG. 3. Furthermore, the below steps of FIG. 14 may flow from block (1115) of FIG. 11, in which fractional risk values for path segments are generalized for human drivers. Referring to FIG. 14, the on-demand transport management system can receive transport requests from requesting users throughout the given region (1400). For each transport request, the transport management system can determine an optimal route from the pick-up location to the destination indicated in the transport request (1410). The transport management system may then determine an aggregate risk for AVs over the optimal route (1410).

The transport management system may then determine whether all risk thresholds are exceeded for the AVs (1415). As provided herein, the risk thresholds of the SDAVs may be different from the risk thresholds for the FAVs. Furthermore, the risk thresholds for each software version may be different from each other. In still further examples, the same software version may be attributable to different risk thresholds depending on such factors as whether the software version is being executed by a SDAV versus an FAV, or whether the software version is being executed for verification mileage versus trip classifier training. If the aggregate risk does not exceed all thresholds (1417), then the transport management system can perform a trip classification and vehicle selection process, described herein, in order to determine a set of candidate vehicles and select a most optimal vehicle to service the transport request (1420). In doing so, the transport management system can select between fully autonomous vehicles executing verified software versions (1421), safety-driver autonomous vehicles executing either unverified, test software or verified software (1422), or purely human-driven vehicles with a full-time driver (1423).

However, if the aggregate risk for the optimal route exceeds all risk thresholds for AVs (1419), then the transport management system can filter out all AVs from the candidate set of vehicles (1425), and select a most optimal HDV or driver to service the transport request (1430). In doing so, the transport management system can include factors such as distance or time to the pick-up location (1431), the driver state (1432) (e.g., how long the driver has been on-duty or the driver's current driving characteristics), and/or the driver's historical safety rating (1433). The driver's safety rating may be determined from a stored driver's profile, which can include passenger ratings for the driver, any incident reports, and the driver's personal accident or insurance history.

In various examples, the transport management system can aggregate fractional risk values over a plurality of route options for the transport request to determine a least risky route (1435). Specifically, the transport management system can determine the aggregate risk values based on a current set of conditions (1437). In variations, the transport management system can further determine individual aggregate risk calculations of the drivers over the least risky route option based on the individual driver data described herein (1439). In further variations, the transport management system can determine individual risk values for each of the drivers in the candidate set for each of the plurality of routes options, and select a most optimal driver (e.g., a least risky driver/route combination) to service the transport request (1430). Once a most optimal driver is selected, the transport management system can transmit a transport invitation and route data to the selected driver to facilitate the trip over the least risk route (1440).

Figure 15:
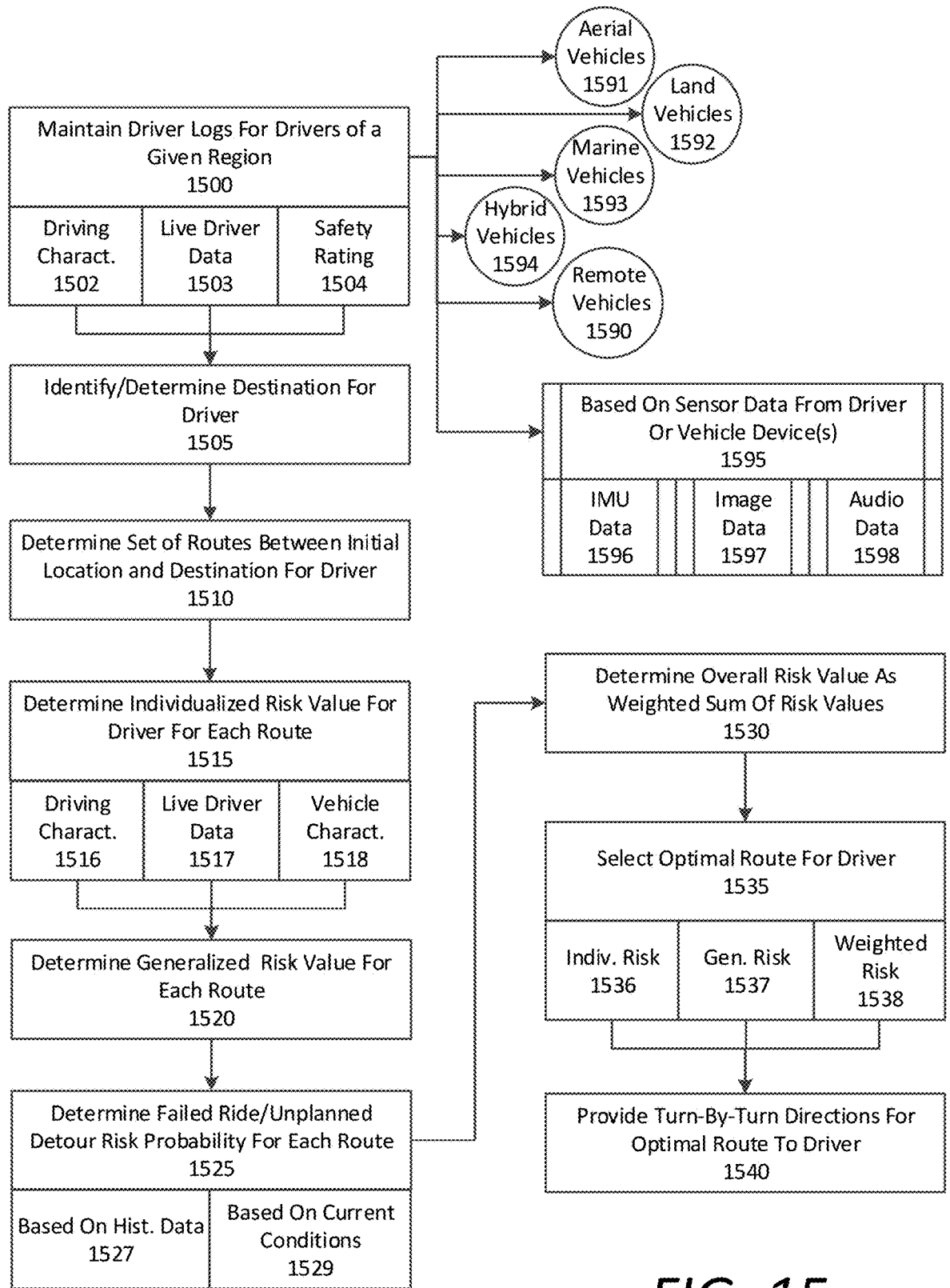
FIG. 15 is a flow chart describing example methods of individualized routing, according to various examples.

FIG. 15 is a flow chart describing example methods of individualized routing, according to various examples. In certain examples, the below processes described with respect to FIG. 15 can also be performed by an example on-demand transportation management system in combination with an on-trip monitoring system described in connection with FIGS. 3 and 4. Referring to FIG. 15, the on-demand transport management system can maintain driver logs for drivers operating throughout a given region (1500). These drivers can fulfill the on-demand transportation services facilitated by the on-demand transportation management system, such as passenger, food, package or general freight transport. Furthermore, the driver logs can correspond to drivers of land vehicles (e.g., tractor trailers, cars, trucks, construction equipment, farming equipment, etc.) (1592), aerial vehicles (1591), marine vehicles (1593), remotely operated vehicles (1590), and/or hybrid vehicles encompassing a plurality of the foregoing (1594).

In various examples, the driver logs can store data indicating the driving characteristics of the driver (1502). For example, the driver log for a particular driver can indicate whether the driver has a tendency towards late-braking, hard maneuver, hard acceleration, or otherwise indicate a safety level of the driver. The driver logs may be updated dynamically, and can thus indicate live driver data (1503), such as the current driving characteristics of the driver (e.g., via sensor resources from the driver's computing device or the vehicle being operated by the driver), how long the driver has currently been on-duty, and the current location, heading, and/or route plan of the driver. In certain implementations, the driver logs can further store additional profile information, such as location preferences, the driver's safety rating (1504), any specific incidences the driver has been involved in, and the like. In various examples, the on-demand transport system can determine the general or current driving characteristics of the driver by receiving sensor data from the driver's computing device or vehicle sensors of the driver's vehicle (1595). For example, the on-demand transport system can receiver IMU data (1596), image or video data (1597), and/or audio data (1598) from the driver's computing device or vehicle sensors to determine the driving characteristics of the driver.

According to various examples, the on-demand transportation management system can identify or otherwise determine the destination of a particular driver (1505). The destination can comprise a passenger or freight drop-off location, a pick-up location, or a home destination for the driver. The on-demand transportation management system can then determine a set of routes between the initial location (e.g., the driver's current location) and the destination for the driver (1510). The on-demand transportation management system may then determine an individualized risk value for the driver for each route to the destination (1515). The transport system can determine the individualized route based on the driver characteristics of the driver (1516), the live driver data (1517), and/or the characteristics of the driver's vehicle, such as the vehicle's safety features, model, year, etc. (1518).

In various examples, the on-demand transport system can further determine a generalized risk value for each route, as described herein (1520). In still further examples, the on-demand transport system can determine a failed ride risk probability for each route (1525). For example, the on-demand transport system can store historical data indicating routes between a start location and a destination in which an unplanned detour (e.g., a missed turn or exit) has caused the driver or an AV to find a different route, or caused a routing resource executing on the driver's computing device or on-board computing resources of the AV to recalculate a new optimal route. Accordingly, the on-demand transport system can leverage the historical failed ride data, or unplanned detour data, to determine the failed ride risk for each route (1527). Described in detail throughout the present disclosure are concepts directed towards conditions based risk assessments. According to examples, the failed ride or unplanned detour risk can also be conditions-based (e.g., either current conditions or predicted conditions), and thus the on-demand transport system can factor in the current or predicted conditions into the failed ride or unplanned detour risk probability (1529).

Accordingly, the on-demand transport system can determine an overall risk value for each route as a weighted sum of at least a plurality of the individualized risk value, the generalized risk value, and the failed ride or unplanned detour probability described herein (1530). Furthermore, it is contemplated that the on-demand transport system can perform each of the individualized risk, generalized risk, and failed ride or unplanned detour probability computations at any time given the driver's current location, current route to the destination, and any other possible routes. Accordingly, at any given time, the on-demand transport system can select an optimal route for the driver to the destination (1535) based on the individualized risk (1536), the generalized risk (1537), and/or the weight risk probability (1538). In further examples, the on-demand transport system can then provide routing updates the computing device of the driver, to provide turn-by-turn directions for the optimal route to the driver (1540) (e.g., on a display screen of the driver's computing device).

Figure 16:
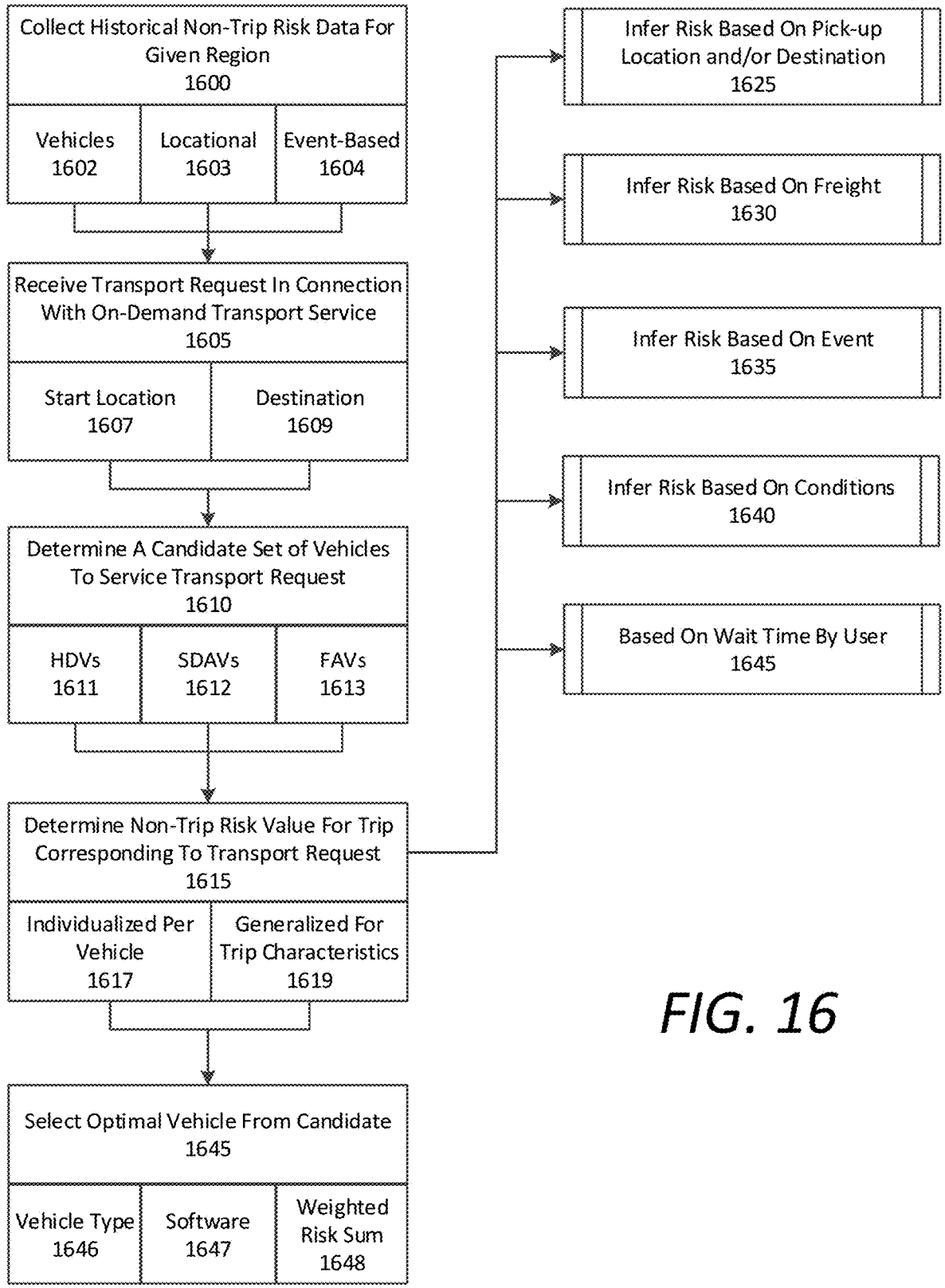
FIG. 16 is a flow chart describing example methods of vehicle matching based on non-trip risk, according to examples.

FIG. 16 is a flow chart describing example methods of vehicle matching based on non-trip risk, according to examples. In certain examples, the below processes described with respect to FIG. 16 can also be performed by an example on-demand transportation management system described in connection with FIG. 3. Referring to FIG. 16, the on-demand transport system can collect historical non-trip risk data for a given region (1600). As provided herein, non-trip risk data can comprise any quantifiable risk external to the actual traversal of the vehicle from the initial location to the destination. In certain examples, a generalized or individualized risk associated with the actual vehicles (e.g., HDVs versus SDAVs versus FAVs) in servicing an on-demand transportation request can be quantified in terms of non-trip risk (1602). In further examples, the non-trip risk can be locational in nature, for example, based on the pick-up location or start location and/or the destination (1603). For example, the on-demand transport system can quantify a non-trip risk associated with a hospital destination. In still further examples, the on-demand transport system can quantify a non-trip risk value based on an event (e.g., a protest, concert, or sporting event) (1604).

According to various examples, the on-demand transport system can receive transport requests in connection with an on-demand transportation service (1605). As described herein, each transport request can comprise a start location (e.g., a passenger pick-up location) (1607) and a destination (1609). For each transport request, the on-demand transport system can determine a candidate set of vehicles to service the transport request (1610). As further described herein, the candidate set of vehicles can include one or more HDVs (1611), SDAVs (1612), and/or FAVs (1613). The on-demand transport system can then determine a non-trip risk value for a trip corresponding to the transport request (1615). In certain examples, the non-trip risk value can be individually calculated per vehicle (1617). For example, the on-demand transport system can determine the vehicle's safety rating or safety features to factor in non-trip risk. The on-demand transport system can further factor in the degradation level of the vehicle, the software being executed on the vehicle, and/or general risk associated with an HDV servicing the request as opposed to an SDAV or FAV. Additionally or alternatively, the on-demand transport system can determine a generalized non-trip risk value based on the general characteristics of the trip, as described herein (1619).

In various implementations, the on-demand transport system can infer the non-trip risk based on the nature of the pick-up location and/or the destination (1625). For example, a passenger going to the hospital may benefit more from faster travel by an HDV as compared to an AV. Accordingly, the on-demand transport system can attribute a non-trip risk value to AVs in the candidate set of vehicles (e.g., to include in a weight sum risk calculation by the risk regression). The on-demand transport system can further infer non-trip risk based on the freight being carried by the vehicle (1630). For example, a standard delivery of non-perishable goods can carry a lower non-trip risk than an emergency delivery of medical supplies, or perishable food items. The on-demand transport system can further infer non-trip risk based on an event, such as a mass egress event at a pick-up location which can flood computational resources of an AV with dynamic objects, like pedestrians, to classify and predict (1635). The non-trip risk can further be inferred based on a current or predicted set of conditions, as described herein (1640). Still further, the on-demand transport system can factor in non-trip risk based on a wait time by the requesting user (1645). For example, the user may benefit by waiting longer for a lower risk ride, or for a faster ride based on other non-trip risk factors.

Based at least in part on the non-trip risk value, the on-demand transport system can select an optimal vehicle from the candidate set of vehicles to service the transport request (1645). In doing so, the on-demand transport system may also factor in or otherwise optimize between individual and/or general risk per AV or driver, and/or failed ride risk or unplanned detour risk. The selection can further be based on filtering out vehicle types (1646) (e.g., between SDAVs, FAVs, and HDVs), and/or software versions being executed by the AVs (1647), as determined by the trip classifier(s) described herein. In further implementations, the on-demand transport system can ultimately select an optimal, lowest risk vehicle to service a given transport request based on a weighted risk sum, as further described herein (1648).

Figure 17:
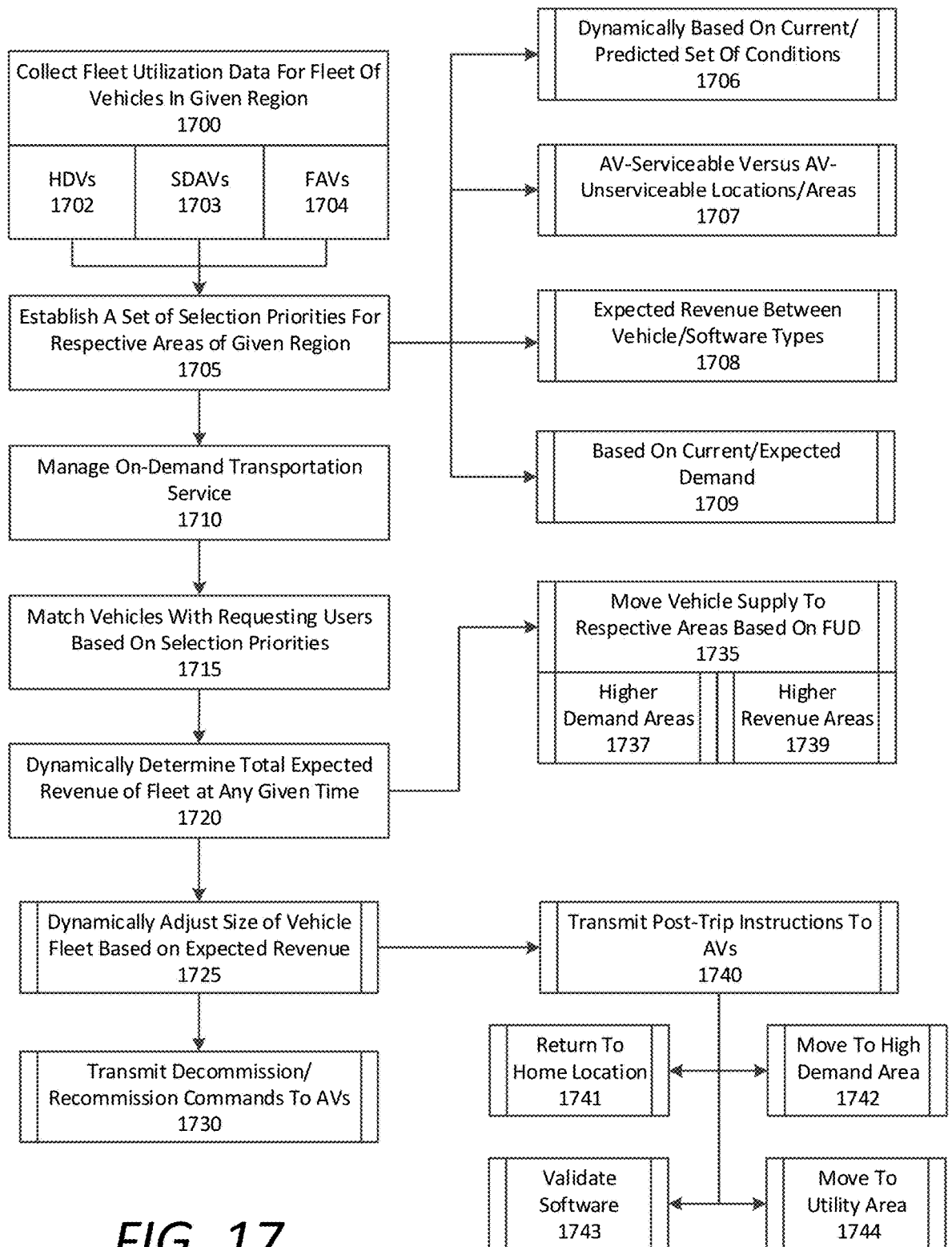
FIG. 17 is a flow chart describing example methods of efficient fleet utilization in connection with an on-demand transport service, according to examples described herein.

FIG. 17 is a flow chart describing example methods of efficient fleet utilization in connection with an on-demand transport service, according to examples described herein. In certain examples, the below processes described with respect to FIG. 17 can also be performed by an example on-demand transportation management system described in connection with FIG. 3. Referring to FIG. 17, the on-demand transportation management system can collect fleet utilization data for a fleet of vehicles operating throughout a given region (1700). The fleet of vehicles can comprise HDVs (1702), SDAVs (1703), and FAVs (1704). In general, the on-demand transport system can establish a set of selection priorities for respective areas of the given region based on the fleet utilization data (1705). Thus, on a high level, the on-demand transport system can prioritize areas of an autonomy grid for on-demand transportation services by AVs in general, SDAVs, FAV, or HDVs based on the fleet utilization data described below. Thereafter, the risk regression and trip classification techniques described throughout the present disclosure can be implemented for servicing the on-demand transportation requests.

In various examples, the on-demand transport system can establish the set of selection priorities dynamically based on a current or predicted set of conditions (1706). Furthermore, the fleet utilization data can indicate respective locations or areas of an autonomy grid at which rides or on-demand trips are typically serviceable or not serviceable by AVs (1707). Such locations and areas can be time-sensitive as well as conditions sensitive. For example, an office building along an autonomy grid can be typically AV-serviceable at lunchtime, when workers travel short distances for lunch, but AV-unserviceable in the evening, when workers travel lengthy and widely divergent paths to head home. In further examples, the on-demand transport system can establish the location-based selection priorities based on expected revenue between vehicle types (e.g., HDV, SDAV, and FAV), and/or software versions executing on the AVs (1708). For example, the historical fleet utilization data can indicate areas having pick-up locations at which AVs (SDAVs or FAVs) generate higher revenue than HDVs, and vice versa. Accordingly, the on-demand transport system can prioritize higher revenue generating vehicle types based on expected revenue. In still further examples, the selection priorities can be based on localized current or expected transportation demand (1709). For example, the on-demand transport system can diminish or reduce vehicle type prioritizations when local demand increases in certain areas and locations, in order to fulfill the increased demand.

As described herein, the on-demand transport system can manage an on-demand transportation service, such as a delivery or passenger transport service (1710). In various examples, the on-demand transport system can further match vehicles with requesting users based on the selection priorities, as described herein (1715). In certain variations, the on-demand transport system may dynamically determine the total expected revenue of the on-duty fleet at any given time (1720). In various examples, the on-demand transport system can determine the total revenue by aggregating localizes expected revenue and/or demand for the given region. In certain examples, the on-demand transport system can move the vehicle supply to respective areas of the given region and/or autonomy grid in particular, based on the fleet utilization data and the dynamically determined expected revenue. For example, the on-demand transport system can transmit transport commands to the AVs, provide notifications to the drivers, and the like. According to examples, the on-demand transport system can move the vehicle supply to higher demand areas (1737) and/or higher revenue or higher expected revenue areas (1739). As described, this active inducement of moving supply can be vehicle-type specific based on the selection priorities, or can be generalized across areas.

Additionally or alternatively, the on-demand transport system can dynamically adjust the size of the vehicle fleet based on expected revenue (1725). In various implementations, the on-demand transport system can do so by transmitting decommission and/or recommission commands to the AVs (SDAVs and FAVs) of the fleet (1730). For example, when the fleet is underutilized or has, cumulatively, relatively high wait times per match, the on-demand transport system can decommission AVs accordingly. Conversely, if the fleet is over-utilized, the on-demand transport system can recommission AVs to fulfill the increased demand. In further implementations, the on-demand transport system can adjust the size of the vehicle fleet by way of transmitting post-trip instructions to the AVs (1740). For example, the on-demand transport system can transmit instructions for an AV to return to a home location (1741), move to a high demand area (1742), execute an unverified software version to log verification miles (1743), move to a higher utility area for the AV (1744), and the like. As provided herein, a higher utility area can comprise an area within the given region where the individual AV is most optimally utilized (e.g., has lower risk, generates higher revenue, etc.).

Hardware Diagrams

Figure 18:
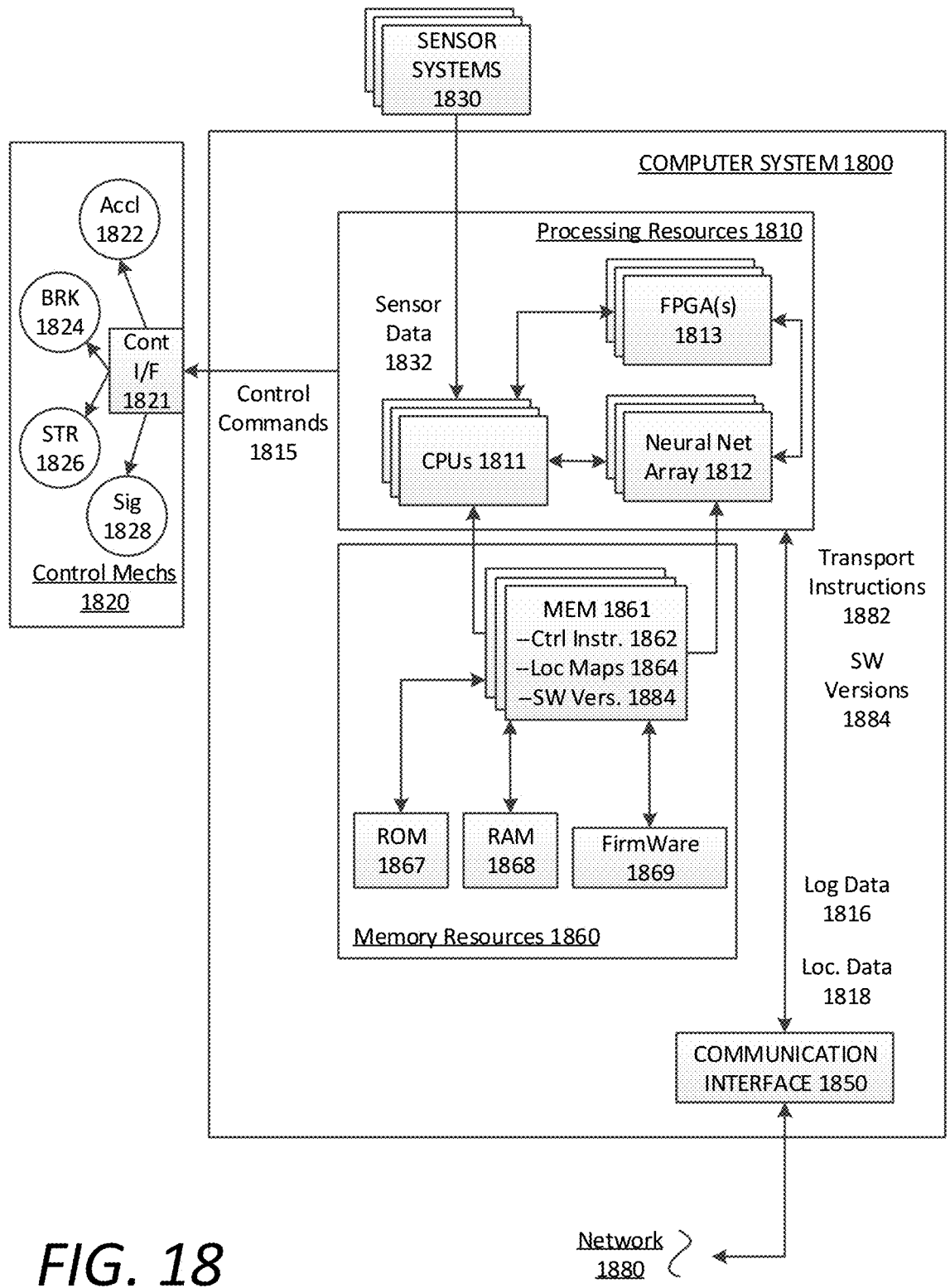
FIG. 18 is a hardware diagram illustrating an example computer system for AVs upon which examples described herein may be implemented.

FIG. 18 is a block diagram illustrating a computer system upon which example AV processing systems described herein may be implemented. The computer system 1800 can be implemented using a number of processing resources 1810, which can comprise computer processing units (CPUs) 1811 and field programmable gate arrays (FPGAs) 1813. In some aspects, any number of processors 1811 and/or FPGAs 1813 of the computer system 1800 can be utilized as components of a neural network array 1812 implementing a machine learning model and utilizing road network maps stored in memory 1861 of the computer system 1800. In the context of FIG. 5, various aspects and components of the AV control system 520 can be implemented using one or more components of the computer system 1800 shown in FIG. 18.

According to some examples, the computer system 1800 may be implemented within an autonomous vehicle (AV) with software and hardware resources such as described with examples of FIG. 5. In an example shown, the computer system 1800 can be distributed spatially into various regions of the AV, with various aspects integrated with other components of the AV itself. For example, the processing resources 1810 and/or memory resources 1860 can be provided in a cargo space of the AV. The various processing resources 1810 of the computer system 1800 can also execute control instructions 1862 using microprocessors 1811, FPGAs 1813, a neural network array 1812, or any combination of the foregoing.

In an example of FIG. 18, the computer system 1800 can include a communication interface 1850 that can enable communications over a network 1880. In one implementation, the communication interface 1850 can also provide a data bus or other local links to electro-mechanical interfaces of the vehicle, such as wireless or wired links to and from control mechanisms 1820 (e.g., via a control interface 1821), sensor systems 1830, and can further provide a network link to a backend transport management system or a remote teleassistance system (implemented on one or more datacenters) over one or more networks 1880.

The memory resources 1860 can include, for example, main memory 1861, a read-only memory (ROM) 1867, storage device, and cache resources. The main memory 1861 of memory resources 1860 can include random access memory (RAM) 1868 or other dynamic storage device, for storing information and instructions which are executable by the processing resources 1810 of the computer system 1800. The processing resources 1810 can execute instructions for processing information stored with the main memory 1861 of the memory resources 1860. The main memory 1861 can also store temporary variables or other intermediate information which can be used during execution of instructions by the processing resources 1810. The memory resources 1860 can also include ROM 1867 or other static storage device for storing static information and instructions for the processing resources 1810. The memory resources 1860 can also include other forms of memory devices and components, such as a magnetic disk or optical disk, for purpose of storing information and instructions for use by the processing resources 1810. The computer system 1800 can further be implemented using any combination of volatile and/or non-volatile memory, such as flash memory, PROM, EPROM, EEPROM (e.g., storing firmware 1869), DRAM, cache resources, hard disk drives, and/or solid state drives.

The memory 1861 may also store localization maps 1864 in which the processing resources 1810—executing control instructions 1862—continuously compare to sensor data 1832 from the various sensor systems 1830 of the AV. Execution of the control instructions 1862 can cause the processing resources 1810 to generate control commands 1815 in order to autonomously operate the AV's acceleration 1822, braking 1824, steering 1826, and signaling systems 1828 (collectively, the control mechanisms 1820). Thus, in executing the control instructions 1862, the processing resources 1810 can receive sensor data 1832 from the sensor systems 1830, dynamically compare the sensor data 1832 to a current localization map 1864, and generate control commands 1815 for operative control over the acceleration, steering, and braking of the AV along a particular route plan based on transport instructions 1882 received from an on-demand transportation management system over the network 1880. The processing resources 1810 may then transmit the control commands 1815 to one or more control interfaces 1821 of the control mechanisms 1820 to autonomously operate the AV along an autonomy route indicated in the transport instructions 1882, as described throughout the present disclosure.

Furthermore, as described herein, the computer system 1800 may receive transport instructions 1882 from an external on-demand transport management system, instructing the computer system 1800 to rendezvous with a requesting user to make a pick-up, and transport the user to a drop-off location. The processing resources 1810 can process the transport instructions 1882 by generating a route plan and control instructions to execute the route plan to rendezvous with the requesting user. In various examples, the transport instructions 1882 may be transmitted to the computer system 1800 based on location data 1818 of the computer system 1800 indicating that the AV is most optimally situated to service a given transport request.

The computer system 1800 may further receive software versions 1884 from the AV software management systems described herein, and can selectively execute the software versions 1884 based on transport instructions 1882 received from the transportation management system. Furthermore, the computer system 1800 can transmit log data 1816 corresponding to at least one of the sensor data 1832, the control commands 1815, and/or telemetry and diagnostics data from the vehicle's electronic control unit.

Figure 19:
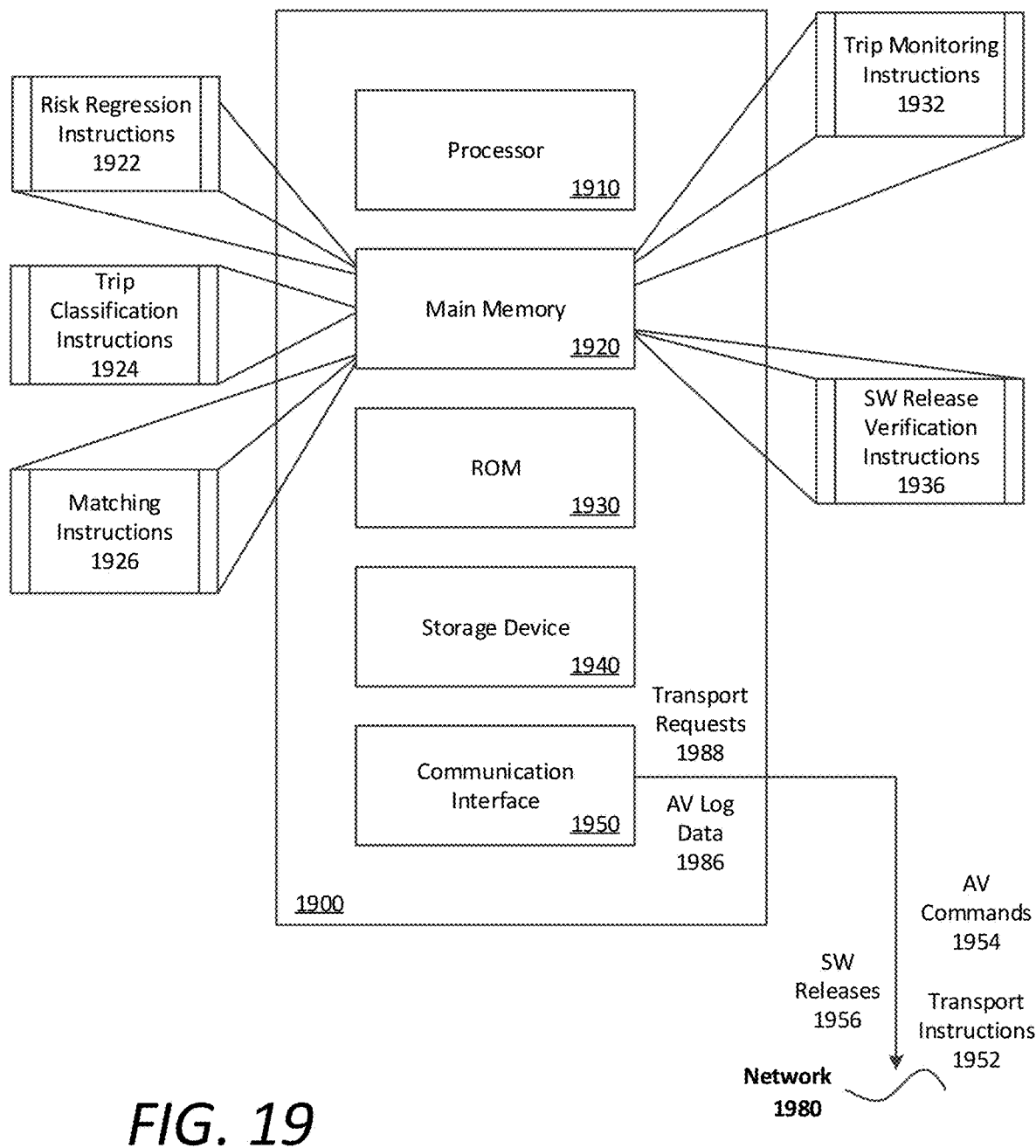
FIG. 19 is a hardware diagram illustrating a computer system upon which example backend software training, on-demand transport management, and on-trip monitoring systems described herein may be implemented.

FIG. 19 is a hardware diagram illustrating a computer system upon which example backend software training, on-demand transport management, and on-trip monitoring systems described herein may be implemented. A computer system 1900 can be implemented on, for example, a server or combination of servers. For example, the computer system 1900 may be implemented as part of a network service for providing transportation services. In the context of FIGS. 3-4, the AV software management system 200, the on-demand transport management system 300, and the on-trip monitoring system 400 may be implemented using one or more computer systems 1900 such as described by FIG. 19.

In one implementation, the computer system 1900 includes processing resources 1910, a main memory 1920, a read-only memory (ROM) 1930, a storage device 1940, and a communication interface 1950. The computer system 1900 includes at least one processor 1910 for processing information stored in the main memory 1920, such as provided by a random access memory (RAM) or other dynamic storage device, for storing information and instructions which are executable by the processor 1910. The main memory 1920 also may be used for storing temporary variables or other intermediate information during execution of instructions to be executed by the processor 1910. The computer system 1900 may also include the ROM 1930 or other static storage device for storing static information and instructions for the processor 1910. A storage device 1940, such as a magnetic disk or optical disk, is provided for storing information and instructions.

The communication interface 1950 enables the computer system 1900 to communicate over one or more networks 1980 (e.g., cellular network) through use of the network link (wireless or wired). Using the network link, the computer system 1900 can communicate with one or more computing devices, one or more servers, and/or one or more autonomous vehicles. The executable instructions in the memory 1920 can include risk regression instructions 1922, which the computer system 1900 can execute to determine fractional risk value for each path segment of an autonomy grid, and to aggregate these fractional risk values to determine an overall risk value for a given trip, as described throughout the present disclosure.

The executable instructions stored in memory 1920 can also include trip classification instructions 1924, which the computer system 1900 can execute to establish respective sets of risk thresholds for software releases and vehicles, and classify or filter trips based on the outputted risk aggregates from the risk regression instructions 1922. The executable instructions stored in the memory 1920 can also include matching instructions 1926, which enable the computer system 1900 to receive locations of AVs and human drivers operating throughout the given region, and match the AVs and human drivers to service transport requests 1988 received from requesting users. For AVs, the computer system 1900 may then transmit transport instructions 1952 identifying the pick-up location, route information, a software version to execute, and the like.

The executable instructions can further include trip monitoring instructions 1932, which enable the computer system 1900 to determine monitor AVs and human drivers operating throughout the region, and provide suggested routes based on risk calculations for trip remainders, and/or generate AV commands 1954 instructing an AV to switch software versions or modes, or to drive to a service or home location for servicing or temporary decommissioning. Still further, the executable instructions in memory 1920 can include software release verification instructions 1932, which enable the computer system 1900 to generate software simulations for precertification and monitor AV logs for harmful events that impact the verification mileage for a given software release 1956. The software release verification instructions 1936 can further enable the computer system 1900 to establish verification thresholds that, when met, enable the computer system 1900 to verify the software release 1956 for distribution to fully autonomous vehicles (e.g., having level 4 or level 5 autonomous capability).

The processor 1910 is configured with software and/or other logic to perform one or more processes, steps and other functions described with implementations, such as described with respect to FIGS. 1-13, and elsewhere in the present application. Examples described herein are related to the use of the computer system 1900 for implementing the techniques described herein. According to one example, those techniques are performed by the computer system 1900 in response to the processor 1910 executing one or more sequences of one or more instructions contained in the main memory 1920. Such instructions may be read into the main memory 1920 from another machine-readable medium, such as the storage device 1940. Execution of the sequences of instructions contained in the main memory 1920 causes the processor 1910 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. An on-demand transportation management system comprising:
   one or more processors; and
   one or more memory resources storing instructions that, when executed by the one or more processors, cause the on-demand transportation management system to perform operations comprising:
   receiving a transport request in connection with an on-demand transportation service, the transport request indicating a start location and a destination;

determining a set of candidate vehicles available to service the transport request, wherein the set of candidate vehicles comprises one or more autonomous vehicles;

determining a non-trip risk value for servicing the transport request based at least in part on a type of the start location or a type of the destination, wherein the non-trip risk value is indicative of an impact that the type of the start location or the type of the destination has on the autonomous performance of an autonomous vehicle of the one or more autonomous vehicles;

selecting an optimal vehicle in the set of candidate vehicles based at least in part on the non-trip risk value; and outputting data instructing the optimal vehicle to service the transport request, the data indicating at least the start location associated with the transport request, wherein the optimal vehicle is an autonomous vehicle configured to autonomously travel to the start location associated with the transport request.

2. The on-demand transportation management system of claim 1, wherein the operations further comprise:
collecting historical non-trip risk data corresponding to vehicles operating within a given region;
wherein the non-trip risk value is based at least in part on the historical non-trip risk data.

3. The on-demand transportation management system of claim 2, wherein the historical non-trip risk data identify harmful events affecting requesting users in connection with the on-demand transportation service, but external to actual trips servicing the requesting users between pick-up locations and destinations.

4. The on-demand transportation management system of claim 3, wherein the historical non-trip risk data further correlates wait time by requesting users in changing conditions.

5. The on-demand transportation management system of claim 4, wherein the changing conditions correspond to at least one of inclement weather, a current event, or a predicted event.

6. The on-demand transportation management system of claim 1, wherein the impact that the type of the start location or the type of the destination has on the autonomous performance of the autonomous vehicle comprises an affect on a time to reach the destination by the autonomous vehicle.

7. The on-demand transportation management system of claim 1, wherein:
the autonomous vehicle is a first candidate vehicle;
the non-trip risk value is a first non-trip risk value; and
the operations further comprise determining a second non-trip risk value for servicing the transport request based at least in part on the type of the start location or the type of the destination, the second non-trip risk value being indicative of an impact that the type of the start location or the type of the destination has on at least one of:
the ability of a second candidate vehicle of the set of candidate vehicles to service the transport request, or
a time to reach the destination by the second candidate vehicle.

8. The on-demand transportation management system of claim 7, wherein selecting the optimal vehicle in the set of candidate vehicles based at least in part on the non-trip risk value comprises comparing the first non-trip risk value and the second non-trip risk value.

9. The on-demand transportation management system of claim 8, wherein the second candidate vehicle is a human-driven vehicle.

10. The on-demand transportation management system of claim 1, wherein determining the non-trip risk value comprises determining an inferred risk for a trip based at least in part on freight to be transported.

11. A non-transitory computer readable medium storing instructions that, when executed by one or more processors, cause the one or more processors to perform operations comprising:
receiving a transport request in connection with an on-demand transportation service, the transport request indicating a start location and a destination;
determining a set of candidate vehicles available to service the transport request, wherein the set of candidate vehicles comprises one or more autonomous vehicles;
determining a non-trip risk value for servicing the transport request based at least in part on a type of the start location or a type of the destination, wherein the non-trip risk value is indicative of an impact that the type of the start location or the type of the destination has on the autonomous performance of an autonomous vehicle of the one or more autonomous vehicles;
selecting an optimal vehicle in the set of candidate vehicles based at least in part on the non-trip risk value; and
outputting data instructing the optimal vehicle to service the transport request, the data indicating at least the start location associated with the transport request, wherein the optimal vehicle is an autonomous vehicle configured to autonomously travel to the start location associated with the transport request.

12. The non-transitory computer readable medium of claim 11, wherein the operations further comprise:
collecting historical non-trip risk data corresponding to vehicles operating within a given region;
wherein the non-trip risk value is based at least in part on the historical non-trip risk data.

13. The non-transitory computer readable medium of claim 12, wherein the historical non-trip risk data identify harmful events affecting requesting users in connection with the on-demand transportation service, but external to actual trips servicing the requesting users between pick-up locations and destinations.

14. The non-transitory computer readable medium of claim 13, wherein the historical non-trip risk data further correlates wait time by requesting users in changing conditions.

15. The non-transitory computer readable medium of claim 14, wherein the changing conditions correspond to at least one of inclement weather, a current event, or a predicted event.

16. The non-transitory computer readable medium of claim 11, wherein the impact that the type of the start location or the type of the destination has on the autonomous performance of the autonomous vehicle comprises an affect on a time to reach the destination by the autonomous vehicle.

17. The non-transitory computer readable medium of claim 11, wherein:
the autonomous vehicle is a first candidate vehicle;
the non-trip risk value is a first non-trip risk value; and
the operations further comprise determining a second non-trip risk value for servicing the transport request based at least in part on the type of the start location or the type of the destination, the second non-trip risk value being indicative of an impact that the type of the start location or the type of the destination has on at least one of:

the ability of a second candidate vehicle of the set of candidate vehicles to service the transport request, or a time to reach the destination by the second candidate vehicle.

18. The non-transitory computer readable medium of claim 17, wherein selecting the optimal vehicle in the set of candidate vehicles based at least in part on the non-trip risk value comprises comparing the first non-trip risk value and the second non-trip risk value.

19. The non-transitory computer readable medium of claim 18, wherein the second candidate vehicle is a human-driven vehicle.

20. A computer-implemented method of facilitating an on-demand transportation service, the method being performed by one or more processors and comprising:

receiving a transport request in connection with an on-demand transportation service, the transport request indicating a start location and a destination;

determining a set of candidate vehicles available to service the transport request, wherein the set of candidate vehicles comprises one or more autonomous vehicles;

determining a non-trip risk value for servicing the transport request based at least in part on a type of the start location or a type of the destination, wherein the non-trip risk value is indicative of an impact that the type of the start location or the type of the destination has on the autonomous performance of an autonomous vehicle of the one or more autonomous vehicles;

selecting an optimal vehicle in the set of candidate vehicles based at least in part on the non-trip risk value; and outputting data instructing the optimal vehicle to service the transport request, the data indicating at least the start location associated with the transport request, wherein the optimal vehicle is an autonomous vehicle configured to autonomously travel to the start location associated with the transport request.

21. The computer-implemented method of claim 20, wherein:

the autonomous vehicle is a first candidate vehicle;

the non-trip risk value is a first non-trip risk value; and the operations further comprise determining a second non-trip risk value for servicing the transport request based at least in part on the type of the start location or the type of the destination, the second non-trip risk value being indicative of an impact that the type of the start location or the type of the destination has on at least one of:

the ability of a second candidate vehicle of the set of candidate vehicles to service the transport request, or a time to reach the destination by the second candidate vehicle.

22. The computer-implemented method of claim 20, wherein the type of start location or destination location comprises a hospital location.

* * * * *